(12) United States Patent
Detty et al.

(10) Patent No.: US 9,028,603 B2
(45) Date of Patent: May 12, 2015

(54) ANTI-FOULING COATING COMPOSITIONS AND METHODS FOR PREVENTING THE FOULING OF SURFACES

(75) Inventors: Michael Ray Detty, Rochester, NY (US); Frank V. Bright, Williamsville, NY (US); Stephanie Marie Bennett, Grand Island, NY (US); Anastasiya Sokolova, Brooklyn, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 205 days.

(21) Appl. No.: 13/493,116

(22) Filed: Jun. 11, 2012

(65) Prior Publication Data

US 2012/0312192 A1   Dec. 13, 2012

Related U.S. Application Data

(60) Provisional application No. 61/494,924, filed on Jun. 9, 2011.

(51) Int. Cl.
| | | |
|---|---|---|
| C04B 41/50 | (2006.01) | |
| D06M 15/643 | (2006.01) | |
| C07F 7/18 | (2006.01) | |
| C04B 41/49 | (2006.01) | |
| C01B 33/145 | (2006.01) | |
| C01B 33/16 | (2006.01) | |
| C09D 5/16 | (2006.01) | |

(52) U.S. Cl.
CPC ............. *C01B 33/145* (2013.01); *C01B 33/16* (2013.01); *C09D 5/1675* (2013.01); *C09D 5/1681* (2013.01)

(58) Field of Classification Search
USPC ............. 106/287.11, 287.1, 287.13, 287.14
See application file for complete search history.

(56) References Cited

U.S. PATENT DOCUMENTS 6,313,193 B1 * 11/2001 Simendinger, III ........... 523/122
2012/0021232 A1 * 1/2012 Hack et al. ................... 428/447

* cited by examiner

*Primary Examiner* — James McDonough
(74) *Attorney, Agent, or Firm* — Hodgson Russ LLP

(57) ABSTRACT

A xerogel film exhibiting antifouling properties. The films are made using long-chain alkyltrialkoxysilanes, short-chain alkyltrialkoxysilanes, aminoalkyltrialkoxysilanes, alkylaminoalkyltrialkoxysilanes, dialkylaminoalkyltrialkoxysilanes, and perfluororalkyltrialkoxysilanes as sol-gel precursors. The films can be used as coatings on surfaces to reduce or eliminate fouling resulting from attachment and/or growth of biofoulants such as algae, diatoms, bacteria, barnacles, and biofilms.

20 Claims, 15 Drawing Sheets

ANTI-FOULING COATING COMPOSITIONS AND METHODS FOR PREVENTING THE FOULING OF SURFACES

CROSS-REFERENCE TO RELATED APPLICATIONS

This application claims priority to U.S. provisional patent application No. 61/494,924, filed Jun. 9, 2011, the disclosure of which is incorporated herein by reference.

STATEMENT REGARDING FEDERALLY SPONSORED RESEARCH

This invention was made with government support under grant no. N00014-09-1-0217 awarded by the Office of Naval Research. The government has certain rights in the invention.

FIELD OF THE INVENTION

The present invention generally relates to antifouling sol-gel films. More particularly, the invention relates to ORMASIL (organically modified silica) antifouling films.

BACKGROUND OF THE INVENTION

Biofouling on ships' hulls is a significant problem worldwide causing an increase in fuel consumption due to drag as well as mediating the spread of non-indigenous species. The economic impact of biofouling has been estimated to be $56M per year ($1 B over 15 years) for a single class of naval vessel. Biocides have been used in the past to combat biofouling, but the use of biocides in antifouling (AF) paints is becoming increasingly restricted.

The settlement of barnacle cyprids and algal zoospores is highly correlated with surface energies and surface wettabilities as is the removal of algal (Ulva) sporelings (young plants) and adhered diatoms. For example, cypris larvae of *B. Amphitrite* prefer to settle on surfaces with high wettability and high surface energy while algal zoospores prefer to settle on hydrophobic surfaces with low surface energy. Algal sporelings are more readily removed from surfaces with high wettability and high surface energy while diatoms are more readily removed from surfaces with high wettability and high surface energy. The adhesion of proteins to the xerogel surfaces follows the "Baier curve" with higher adhesion at both low and high surface energies and minimal adhesion near a critical surface tension, $\gamma_C$, of 20 to 25 mN m$^{-1}$. NATURE in her diversity has created a situation where no previous single surface can have appropriate wettability/surface energy to prevent and/or release micro- and macrofouling of all types.

BRIEF SUMMARY OF THE INVENTION

The present invention provides sol-gel matrix surface coatings (also referred to as ORMASIL films). The present invention also provides methods of preventing fouling of surfaces subjected to an aqueous environment using the coatings of the present invention. The organically-modified, hybrid xerogel coatings of the present invention have been shown to possess antifouling and fouling release characteristics.

Fluoroalkane functionality can be incorporated within the xerogel coatings using the sol-gel process. Mixed alkane and perfluoroalkane modifications can be incorporated from appropriate perfluoroalkyl- and alkyltrialkoxysilane precursors.

In an aspect, the present invention provides sol-gel matrix based surface coatings. The sol-gel matrix is a sol-gel processed xerogel film formed from a sol-gel processed coating precursor (e.g., long-chain alkyltrialkoxysilanes, short-chain alkyltrialkoxysilanes, aminoalkyltrialkoxysilanes, alkylaminoalkyltrialkoxysilanes, dialkylaminoalkyltrialkoxysilanes, and perfluororalkyltrialkoxysilanes) composition. The surface coatings have anti-fouling properties. The coatings are three- or four-component ORMASIL (organically modified silica) xerogel films (also referred to herein as hybrid films). The xerogel films can be formed by sol-gel methods, such as the methods disclosed herein. In an embodiment, an anti-fouling surface coating composition comprises a sol-gel matrix. The precursor composition comprises three or four sol-gel precursor components.

In another aspect, the present invention provides methods for preventing fouling of surfaces subjected to a aqueous environments. The methods can prevent fouling by reducing (or completely preventing) the attachment or growth of biofoulants on a surface.

DETAILED DESCRIPTION OF THE INVENTION

Figure 1:
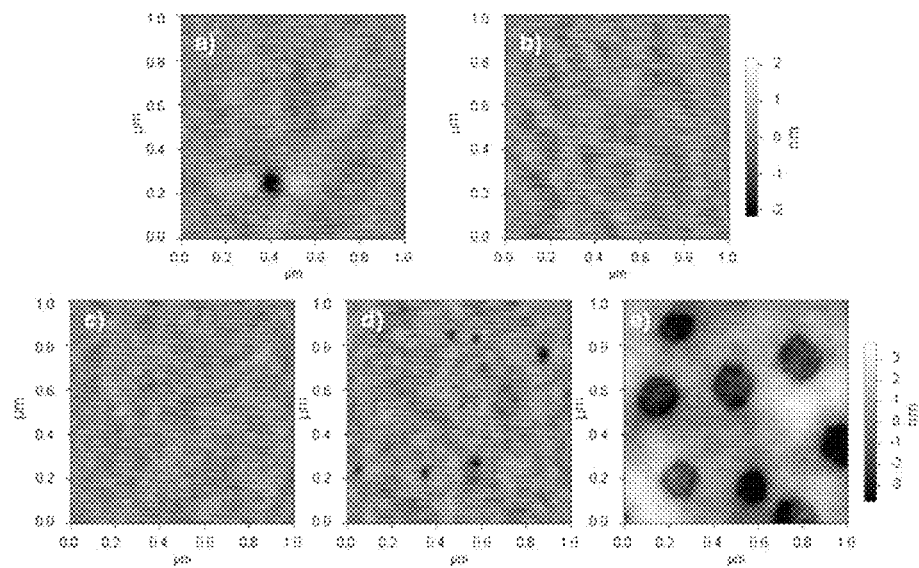
FIG. 1. Representative AFM images of a) 50:50 C8/TEOS, b) 4:46:50 C18/C8/TEOS, c) 3:47:50 C18/C8/TEOS, d) 2:48:50 C18/C8/TEOS, and e) 1:49:50 C18/C8/TEOS xerogel surfaces in artificial seawater.

The present invention provides sol-gel matrix surface coatings. The present invention also provides methods of preventing fouling of surfaces subjected to an aqueous environment using the coatings of the present invention.

Alkyl group as used herein, unless otherwise expressly stated, refers to branched or unbranched saturated hydrocarbons. Examples of alkyl groups include methyl groups, ethyl groups, n-propyl groups, i-propyl groups, n-butyl groups, i-butyl groups, s-butyl groups, pentyl groups, hexyl groups, octyl groups, nonyl groups, and decyl groups and octadecyl groups. The alkyl group can be unsubstituted or substituted with groups such as halides (—F, —Cl, —Br, and—I), alkenes, alkynes, aliphatic groups, aryl groups, alkoxides, carboxylates, carboxylic acids, and ether groups. For example, the alkyl group can be perfluorinated.

Alkoxy group as used herein, unless otherwise expressly stated, refers to—OR groups, where R is an alkyl group as defined herein. Examples of alkyoxy groups include methoxy groups, ethoxy groups, n-propoxy groups, i-propoxy groups, n-butoxy groups, i-butoxy groups, and s-butoxy groups.

The organically-modified, hybrid xerogel coatings of the present invention have been shown to possess antifouling and fouling release characteristics. The xerogel surfaces are inexpensive and robust, have desirable surface roughness/topography, and cover a range of wettabilities (e.g., 35 to 105°, as measured by the static water contact angle, $\theta_{WS}$) and surface energies (e.g., 21 to 55 mN m$^{-1}$).

Fluoroalkane functionality can be incorporated within the xerogel coatings using the sol-gel process. Mixed alkane and perfluoroalkane modifications can be incorporated from appropriate perfluoroalkyl- and alkyltrialkoxysilane precursors. Surface segregation into nm- and/or mm scale structural features on surfaces containing hydrocarbon and fluorocarbon functionality from xerogel coatings prepared from sol-gel precursors incorporating 1 mole % C18 and 1 to 24 mole % tridecafluorooctyltriethoxysilane (TDF) in combination with C8 and 50 mole % TEOS is shown. These coatings can have values of $\gamma_S$ outside the 20 to 25 mN m$^{-1}$ minimaladhesion zone of the Baier curve and behave as AF/FR (anti-fouling/fouling release) coatings.

For example, hybrid three-component xerogels made from combinations of 1,1,1-trifluoropropyltrimethoxysilane (TFP) with phenyltrimethoxysilane (PH), n-propyltrimethoxysilane (C3), or n-octyltriethoxysilane (C8) and with tetraethoxysilane (TEOS) as the third component gave uniformly smooth surfaces by time of flight—secondary ion mass spectrometry (ToF-SIMS), scanning electron microscopy (SEM), and atomic force microscopy (AFM). There was no phase segregation and no distinct topographical features were apparent with short-chain perfluoroalkyltrialkoxysilanes and short-chain (e.g., chains of 3 and 8 carbons) alkyltrialkoxysilanes.

The organically-modified, hybrid xerogel coatings have AF and FR characteristics. The xerogel materials have tunable surface energies (by selection of appropriate sol-gel precursors) and are thinner (1-10 μm) with higher elastic modulus than silicone films. For example, a xerogel surface incorporating 1 mole % of an n-octadecyltrimethoxysilane (C18) precursor in combination with n-octyltriethoxysilane (C8) and tetraethoxysilane (TEOS) released juvenile barnacles and sporelings of the macrofouling algae *Ulva linza* efficiently with performance comparable to that of a poly (dimethylsiloxane)elastomer standard. Other examples of xerogel surfaces incorporating 1:4:45:50 mole % and 1:14:35:50 mole %, respectively, of C18, tridecafluoro-1,1,2,2-tetrahydrooctyl-triethoxysilane (TDF), C8, and TEOS performed desirably with respect to the release of juvenile barnacles and *Ulva* sporelings. The xerogel surfaces are optically transparent and require no "tie" coat for bonding to a variety of substrates, which makes them viable AF/FR candidates for specialized applications on surfaces involved in optics, sensors, solar panels, and related applications.

For example, the incorporation of low levels (e.g., 1 to 5 mole %) of the long chain n-octadecyltriethoxysilane gave unexpected results with respect to surface topography and the separation of phases on the xerogel surfaces. These surfaces were rougher (root-mean-square roughness>1 nm) and had chemically distinct phases as observed by IR microscopy and AFM. Biological properties that were unexpected included reduced settlement of fouling organisms and easier removal of fouling organisms relative to xerogel coatings lacking the 1 to 5 mole % long chain alkylsiloxane.

In an aspect, the present invention provides sol-gel matrix based surface coatings. The sol-gel matrix is a sol-gel processed xerogel film formed from a sol-gel processed precursor coating composition. The surface coatings have anti-fouling properties. The coatings are three- or four-component ORMASIL (organically modified silica) xerogel films (also referred to herein as hybrid films). The xerogel films can be formed by sol-gel methods, such as the methods disclosed herein.

In an embodiment, an anti-fouling surface coating composition comprises a sol-gel matrix. The precursor composition comprises three or four sol-gel precursor components. In another embodiment, the anti-fouling coating consists essentially of a sol-gel matrix and the compositions consists essentially of three sol-gel precursor components. In another embodiment, the anti-fouling coating consists essentially of a sol-gel matrix and the compositions consists essentially of four sol-gel precursor components. In yet another embodiment, the anti-fouling coating consists of a sol-gel matrix and the composition consists of three sol-gel precursor components. In yet another embodiment, the anti-fouling coating consists of a sol-gel matrix and the composition consists of four sol-gel precursor components.

In an embodiment, a first precursor component is a long-chain alkyltrialkoxysilane, a perfluoalkyltrialkoxysilane, or is selected from an aminoalkyltrialkyoxysilane, alkylaminoalkyltrialkoxysilane, and dialkylaminoalkyltrialkoxysilane. A second precursor component is a shorter-chain alkyltrialkoxysilane, or, if the first precursor component is an aminoalkyltrialkyoxysilane, alkylaminoalkyltrialkoxysilane, or dialkylaminoalkyltrialkoxysilane, then the second precursor is a long-chain alkyltrialkoxysilane. A third component is a tetraalkoxysilane.

In another embodiment, where the first component is a long-chain alkyltrialkoxysilane, the sol-gel processed composition further comprises a fourth component that is a perfluoroalkyltrialkoxysilane.

In an embodiment, the third precursor component makes up the remainder of the precursor composition.

In an embodiment, the three-component xerogel surface incorporates 0.25 mole % to 5.0 mole % of a long-chain alkyltrialkoxy silane (where long-chain refers to ten (10) or more carbons, such as, but not limited to, n-dodecyltriethoxysilane (C12) or n-octadecyltriethoxysilane (C18)) precursor in combination with 20 mole % to 55 mole % of a shorter-chain alkyltrialkoxysilane (such as, but not limited to, n-propyltrimethoxysilane (C3) or n-octyltriethoxysilane (C8)) and a tetraalkoxysilane (such as, but not limited to, tetramethoxysilane (TMOS), tetraethoxysilane (TEOS), or tetraisopropoxysilane (TIPOS)).

In embodiment, 1 mole % to 45 mole % of a long-chain perfluoroalkyltrialkoxysilane (where long-chain refers to eight (8) or more carbons such as, but not limited to, tridecafluorooctyltriethoxysilane (TDF) or tridecafluorooctyltrimethoxysilane) in combination with 20 mole % to 55 mole % of a shorter-chain alkyltrialkoxysilane (such as, but not limited to, n-propyltrimethoxysilane (C3) or n-octyltriethoxysilane (C8)) and a tetraalkoxysilane (such as, but not limited to, tetramethoxysilane (TMOS), tetraethoxysilane (TEOS), or tetraisopropoxysilane (TIPOS)) are incorporated in the surface.

In an embodiment, 1 mole % to 20 mole % of an aminoalkyl-, alkylaminoalkyl-, or dialkylaminoalkyltrialkoxysilane (such as, but not limited to, aminopropyltriethoxysilane (AP), methylaminopropyltriethoxysilane (MAP), or dimethylaminopropyltriethoxysilane (DMAP)) in combination with 1 mole % to 45 mole % of a long-chain perfluoroalkyltrialkoxysilane (where long-chain refers to eight (8) or more carbons such as, but not limited to, tridecafluorooctyltriethoxysilane (TDF) or tridecafluorooctyltrimethoxysilane) and a tetraalkoxysilane (such as, but not limited to, tetramethoxysilane (TMOS), tetraethoxysilane (TEOS), or tetraisopropoxysilane (TIPOS)) are incorporated in the surface.

In an embodiment, 1 mole % to 20 mole % of an aminoalkyl-, alkylaminoalkyl-, or dialkylaminoalkyltrialkoxysilane (such as, but not limited to, aminopropyltriethoxysilane (AP), methylaminopropyltriethoxysilane (MAP), or dimethylaminopropyltriethoxysilane (DMAP)) in combination with 1 mole % to 45 mole % of a longer-chain alkyltrialkoxysilane (where longer-chain refers to eight (8) or more carbons, such as, but not limited to, n-octyltriethoxysilane (C8), n-dodecyltriethoxysilane (C12), or n-octadecyltriethoxysilane (C18)) and a tetraalkoxysilane (such as, but not limited to, tetramethoxysilane (TMOS), tetraethoxysilane (TEOS), or tetraisopropoxysilane (TIPOS)) are incorporated in the surface.

The sol-gel precursors are long-chain alkyltrialkoxysilanes, short-chain alkyltrialkoxysilanes, aminoalkyltrialkoxysilanes, alkylaminoalkyltrialkoxysilanes, dialkylaminoalkyltrialkoxysilanes, and perfluororalkyltrialkoxysilanes. The sol-gel precursors can be obtained from commercial sources or synthesized by known methods.

The long-chain alkyltrialkoxysilane has a long-chain alkyl group and three alkoxy groups. The long-chain alkyltrialkoxysilane has the following structure:

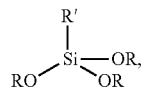

where, in this structure, R' is a long-chain alkyl group and R is an alkyl group of an alkoxy group. The long chain alkyl group is a $C_{10}$ to $C_{25}$, including all integer numbers of carbons and ranges therebetween, alkyl group. The alkoxy groups are, independently, $C_1$, C2, or $C_3$ alkoxy groups. The alkoxy groups can have the same number of carbons. The long-chain alkyltrialkoxysilane is present as a first component at from 0.25 mole % to 5.0 mole %, including all values to the 0.1 mole % and ranges therebetween, or as a second component at 1 mole % to 45 mole %, including all integer mole % values and ranges therebetween. Examples of suitable long-chain alkyltrialkoxysilanes include n-dodecyltriethoxysilane, n-octadecyltriethoxysilane, and n-decyltriethoxysilane.

The short-chain alkyltrialkoxysilane has the following structure:

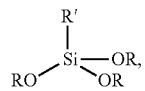

where, in this structure, R' is a short-chain alkyl group and R is an alkyl group of an alkoxy group. The short-chain alkyltrialkoxysilane has a short-chain alkyl group and three alkoxy groups. The short-chain alkyl group is a $C_3$ to $C_8$, including all integer numbers of carbons and ranges therebetween, alkyl group The alkoxy groups are, independently, $C_1$, $C_2$, or $C_3$ alkoxy groups. The alkoxy groups can have the same number of carbons. The short-chain alkyltrialkoxysilane is present at 20 mole % to 55 mole %, including all integer mole % values and ranges therebetween. Examples of suitable short-chain alkyltrialkoxysilanes include n-propyltrimethoxy silane, n-butyltriethoxysilane, n-pentyltriethoxysilane, n-hexyltriethoxysilane, n-heptyltriethoxysilane, n-octyltriethoxysilane, and branched analogues thereof.

The aminoalkyltrialkoxysilane has an aminoalkyl group and three alkoxy groups. The aminoalkyltrialkoxysilane has the following structure:

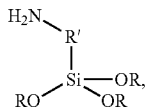

where, in this structure, R' is a an alkyl group of the aminoalkyl group and R is an alkyl group of an alkoxy group. The aminoalkyl group has a $C_1$ to $C_{10}$, including all integer numbers of carbons and ranges therebetween, aminoalkyl group. The alkoxy groups are, independently, $C_1$, $C_2$, or $C_3$ alkoxy groups. The alkoxy groups can have the same number of carbons. The aminoalkyltrialkoxy silane is present at 1 mole % to 20 mole %, including all integer mole % values and ranges therebetween. Examples of suitable aminoalkyltrialkoxysilanes include aminomethyltriethoxysilane, aminoethyltriethoxysilane, aminopropyltriethoxysilane, aminobutyltriethoxysilane, aminopentyltriethoxysilane, and aminohexyltriethoxysilane.

The alkylaminoalkyltrialkylsilane has an alkylamino group, aminoalkyl group, and three alkoxy groups. The alkylaminoalkyltrialkoxysilane has the following structure:

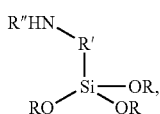

where, in this structure, R" is the alkyl group of the alkylamino group and R' is a the alkyl group of the alkylaminoalkyl group and R is an alkyl group of a alkoxy group. The aminoalkyl group has a $C_1$ to $C_{10}$, including all integer numbers of carbons and ranges therebetween, alkyl group. The aminoalkyl group has a $C_1$ to $C_{10}$, including all integer numbers of carbons and ranges therebetween, alkyl group. The alkoxy groups are, independently, $C_1$, C2, or $C_3$ alkoxy groups. The alkylaminoalkyltrialkoxysilane is present at 1 mole % to 20 mole %, including all integer mole % values and ranges therebetween. The alkoxy groups can have the same number of carbons. Examples of suitable alkylaminoalkyltrialkoxysilanes include methylaminoethyltriethoxysilane, methylaminopropyltriethoxysilane, methylaminobutyltriethoxysilane, methylaminopentyltriethoxysilane, methylaminohexyltriethoxysilane, and ethyl and propyl amino analogues thereof.

The dialkylaminoalkyltrialkoxysilane has the following structure:

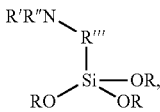

where, in this structure, R' and R" are each an alkyl group of the alkylamino group and R'" is the alkyl group of the dialkylaminoalkyl group and R is an alkyl group of a alkoxy group. The dialkylaminoalkyltrialkylsilane has a dialkylamino group, aminoalkyl group, and three alkoxy groups. The alkyl groups of the diaminoalkyl group are, independently, $C_1$ to $C_{10}$, including all integer numbers of carbons and ranges therebetween, alkyl groups. The dialkylamino alkyl groups can have the same number of carbons. The aminoalkyl group has a $C_1$ to $C_{10}$, including all integer numbers of carbons and ranges therebetween, alkyl group. The alkoxy groups are, independently, $C_1$, $C_2$, or $C_3$ alkoxy groups. The alkoxy groups can have the same number of carbons. The dialkylaminoalkyltrialkoxysilane is present at 1 mole % to 20 mole %, including all integer mole % values and ranges therebetween. Examples of suitable dialkylaminoalkyltrialkoxysilanes include dimethylaminoethyltriethoxysilane, dimethylaminopropyltriethoxysilane, dimethylaminobutyltriethoxysilane, dimethylaminopentyltriethoxysilane, dimethylaminohexyltriethoxysilane, and diethylamino and dipropylamino analogues thereof.

The perfluoroalkyltrialkoxysilane has the following structure:

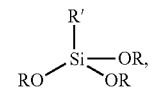

where, in this structure, R' is a perfluoroalkylalkyl group and R is an alkyl group of an alkoxy group. The perfluoroalkyltrialkoxysilane has a perfluoroalkyl group and three alkoxy groups. The pefluoroalkyl group is a $C_8$ to $C_{25}$, including all integer numbers of carbons and ranges therebetween, alkyl group. The alkoxy groups are, independently, $C_1$, $C_2$, or $C_3$ alkoxy groups. The alkoxy groups can have the same number of carbons. The perfluoroalkyltrialkoxysilane is present at 1 mole % to 45 mole %, including all integer mole values and ranges therebetween. Examples of suitable perfluoroalkyltrialkoxysilanes include tridecafluorooctadecyltriethoxysilane and tridecafluorooctyltrimethoxysilane.

The tetraalkoxysilane has the following structure:

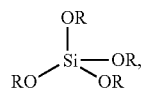

where, in this structure, R is an alkyl group of an alkoxy group.

The tetraalkoxysilane has four alkoxy groups. The alkoxy groups are, independently, $C_1$, $C_2$, or $C_3$ alkoxy groups. The alkoxy groups can have the same number of carbons. The tetraalkoxysilane is present at 1 mole % to 90 mole %, including all integer mole % values and ranges therebetween. Examples of suitable tetralkoxysilanes include tetramethoxysilane, tetraethoxysilane, and tetraisopropoxysilane.

The sol-gel matrix surface coatings comprise functional groups derived from the precursor silanes. For example, coatings formed using perfluoroalkyltrialkoxysilanes have perfluoroalkyl groups. The surface coatings also have residual silanol functional groups. The groups can be on the surface of the film or in the bulk matrix of the film.

The thickness of the sol-gel matrix surface coatings can be varied based on the deposition method and/or parameters of the deposition process (e.g., concentrations of the precursor components). For example, the film can have a thickness of 1 micron to 20 microns, including all integer thickness values and ranges therebetween.

The sol-gel matrix surface coatings have desirable properties. For example, the coatings have desirable wetting properties (which can be measured by, for example, contact angle) and surface roughness. In various examples, the contact angle of the film is greater than 95 degrees or greater than 100 degrees. For example, the contact angle of the coating is between 90 and 150 degrees, including all integer degree values and ranges thereof. For example, the surface roughness is greater than 1 nm. For example, the surface roughness is between 1 and 20 nm, including all values to the nm and ranges thereof.

The surface roughness can lead to topographical features, such as nanopores, as is observed with the 1:49:50 C18/C8/TEOS xerogel, while smooth or rough surfaces can have phase segregation of hydrocarbon, fluorocarbon and silicon oxide features as observed for 1:49:50 C18/C8/TEOS, 1:4:45:50 C18/TDF/C8/TEOS and 1:14:35:50 C18/TDF/C8/TEOS xerogels.

In an embodiment, an anti-fouling surface coating composition comprises a sol-gel matrix made by a method comprising the following steps: forming a precursor composition comprising three or four sol-gel precursor components, coating the precursor composition on a surface such that a sol-gel matrix film is formed on the surface.

Generally, the precursor composition (referred herein as a sol) is formed by combining three or four sol-gel precursor components and allowing the components to stand for a period of time such that a desired amount of hydrolysis and polymerization of the precurors occurs. This precursor composition is coated on a surface and surface allowed to stand for a period of time such that a xerogel film having is formed. The determination of specific reaction conditions (e.g., mixing times, standing times, acid/base concentration, solvent(s)) for forming the xerogel film is within the purview of one having skill in the art.

In another aspect, the present invention provides methods for preventing fouling of surfaces subjected to a aqueous environments. The methods can prevent fouling by reducing (or completely preventing) the attachment or growth of biofoulants on a surface.

Biofoulants are organisms that attach and grow on surfaces in aqueous environments. Examples of biofoulants include algae, diatoms, bacteria, barnacles, and biofilms.

Aqueous environments are any aqueous media in which biofoulants are, or may be, present. Examples of such aqueous environments include freshwater and saltwater environments. The aqueous environments can be naturally occurring or man made. Examples of aqueous environments include rivers, lakes, and oceans. Additional examples of aqueous environments include tanks of freshwater or saltwater.

The surface is any surface that can be contacted with an aqueous environment. The surfaces can be materials such as metals (such as marine grade aluminum), plastics, composites (such as fiberglass), glass, wood, or other natural fibers. Examples of suitable surfaces include surfaces of a water-borne vessel such as a boat, ship, personal watercraft, . . . , and surfaces of devices such as optics (e.g., underwater cameras), sensors (e.g., marine sensors), submersible solar panels, and related applications. Another example of a surface is the surface of a monitoring system of an underwater archaeological site.

In an embodiment, the method comprises the step of applying a coating of anti-fouling coating composition as described herein to at least a portion of a surface subjected to an aqueous environment such that such an ORMOSIL xerogel film is formed on the surface and the xerogel film prevents or reduces fouling of the surface.

The coating of anti-fouling coating composition can be applied by a variety of coating methods. Examples of suitable coating methods including spray coating, dip coating, brush coating, or spread coating.

The sol-gel matrix coating can be formed by acid-catalyzed hydrolysis and polymerization of the precursor components. In an embodiment, the antifouling precursor composition further comprises an acidic component that makes the pH of the composition sufficiently acidic so that the components undergo acid-catalyzed hydrolysis to form the sol-gel matrix. Examples of suitable acidic components include aqueous acids such as hydrochloric acid, hydrobromic acid and trifluoroacetic acid. Conditions and components required for acid-based hydrolysis of sol-gel components are known in the art.

After applying the coating of anti-fouling coating composition, the coating is allowed to stand for a time sufficient to form the sol-gel matrix. Depending on the thickness of the coating, the standing time is, for example, from 1 hour to 72 hours, including all integer numbers of hours and ranges therebetween.

By preventing fouling it is meant that the attachment or growth of organisms is completely eliminated (i.e., no growth or attachment is detectable by methods, such as optical or fluorescence methods known in the art). By reducing fouling it is meant that the attachment or growth of organisms is reduced by more than 70%, 80%, 90%, 95%, 96%, 97%, 98%, or 99%. For example, the reduction in fouling (e.g., fouling rating) can be measured by determining difference in the amount of biofoulant (e.g., the number of settled organisms) on xerogel coated and uncoated surfaces under the same conditions by optical or fluorescence methods. As another example, the reduction in fouling (e.g., fouling release) is determined by the difference in water pressure required to remove biofoulant (e.g., settled organisms) from a xerogel coated and non-xerogel coated surface under the same conditions.

The steps of the methods described in the various embodiments and examples disclosed herein are sufficient to practice the methods of the present invention. Thus, in an embodiment, the method consists essentially of a combination of the steps of a method disclosed herein. In another embodiment, the method consists of such steps.

The following examples are presented to illustrate the present invention. They are not intended to limiting in any manner.

Example 1

In this example, Three- and four-component, hybrid xerogel surfaces that have high contact angles (>95°) and that perform as foul-release surfaces are described.

Three-component Xerogels. Twenty-five (25) examples of three-component, hybrid xerogel surfaces incorporating the embodiments described above that perform as foul-release surfaces for the release of juvenile barnacles of *Balanus amphitrite* and/or 7-day old sporelings of the macrofouling alga *Ulva linza* are compiled in Table 1 as entries 9-33. In Table 1, entries 1-8 represent glass and PDMSE standards (entries 1 and 2, respectively), examples of two-component hybrid xerogels containing short-chain alkyl groups (entries 3 and 4), short-chain perfluoroalkyl groups (entry 5), long-chain perfluoroalkyl groups (entries 6 and 7), and a dialkylaminoalkyl group (entry 8) in combination with a tetraalkoxysilane (TEOS).

TABLE 1

Fouling-release Performance of Three-component, Hybrid Xerogel Surfaces Incorporating Aminoalkyltrialkoxysilanes and/or Long-chain Perfluoroalkyltrialkoxysilanes and/or Long-chain Alklytrialkoxysilanes.

| | | | | Ulva Sporeling Removal | Barnacle Removal - Complete and Partial | | |
|---|---|---|---|---|---|---|---|
| entry | Sample (mole-% of each component) | $\theta_{W_s}$,[a] ° | Surface Roughness,[b] nm | Water Pressure,[c] kPa | Complete Removal/n (% Removal)[d] | CRS,[e] N mm$^{-2}$ | BPR,[f] % (n) |
| 1 | glass | 21 ± 1 | — | >110 | 0/12 (0) | NA | 100 |
| 2 | PDMSE | 109[c] | — | 69 | 13/15 (87) | 0.18 ± 0.02 | 2 ± 1 (2) |
| 3 | 50:50 C8/TEOS | 104 ± 2 | 0.24 ± 0.02 | 75 | 0/21 (0) | NA | 98 ± 2 (21) |

TABLE 1-continued

Fouling-release Performance of Three-component, Hybrid Xerogel Surfaces
Incorporating Aminoalkyltrialkoxysilanes and/or Long-chain Perfluoroalkyltrialkoxysilanes
and/or Long-chain Alklytrialkoxysilanes.

| entry | Sample (mole-% of each component) | $\theta_{W_s}$,[a] ° | Surface Roughness,[b] nm | Water Pressure,[c] kPa | Ulva Sporeling Removal Complete Removal/n (% Removal)[d] | Barnacle Removal - Complete and Partial CRS,[e] N mm$^{-2}$ | BPR,[f] % (n) |
|---|---|---|---|---|---|---|---|
| 4 | 50:50 C3/TEOS | 99 ± 2 | — | 75 | 0/19 | NA | 98 ± 2 (19) |
| 5 | 50:50 TFP/TEOS | 85 ± 1 | — | >110 | 0/21 | NA | 99 ± 1 (21) |
| 6 | 10:90 TDF/TEOS | 112 ± 1 | — | 81 | 0/21 | NA | 93 ± 1 (21) |
| 7 | 20:80 TDF/TEOS | 109 ± 2 | — | 75 | 0/20 | NA | 87 ± 4 (20) |
| 8 | 10:90 DMAP/TEOS | 35 ± 1 | — | 90 | 0/15 | NA | 95 ± 5 (15) |
| 9 | 5:45:50 C18/C8/TEOS | 108.2 ± 0.9 | — | 90 | 0/13 (0) | NA | 62 ± 8 (13) |
| 10 | 4:46:50 C18/C8/TEOS | 105 ± 2 | 0.20 ± 0.01 | 75 | 4/15 (27) | 0.21 ± 0.02 | 46 ± 9 (11) |
| 11 | 3:47:50 C18/C8/TEOS | 102 ± 4 | 0.22 ± 0.02 | 91 | 0/20 (0) | NA | 42 ± 5 (20) |
| 12 | 2:48:50 C18/C8/TEOS | 108.3 ± 0.9 | 0.67 ± 0.03 | 72 | 7/21 (33) | 0.21 ± 0.02 | 33 ± 9 (14) |
| 13 | 1:49:50 C18/C8/TEOS | 111.2 ± 0.2 | 1.15 ± 0.04 | 67 | 15/19 (79) | 0.20 ± 0.02 | 8 ± 2 (4) |
| 14 | 10:40:50 TDF/C8/TEOS | 104 ± 3 | — | 72 | 4/20 (20) | 0.24 ± 0.02 | 26 ± 3 (20) |
| 15 | 20:30:50 TDF/C8/TEOS | 104 ± 3 | — | 69 | 4/18 (22) | 0.22 ± 0.02 | 27 ± 4 (18) |
| 16 | 30:20:50 TDF/C8/TEOS | 102 ± 2 | — | 70 | 4/19 (21) | 0.19 ± 0.02 | 36 ± 5 (19) |
| 17 | 40:10:50 TDF/C8/TEOS | 103 ± 4 | — | 68 | 1/19 (5) | 0.26[g] | 41 ± 3 (19) |
| 18 | 1:49:50 DMAP/TDF/TEOS | 108 ± 1 | — | 65 | 0/21 | NA | 75 ± 1 (21) |
| 19 | 2:48:50 DMAP/TDF/TEOS | 104 ± 2 | — | 67 | 0/21 | NA | 75 ± 1 (21) |
| 20 | 3:47:50 DMAP/TDF/TEOS | 105 ± 1 | — | 67 | 0/20 | NA | 77 ± 4 (20) |
| 21 | 4:46:50 DMAP/TDF/TEOS | 112 ± 1 | — | 65 | 0/15 | NA | 75 ± 5 (15) |
| 22 | 5:45:50 DMAP/TDF/TEOS | 113.5 ± 0.8 | — | 64 | 10/15 (67) | 0.19 ± 0.02 | 9 ± 2 (5) |
| 23 | 10:40:50 DMAP/TDF/TEOS | 113 ± 1 | — | 64 | 10/15 (67) | 0.20 ± 0.02 | 8 ± 2 (5) |
| 24 | 0.5:49.5:50 DMAP/C8/TEOS | 102 ± 1 | — | — | 1/6 (17) | 0.23[g] | 18 ± 4 (5) |
| 25 | 1.0:49.0:50 DMAP/C8/TEOS | 97.6 ± 0.2 | — | 50 | 10/25 (40) | 0.22 ± 0.02 | 13 ± 3 (15) |
| 26 | 1.5:48.5:50 DMAP/C8/TEOS | 96.7 ± 0.3 | — | — | 9/16 (57) | 0.21 ± 0.03 | 8 ± 3 (7) |
| 27 | 2.0:48.0:50 DMAP/C8/TEOS | 95.8 ± 0.2 | — | 60 | 11/17 (65) | 0.22 ± 0.02 | 4 ± 3 (6) |
| 28 | 1:49:50 C18/TDF/TEOS | 97 ± 1 | — | — | 4/20 (20) | 0.22 ± 0.03 | 19 ± 6 (16) |
| 29 | 2:48:50 C12/C8/TEOS | 108 ± 1 | — | — | 3/10 (30) | 0.22 ± 0.02 | 34 ± 6 (7) |
| 30 | 4:46:50 C12/C8/TEOS | 104 ± 2 | — | — | 7/20 (35) | 0.21 ± 0.03 | 22 ± 3 (13) |
| 31 | 5:45:50 C12/C8/TEOS | 105 ± 1 | — | — | 6/16 (38) | 0.19 ± 0.02 | 16 ± 4 (10) |
| 32 | 10:40:50 C12/C8/TEOS | 112 ± 1 | — | — | 7/20 (35) | 0.19 ± 0.01 | 15 ± 3 (13) |
| 33 | 20:30:50 C12/C8/TEOS | 113 ± 1 | — | — | 7/20 (35) | 0.20 ± 0.02 | 23 ± 6 (13) |

[a]Mean of five (5) independent measurements for coatings stored in air prior to measurement. ± one standard deviation.
[b]Average of five (5) replicate measurements. ± one standard deviation.
[c]Approximate surface water pressure (kPa) to give 50 percent removal of 7-day old sporelings from xerogel coatings and glass and PDMSE standards.
[d]Number of juvenile barnacles completely removed with n as the total number of barnacles removed.
[e]Average critical removal stress (CRS); ± standard error of the mean.
[f]Average percentage of basal plate remaining after barnacle removal where n - CR (complete removal) is the number of barnacles leaving behind a partial base plate; ± standard error of the mean.
[g]Single point datum.

Many of the surfaces are compared in Table 1 with respect to the water pressure required to remove 50% of 7-day-old *Ulva* sporeling growth and all of the surfaces in Table 1 are compared for the removal of juvenile barnacles of *B. Amphitrite*. For sporeling removal, PDMSE, a comparative example, is an industry standard and gave 50% removal with a water pressure of 69 kPa. The two-component xerogel surfaces in comparative example entries 3-8 gave 50% sporeling removal with a range of pressures from 75 kPa to >110 kPa. With respect to barnacle removal, three values are important: 1) the percentage of barnacles removed completely (i.e., no base plate remaining), 2) the critical removal stress (CRS) to remove the intact barnacle, and 3) for those barnacles that were not removed completely, the percentage of the basal plate remaining. PDMSE gave complete removal of 87% of the barnacles with an average CRS of 0.18 N mm$^{-2}$ and, for the barnacles not removed completely, an average of 2% of the basal plate remained. For the xerogel surfaces of entries 3-8 used as standards, none of the barnacles was removed intact and an average of >85% of the basal plate remained on all surfaces.

The three-component, hybrid xerogel surfaces of entries 9-33 of Table 1 incorporating long-chain perfluoroalkyltrialkoxysilanes and/or long-chain alklytrialkoxysilanes outperformed the xerogel surfaces of entries 3-8 as foul-release surfaces. With the exception of entries 9 and 11 (90 and 91 kPa, respectively), the pressures required for the 50% removal of *Ulva* sporelings from the xerogel surfaces were ≤75 kPa. Importantly, entries 13, 15, 17-23, 25, and 27 were comparable to or outperformed the PDMSE standard. For barnacle removal, all of the three-component xerogels (entries 9-33) outperformed the two-component xerogels (entries 3-8). For entries 9-33, the basal plate remaining was ≤75% for the barnacles not removed intact while for entries 3-8 left >85% of the basal plate. Entries 3-8 showed zero (0) barnacles removed intact while entries 10, 12-17, and 22-33 gave complete removal of some barnacles. The values of CRS for barnacles removed completely from these surfaces covered the range of 0.19-0.26 N mm$^{-2}$.

The 1:49:50 C18/C8/TEOS xerogel (entry 13 of Table 1) was statistically identical to the PDMSE standard (entry 2 of Table 1). Water pressures for the removal of 50% of 7-day-old sporeling growth were essentially identical (69 kPa for PDMSE and 67 kPa for 1:49:50 C18/C8/TEOS), comparable numbers of barnacles were removed intact from each surface (87% for PDMSE and 79% for 1:49:50 C18/C8/TEOS) with comparable values of CRS (0.18 N mm$^{-2}$ for PDMSE and 0.20 N mm$^{-2}$ for 1:49:50 C18/C8/TEOS).

Four-component Xerogels. The addition of a long-chain alkyl component to three-component xerogel formulations and found improved performance for the release of barnacles as shown in Table 2 was examined. Entries 14-17 of Table 1 show the performance of TDF/C8/TEOS xerogel formulations. The addition of 1 mole % C18 to these formulations as shown in entries 3-8 of Table 2 facilitated the release of barnacles as shown by an increase in the number of barnacles removed intact (30-100% vs. 5-20% for entries 14-17 of Table 1), a decrease in CRS for barnacle removal (0.12-0.24 N mm$^{-2}$ vs. 0.19-0.26 N mm$^{-2}$ for entries 14-17 of Table 1), and a decrease in the partial basal plate remaining on those barnacles not removed intact (0-12% vs. 26-41% for entries 14-17 of Table 1).

Similar results were found for the addition of 1 mole % C18 to the DMAP/C8/TEOS formulations as shown for entries 9-12 of Table 2. Entries 24-27 of Table 1 illustrate the performance of the DMAP/C8/TEOS xerogels. The addition of 1 mole % C18 to these formulations as shown in entries 9-12 of Table 2 facilitated the release of barnacles as shown by an increase in the number of barnacles removed intact (30-80% vs. 17-65% for entries 24-27 of Table 1).

Table 2), while similar to the PDMSE standard, displayed improved characteristics for barnacle removal with respect to at least one parameter: the number of barnacles removed intact from each surface (87% for PDMSE and 75-100% for the four-component xerogels), values of CRS (0.18 N mm$^{-2}$ for PDMSE and 0.12-0.16 N mm$^{-2}$ for the four-component xerogels), and the percentage of basal plate remaining from barnacles not removed intact (2% for PDMSE and 0-4% for the four-component xerogels).

Changes in Surface Topography. All of the three- and four-component, hybrid xerogel surfaces of Tables 1 and 2 have values of the static water contact angle ($\theta_{WS}$) that are ≥95°. The contact angle appears to be a critical indicator for the release of juvenile barnacles and *Ulva* sporelings. Another critical feature of the long-chain xerogel components is the introduction of topographical features on the nanoscale. FIG. 1 shows a comparison of the AFM images of the 50:50 C8/TEOS xerogel with various molar ratios of the C18/C8/TEOS xerogels. While the images of the 50:50 C8/TEOS, 4:46:50 C18/C8/TEOS, and 3:47:50 C18/C8/TEOS xerogel surfaces (panels a-c of FIG. 1, respectively) suggest a smooth surface, AFM images of the 2:48:50 C18/C8/TEOS and the

TABLE 2

Fouling-release Performance of Four-component, Hybrid Xerogel Surfaces Incorporating 1 mole % of C18 with various concentrations of TDF or DMAP with C8 and 50 mole % TEOS.

| | | | Barnacle Removal - Complete and Partial | | |
|---|---|---|---|---|---|
| entry | Sample (mole-% of each component) | $\theta_{WS}$,[a] ° | Complete Removal/n (% Removal)[b] | CRS,[c] N mm$^{-2}$ | BPR,[d] % (n-CR) |
| 1 | glass | 21 ± 1 | 0/12 (0) | NA | 100 |
| 2 | PDMSE | 109[e] | 13/15 (87) | 0.18 ± 0.02 | 2 ± 1 (2) |
| 3 | 1:1:48:50 C18/TDF/C8/TEOS | 113.2 ± 0.9 | 6/20 (30) | 0.24 ± 0.01 | 12 ± 5 (14) |
| 4 | 1:4:45:50 C18/TDF/C8/TEOS | 106.0 ± 0.2 | 13/13 (100) | 0.14 ± 0.02 | 0 (0) |
| 5 | 1:9:40:50 C18/TDF/C8/TEOS | 106 ± 1 | 9/12 (75) | 0.12 ± 0.01 | 4 ± 2 (3) |
| 6 | 1:14:35:50 C18/TDF/C8/TEOS | 106.1 ± 0.6 | 16/17 (94) | 0.12 ± 0.01 | 1 (1)[e] |
| 7 | 1:19:30:50 C18/TDF/C8/TEOS | 105 ± 1 | 11/16 (69) | 0.16 ± 0.03 | 5 ± 2 (5) |
| 8 | 1:24:2550 C18/TDF/C8/TEOS | 96.5 ± 0.3 | 17/20 (85) | 0.16 ± 0.03 | 3 ± 2 (3) |
| 9 | 0.5:1:48.5:50 DMAP/C18/C8/TEOS | 102 ± 1 | 12/15 (80) | 0.20 ± 0.02 | 12 ± 3 (3) |
| 10 | 1:1:48:50 DMAP/C18/C8/TEOS | 99 ± 1 | 5/12 (42) | 0.21 ± 0.02 | 12 ± 4 (7) |
| 11 | 1.5:1:47.5:50 DMAP/C18/C8/TEOS | 96.7 ± 0.3 | 7/10 (70) | 0.19 ± 0.02 | 3 ± 2 (3) |
| 12 | 2:1:47:50 DMAP/C18/C8/TEOS | 95.3 ± 0.2 | 3/10 (30) | 0.33 ± 0.04 | 15 ± 5 (7) |

[a]Mean of five (5) independent measurements for coatings stored in air prior to measurement. ± one standard deviation.
[b]Number of juvenile barnacles completely removed with n as the total number of barnacles removed.
[c]Average critical removal stress (CRS); ± standard error of the mean.
[d]Average percentage of basal plate remaining after barnacle removal where n-CR (complete removal) is the number of barnacles leaving behind a partial base plate; ± standard error of the mean.
[e]Single point datum.

Entries 1 and 2 are comparative examples.

Several of the xerogel formulations of Table 2 were comparable to the PDMSE standard: the 1:19:30:50 C18/TDF/C8/TEOS xerogel (entry 7), the 1:24:25:50 C18/TDF/C8/TEOS xerogel (entry 8), and the 0.5:1:48.5:50 DMAP/C18/C8/TEOS xerogel (entry 9 of Table 1) formed one group. These surfaces had comparable numbers of barnacles removed intact from each surface (87% for PDMSE and 69 to 85% for the four-component xerogels), comparable values of CRS (0.18 N mm$^{-2}$ for PDMSE and 0.16 to 0.20 N mm$^{-2}$ for the four-component xerogels), and comparable percentages for the percentage of basal plate remaining from barnacles not removed intact (2% for PDMSE and 3 to 12% for the four-component xerogels).

A second group of four-component xerogel surfaces, the 1:4:45:50 C18/TDF/C8/TEOS xerogel (entry 4 of Table 2), the 1:9:40:50 C18/TDF/C8/TEOS xerogel (entry 5 of Table 2) and the 1:14:35:50 C18/TDF/C8/TEOS xerogel (entry 6 of Table 2), while similar to the PDMSE standard, displayed improved characteristics for barnacle removal with respect to at least one parameter: the number of barnacles removed intact from each surface (87% for PDMSE and 75-100% for the four-component xerogels), values of CRS (0.18 N mm$^{-2}$ for PDMSE and 0.12-0.16 N mm$^{-2}$ for the four-component xerogels), and the percentage of basal plate remaining from barnacles not removed intact (2% for PDMSE and 0-4% for the four-component xerogels).

1:49:50 C18/C8/TEOS xerogel surfaces (panels d and e of FIG. 1, respectively) show a more porous surface. For the 1:49:50 C18/C8/TEOS xerogel surface, a pattern of 100-200-nm wide pores are present that are 3-7 nm deep. These topographical features were unexpected from the incorporation of low molar percentages of long-chain alkyl- and perfluoroalkyltrialkoxysilanes into the xerogel formulation.

Figure 2:
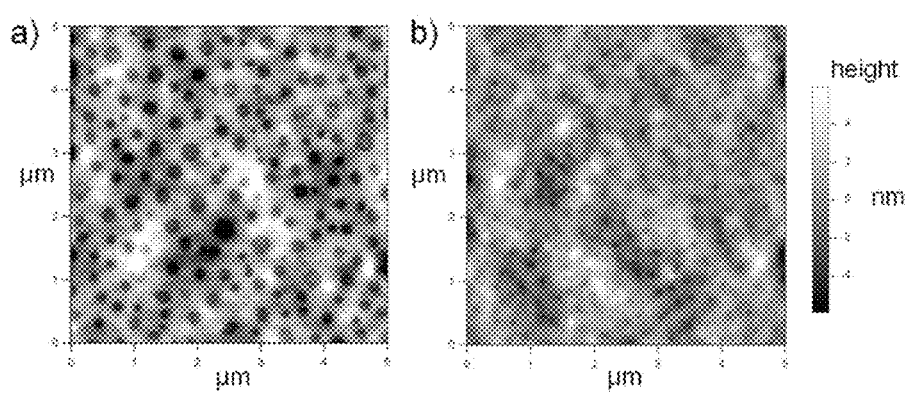
FIG. 2. Representative AFM height image of the 1:49:50 C18/C8/TEOS xerogel a) after immersion in ASW for 1 hour, rinsing with distilled water, and air drying for 2-hours and b) after immersion in ASW for 48 hours and imaging in ASW. Image sizes: 5×5 μm. Z-range: ±5 nm.

FIG. 2 shows a 5 μm×5 μm area of the 1:49:50 C18/C8/TEOS xerogel imaged either in the air (FIG. 2a) or under artificial seawater (ASW) following immersion in ASW for 48 hours (FIG. 2b). The nanopores on the order of 100-200 nm across and 3-7 nm deep are apparent in FIG. 2a. After equilibration with ASW, the AFM images of the 1:49:50 C18/C8/TEOS xerogel surface (FIG. 2b) still show the presence of nanopores (although of smaller diameter, perhaps due to swelling of the surface upon exposure to water) but also clearly show a regular pattern of 2-3 μm features ±2-3 nm in height/depth. These structural features have not been observed in other two-component xerogel formulations that were examined or in three-component xerogel formulations incorporating shorter alkyl and perfluoroalkyl chains.

Figure 3:
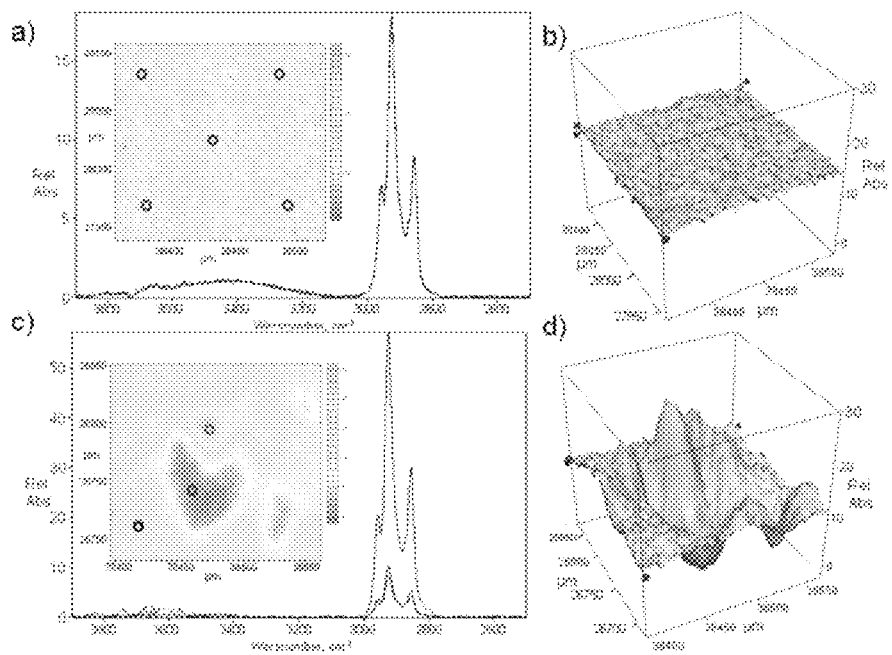
FIG. 3. Representative imaging transmission IR microscopy results for the 50:50 C8/TEOS xerogel (Panels a, b) and 1:49:50 C18/C8/TEOS xerogel (Panels c, d) films. Panels b and d show 3-D profiles for 150 μm×150 μm regions of each xerogel integrating the IR signal between 2800 cm$^{-1}$ and 3000 cm$^{-1}$ (hydrocarbon region). Panels a and c illustrate the extracted spectra from those regions marked on the contour plot insets. The contour plot insets in Panels a and c correspond to the 3-D plots in Panels b and d, respectively.

FIG. 3 presents IR microscopy images of the 50:50 C8/TEOS (panels a and b) and 1:49:50 C18/C8/TEOS (panel c and d) xerogel films integrating the hydrocarbon region (2800-3000 cm$^{-1}$). The spatial resolution for the insets of panels a and c and panels b and d (150 μm×150 μm images) is 2.7 μm. FIG. 3a also shows the extracted IR spectra from five regions of the integrated image of the 50:50 C8/TEOS xerogel. FIG. 3c shows extracted IR spectra from three indicated regions of the integrated image of the 1:49:50 C18/C8/TEOS xerogel: the high-absorbance and low-absorbance regions as well as one from a "flat" region. Segregation of the more hydrophobic component (larger IR absorbance) in the 1:49:50 C18/C8/TEOS xerogel film is clearly indicated in FIGS. 3c and 3d. The sol gel process produces xerogels with residual silanol functionality (3200-3700 cm$^{-1}$; FIG. 3, panels a and b) which is uniformly distributed across the 50:50 C8/TEOS and 1:49:50 C18/C8/TEOS xerogel surfaces. However, the hydrocarbon signal is significantly more homogeneous across the 50:50 C8/TEOS sample in comparison to the 1:49:50 C18/C8/TEOS sample.

The incorporation of 1 to 5 mole % C18 in the C8/TEOS sol (a relatively small change in formulation) dramatically impacted the distribution of chemical functionality on the xerogel surface (from transmission IR microscopy images) and the surface topography (AFM studies). The IR images of the 50:50 C8/TEOS and 1:49:50 C18/C8/TEOS xerogels films shown in FIG. 3 show that the hydrocarbon signal is significantly more homogeneous across the 50:50 C8/TEOS sample in comparison to the 1:49:50 C18/C8/TEOS sample, where some segregation of hydrocarbon components is clearly indicated. These IR images could represent clusters of smaller hydrocarbon-rich features/domains seen more clearly in the AFM images. In the AFM images of FIGS. 1 and 2a where the surfaces have been exposed to ASW for 1 hour and then were imaged in air, the addition of 1 and 2 mole % C18 to the sol formulation yielded xerogel surfaces characterized by the spontaneous formation of nanopores that are on the order of 100 to 200 nm across and 2 to 7 nm deep. After equilibration with ASW, the AFM images of the 1:49:50 C18/C8/TEOS xerogel surface (FIG. 2b) still show the presence of nanopores (although of smaller diameter, perhaps due to swelling of the surface upon exposure to water) but also clearly show a regular pattern of 2 to 3 μm features ±2 to 3 nm in height/depth. These structural features have not been observed in other xerogel formulations that have been examined.

Figure 4:
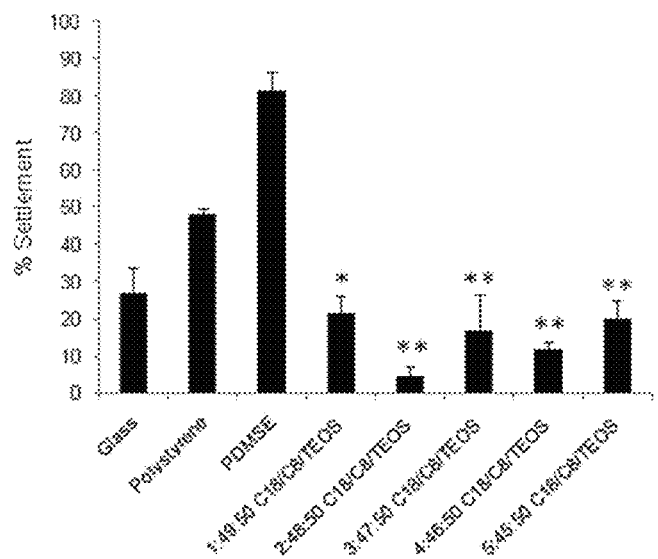
FIG. 4. Representative settlement of barnacle cypris larvae on xerogel coatings applied to glass dishes, polystyrene, and glass standards. Each value is the mean from three replicate measurements. Error bars represent the SE (standard error) of the mean. *=Values which are significantly lower than the polystyrene standard; **=values which are significantly lower than the glass and polystyrene standards. The average settlement from a drop assay onto PDMSE slides that were settled concurrently is also included as a control for metamorphic competence, but was not included in the statistical analysis due to the different assay type.

The numerical data for the comparison of xerogel surfaces containing 1 to 5 mole % C18 in the C8/TEOS sol, the 50:50 C8/TEOS xerogel and the PDMSE standard are compiled in Table 1. Graphical comparison of these surfaces is shown in FIG. 4 for the settlement of barnacle cyprids, in FIG. 5 for the percentage removal of barnacles and the percentage of the basal plate remaining, in FIG. 6 for the settlement of zoospores of the macrofouling algae *Ulva linza*, and in FIG. 7 for the percentage removal of 7-day old sporeling growth of *Ulva linza*. Statistically significant reduced settlement of barnacle cyprids is observed for all five of the C18/C8/TEOS xerogels relative to the PDMSE and polystyrene standards. Statistically identical removal of barnacles is observed for the PDMSE standard and the 1:49:50 C18/C8/TEOS xerogel while the two-component 50:50 C8/TEOS xerogel gave no barnacle removal. The 3:47:50 C18/C8/TEOS xerogel showed statistically significant increased removal of 7-day old sporeling growth relative to the PDMSE standard and the two-component 50:50 C8/TEOS xerogel.

Figure 8:
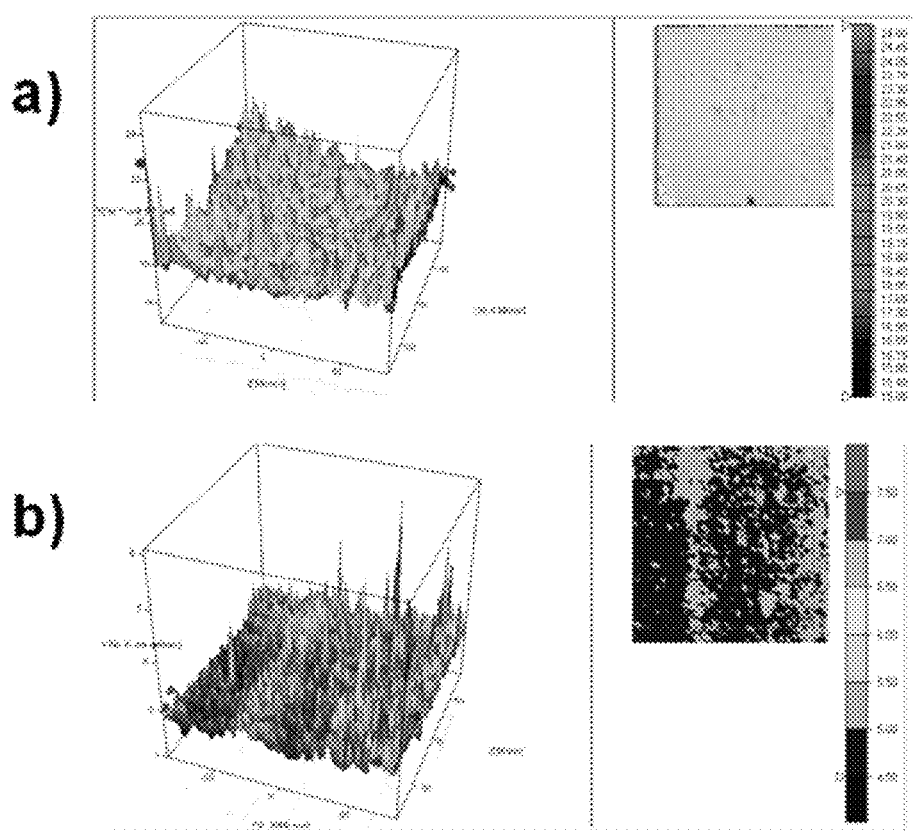
FIG. 8. Representative imaging transmission IR microscopy results for the 1:4:45:50 C18/TDF/C8/TEOS xerogel showing 3D profiles for the chemical topography for partial segregation of the hydrocarbon (panel a, 2800 to 3000 cm$^{-1}$) and fluorocarbon (panel b, 1225-1263 cm$^{-1}$) regions of a 150 μm×150 μm area of the coating. Fluorocarbon signal is more intense in regions where the hydrocarbon signal is weaker.
Figure 9:
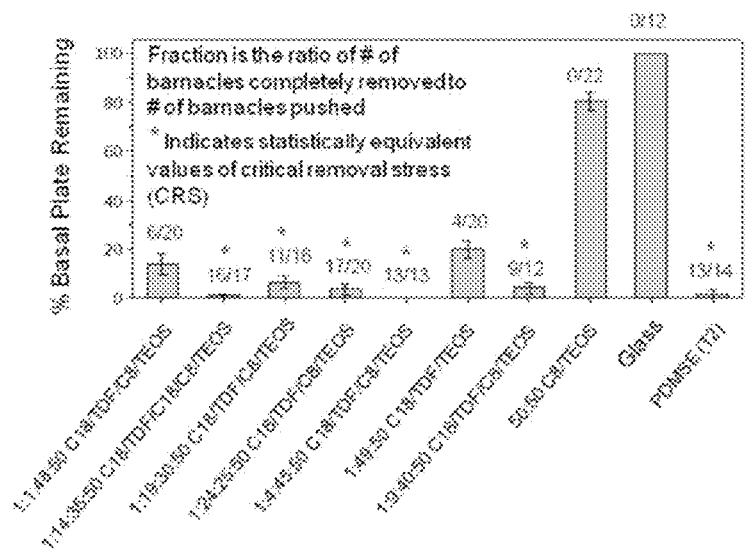
FIG. 9. Representative percentage barnacle basal plate remaining from those barnacles removed completely or incompletely (white bars, □). Fraction of total number of barnacles, n, removed in each group divided by the total number of barnacles pushed ($n_{tot}$), $n/n_{tot}$, is given above each bar. Statistically equivalent values of critical removal stress, CRS, are indicated by an *. Numerical values for all data for barnacles removed completely are given in Table 2. Error bars are the SE from the mean.

The segregation of chemical features into topographical features is also apparent in the four-component xerogels. As shown in FIG. 8, fluorocarbon and hydrocarbon regions of the coating can be identified as 40 to 50-μm features on the 1:4:45:50 C18/TDF/C8/TEOS four-component xerogel, which are larger scale features than observed on the 1:49:50 C18/C8/TEOS three-component xerogel. No such features were observed on the 50:50 C8/TEOS two-component xerogel surface. A graphical comparison of the removal of barnacles from the four-component C18/TDF/C8/TEOS xerogels with the PDMSE standard, the three-component 1:49:50 C18/TDF/TEOS xerogel and the 50:50 C8/TEOS two-component xerogel is shown in FIG. 9. All six of the four-component C18/TDF/C8/TEOS xerogels outperformed the three component 1:49:50 C18/TDF/TEOS xerogel and the two-component 50:50 C8/TEOS xerogel. The 1:4:45:50 and the 1:14:35:50 C18/TDF/C8/TEOS xerogels also outperformed the PDMSE standard.

Materials and Methods. Chemical Reagents. Deionized water was prepared to a specific resistivity of at least 18 MΩ using a Barnstead NANOpure Diamond UV ultrapure water system. Tetraethoxysilane or tetraethyl orthosilicate (TEOS), n-propyltrimethoxysilane (C3), n-octadecyltrimethoxysilane (C18), n-octyltriethoxy-silane (C8), 3,3,3-trifluoropropyltrimethoxysilane (TFP), tridecafluorooctyltriethoxysilane (TDF), 3-aminopropyltriethoxysilane (AP), methylaminopropyltriethoxysilane (MAP), and dimethylaminopropyltriethoxysilane were purchased from Gelest, Inc. and were used as received. Ethanol was purchased from Quantum Chemical Corp. Hydrochloric acid was obtained from Fisher Scientific Co. Borosilicate glass microscope slides were obtained from Fisher Scientific, Inc.

Sol Preparation. The sol/xerogel composition is designated in terms of the molar ratio of Si-containing precursors. Thus, a 50:50 C8/TEOS composition contains 50 mole % C8 and 50 mole % TEOS.

Sol TEOS. TEOS (3.96 g, 17.1 mmol, 3.35 mL), water (0.54 mL), ethanol (3.40 mL), and HCL (0.1 M, 15 μL) were stoppered in a glass vial and stirred at ambient temperature for 6 hours.

Sol AP. AP (2.544 g, mmol) was added dropwise to a stirred mixture of 6.67 M HCl (2.000 mL) and ethanol (10.56 ml). Once addition was complete the solution was mixed via sonication at ambient temperature for 40 min.

10:90 AP/TEOS. A mixture of sol TEOS (3.353 mL) and sol AP (1.000 mL) was sonicated for 20 min at ambient temperature.

10:90 TMAP/TEOS. A mixture of TEOS (2.4 g, 64.1 mmol), TMAP (0.50 g, 1.2 mmol), water (1.8 mL), ethanol (3.0 mL), and 12 M HCl (5.2 μL) was stirred at ambient temperature for 12 hours.

Sol DMAP. DMAP (1.054 g, 4.827 mmol) was added dropwise to a mixture of 6.67 M HCl (0.955 mL) and ethanol (4.668 mL). The resulting solution was stirred at ambient temperature for 40 min.

10:90 DMAP/TEOS. Sol DMAP (5.11 ml, 3.68 mmol) was added dropwise to sol TEOS (16.2 ml, 33.1 mmol). The mixture was stirred at ambient temperature for 20 min.

Sol MAP. MAP (2.000 g, 10.34 mmol) was added dropwise to 6.67 M HCl (2.04 mL, 15 mmol) and ethanol (10.0 mL). The resulting solution was stirred at ambient temperature for 40 min.

10:90 MAP/TEOS. Sol MAP (5.013 ml, 3.68 mmol) was added dropwise to sol TEOS (16.2 mL, 33.1 mmol). The resulting mixture was stirred at ambient temperature for 20 min.

50:50 TFP/TEOS. A mixture of TEOS (1.82 g, 7.8 mmol), TFP (1.70 g, 7.8 mmol), $H_2O$ (0.563 ml, 31 mmol), and ethanol (3.5 ml, 60 mmol) was capped and sonicated at ambient temperature for 0.5 hour.

50:50 C3/TEOS. A mixture of C3 (2.0 g, 12.17 mmol), TEOS (2.53 g, 12.17 mmol), ethanol (4.0 mL), and 0.1 N HCl (2.1 mL, 0.21 mmol) was capped and stirred at ambient temperature for 8 hours.

25:25:50 TFP/C8/TEOS. A mixture of C8 (1.25 g, 4.5 mmol), TFP (1.0 g, 4.5 mmol), TEOS (1.8 g, 9.0 mmol), ethanol (3.0 mL), and 0.1 N HCl (1.6 mL, 0.16 mmol) was stirred at ambient temperature for 3 hours.

25:25:50 TFP/C3/TEOS. A mixture of C3 (0.93 g, 4.5 mmol), TFP (1.0 g, 4.5 mmol), TEOS (1.87 g, 9.0 mmol), ethanol (3.0 mL), and 0.1 N HCl (1.6 mL, 0.16 mmol) was stirred at ambient temperature for 3 hours.

50:50 C8/TEOS. A mixture of TEOS (2.70 g, 13 mmol), C8 (3.59 g, 13 mmol), ethanol (5.0 mL, 87 mmol) and 0.1 N HCl (1.6 mL, 0.16 mmol) was capped and stirred at ambient temperature for 24 hours.

5:45:50 C18/C8/TEOS. A mixture of C18 (0.269 g, 0.72 mmol, 0.305 mL), C8 (1.79 g, 6.48 mmol, 2.03 mL), TEOS (1.50 g, 7.20 mmol, 1.61 mL), 0.1 N HCl (0.91 mL, 0.09 mmol), and isopropanol (4.62 mL), was stirred at ambient temperature for 24 hours.

4:46:50 C18/C8/TEOS. A mixture of C18 (0.215 g, 0.58 mmol, 0.244 mL), C8 (1.83 g, 6.62 mmol, 2.08 mL), TEOS (1.50 g, 7.20 mmol, 1.61 mL), 0.1 N HCl (0.91 mL, 0.09 mmol), and isopropanol (4.62 mL), was stirred at ambient temperature for 24 hours.

3:47:50 C18/C8/TEOS. A mixture of C18 (0.161 g, 0.43 mmol, 0.183 mL), C8 (1.87 g, 6.77 mmol, 2.12 mL), TEOS (1.50 g, 7.20 mmol, 1.61 mL), 0.1 N HCl (0.91 mL, 0.09 mmol), and isopropanol (4.62 mL), was stirred at ambient temperature for 24 hours.

2:48:50 C18/C8/TEOS. A mixture of C18 (0.108 g, 0.29 mmol, 0.122 mL), C8 (1.91 g, 6.91 mmol, 2.17 mL), TEOS (1.50 g, 7.20 mmol, 1.61 mL), 0.1 N HCl (0.91 mL, 0.09 mmol), and isopropanol (4.62 mL), was stirred at ambient temperature for 24 hours.

1:49:50 C18/C8/TEOS. A mixture of C18 (0.054 g, 0.14 mmol, 0.061 mL), C8 (1.95 g, 7.06 mmol, 2.21 mL), TEOS (1.50 g, 7.20 mmol, 1.61 mL), 0.1 N HCl (0.91 mL, 0.09 mmol), and isopropanol (4.62 mL), was stirred at ambient temperature for 24 hours.

10:90 TDF/TEOS. TDF (0.288 g, 0.533 mmol, 0.213 mL), and TEOS (1.0 g, 4.80 mmol, 1.07 mL) were mixed. Ethanol (1.77 mL), and HCl (0.288 mL, 0.1 M), were added and the resulting solution was stirred at ambient temperature for 24 hours. At this time a 0.400 mL aliquot was removed and spun cast onto a glass microscope slide.

20:80 TDF/TEOS. TDF (0.612 g, 1.2 mmol, 0.453 mL), and TEOS (1.07 g, 4.08 mmol) were mixed. Ethanol (2.0 mL), and HCl (0.583 mL, 0.1 M), were added and the resulting solution was stirred at ambient temperature for 24 hours. At this time a 0.400 mL aliquot was removed and spun cast onto a glass microscope slide.

10:40:50 TDF/C8/TEOS. C8 (1.06 g, 3.84 mmol, 1.21 mL), TDF (0.49 g, 0.96 mmol, 0.363 mL), and TEOS (1.0 g, 4.80 mmol, 1.07 mL) were mixed. Ethanol (3.2 mL), and HCl (0.52 mL, 0.1 M), were added and the resulting solution was stirred at ambient temperature for 24 hours. At this time a 0.400 mL aliquot was removed and spun cast onto a glass microscope slide.

20:30:50 TDF/C8/TEOS. C8 (0.79 g, 2.88 mmol, 0.90 mL), TDF (0.98 g, 1.92 mmol, 0.725 mL), and TEOS (1.0 g, 4.80 mmol, 1.07 mL) were mixed. Ethanol (3.2 mL), and HCl (0.52 mL, 0.1 M), were added and the resulting solution was stirred at ambient temperature for 24 hours. At this time a 0.400 mL aliquot was removed and spun cast onto a glass microscope slide.

30:20:50 TDF/C8/TEOS. C8 (0.53 g, 1.92 mmol, 0.60 mL), TDF (1.47 g, 2.88 mmol, 1.08 mL), and TEOS (1.0 g, 4.80 mmol, 1.07 mL) were mixed. Ethanol (3.2 mL), and HCl (0.52 mL, 0.1 M), were added and the resulting solution was stirred at ambient temperature for 24 hours. At this time a 0.400 mL aliquot was removed and spun cast onto a glass microscope slide.

40:20:50 TDF/C8/TEOS. C8 (0.26 g, 0.26 mmol, 0.26 mL), TDF (1.96 g, 3.84 mmol, 1.45 mL), and TEOS (1.0 g, 4.80 mmol, 1.07 mL) were mixed. Ethanol (3.2 mL), and HCl (0.52 mL, 0.1 M), were added and the resulting solution was stirred at ambient temperature for 24 hours. At this time a 0.400 mL aliquot was removed and spun cast onto a glass microscope slide.

5:5:90 DMAP/TDF/TEOS. Sol DMAP (2.489 ml, 1.792 mmol) was added dropwise to a stirring solution of TDF (0.915 g, 1.792 mmol), TEOS (6.72 g, 32.26 mmol), ethanol (5.039 ml), and 0.1M HCl (2.517 ml). The resulting mixture was stirred at ambient temperature for 24 hours.

2:48:50 C12/C8/TEOS. C12 (0.214 g, 0.72 mmol), C8 (5.04 g, 17.3 mmol), TEOS (3.750 g, 18.0 mmol), and isopropanol (11.55 mL) were mixed together followed by the addition of 0.1 M HCl (2.268 mL). The resulting solution was stirred at ambient temperature for 24 hours.

4:46:50 C12/C8/TEOS. C12 (0.418 g, 1.44 mmol), C8 (4.579 g, 16.56 mmol), TEOS (3.750 g, 18.0 mmol), and isopropanol (11.55 mL) were mixed together followed by the addition of 0.1 M HCl (2.268 mL). The resulting solution was stirred at ambient temperature for 24 hours.

5:45:50 C12/C8/TEOS. C12 (0.523 g, 1.80 mmol), C8 (4.35 g, 12.4 mmol), TEOS (3.750 g, 18.0 mmol), and isopropanol (11.55 mL) were mixed together followed by the addition of 0.1 M HCl (2.268 mL). The resulting solution was stirred at ambient temperature for 24 hours.

10:40:50 C12/C8/TEOS. C12 (1.046 g, 3.60 mmol), C8 (3.981 g, 14.40 mmol), TEOS (3.750 g, 18.0 mmol), and isopropanol (11.55 mL) were mixed together followed by the addition of 0.1 M HCl (2.268 mL). The resulting solution was stirred at ambient temperature for 24 hours.

20:30:50 C12/C8/TEOS. C12 (2.092 g, 7.20 mmol), C8 (2.986 g, 10.80 mmol), TEOS (3.750 g, 18.0 mmol), and isopropanol (11.55 mL) were mixed together followed by the addition of 0.1 M HCl (2.268 mL). The resulting solution was stirred at ambient temperature for 24 hours.

1:49:50 C18/TDF/TEOS. C18 (0.135 g, 0.36 mmol), TDF (9.003 g, 17.64 mmol), TEOS (3.750 g, 18.0 mmol), and ethanol (10.90 mL) were mixed together followed by the addition of 0.1 M HCl (2.268 mL). The resulting solution was stirred at ambient temperature for 24 hours.

1:1:48:50 C18/TDF/C8/TEOS. C18 (0.135 g, 0.36 mmol), TDF (0.184 g, 0.36 mmol), C8 (3.750 g, 18.0 mmol), TEOS (3.750 g, 18.0 mmol), and ethanol (8.47 mL) were mixed together followed by the addition of 0.1 M HCl (2.268 mL). The resulting solution was stirred at ambient temperature for 24 hours.

1:4:45:50 C18/TDF/C8/TEOS. C18 (0.135 g, 0.36 mmol), TDF (0.735 g, 1.44 mmol), C8 (4.479 g, 16.2 mmol), TEOS (3.750 g, 18.0 mmol), and ethanol (11.9 mL) were mixed together followed by the addition of 0.1 M HCl (2.268 mL). The resulting solution was stirred at ambient temperature for 24 hours.

1:9:40:50 C18/TDF/C8/TEOS. C18 (0.135 g, 0.36 mmol), TDF (1.654 g, 3.24 mmol), C8 (3.981 g, 14.4 mmol), TEOS (3.750 g, 18.0 mmol), and ethanol (11.9 mL) were mixed together followed by the addition of 0.1 M HCl (2.268 mL). The resulting solution was stirred at ambient temperature for 24 hours.

1:14:35:50 C18/TDF/C8/TEOS. C18 (0.135 g, 0.36 mmol), TDF (2.572 g, 5.04 mmol), C8 (3.484 g, 12.6 mmol), TEOS (3.750 g, 18.0 mmol), and ethanol (11.46 mL) were mixed together followed by the addition of 0.1 M HCl (2.268 mL). The resulting solution was stirred at ambient temperature for 24 hours.

1:19:30:50 C18/TDF/C8/TEOS. C18 (0.135 g, 0.36 mmol), TDF (3.491 g, 6.84 mmol), C8 (2.986 g, 10.8 mmol), TEOS (3.750 g, 18.0 mmol), and ethanol (11.46 mL) were mixed together followed by the addition of 0.1 M HCl (2.268 mL). The resulting solution was stirred at ambient temperature for 24 hours.

1:24:25:50 C18/TDF/C8/TEOS. C18 (0.135 g, 0.36 mmol), TDF (4.410 g, 8.64 mmol), C8 (2.488 g, 9.0 mmol), TEOS (3.750 g, 18.0 mmol), and ethanol (11.46 mL) were mixed together followed by the addition of 0.1 M HCl (2.268 mL). The resulting solution was stirred at ambient temperature for 24 hours.

0.5:1:48.5:50 DMAP/C18/C8/TEOS. C18 (0.135 g, 0.36 mmol), C8 (4.828 g, 17.46 mmol), TEOS (3.750 g, 18.0 mmol), and ethanol (11.835 mL) were mixed together followed by the addition of 0.1 M HCl (2.268 mL). Sol DMAP (0.249 mL, 0.18 mmol) was then added and the resulting solution was stirred at ambient temperature for 24 hours.

Preparation of 1:1:48:50 DMAP/C18/C8/TEOS. C18 (0.135 g, 0.36 mmol), C8 (4.778 g, 17.28 mmol), TEOS (3.750 g, 18.0 mmol), and ethanol (11.64 mL) were mixed together followed by the addition of 0.1 M HCl (2.268 mL). Sol DMAP (0.499 mL, 0.36 mmol) was then added and the resulting solution was stirred at ambient temperature for 24 hours.

1.5:1:47.5:50 DMAP/C18/C8/TEOS. C18 (0.135 g, 0.36 mmol), C8 (4.728 g, 17.10 mmol), TEOS (3.750 g, 18.0 mmol), and ethanol (11.45 mL) were mixed together followed by the addition of 0.1 M HCl (2.268 mL). Sol DMAP (0.748 mL, 0.54 mmol) was then added and the resulting solution was stirred at ambient temperature for 24 hours.

2:1:47:50 DMAP/C18/C8/TEOS. C18 (0.135 g, 0.36 mmol), C8 (4.678 g, 16.92 mmol), TEOS (3.750 g, 18.0 mmol), and ethanol (11.26 mL) were mixed together followed by the addition of 0.1 M HCl (2.268 mL). Sol DMAP (0.997 mL, 0.723 M) was then added and the resulting solution was stirred at ambient temperature for 24 hours.

Xerogel Film Formation. Xerogel films were formed by spin casting 400 µL of the sol precursor onto 25-mm×75-mm glass microscope slides. The slides were soaked in piranha solution for 24 hours, rinsed with copious quantities of deionized water then soaked in isopropanol for 10 minutes, were air dried and stored at ambient temperature. A model P6700 spincoater was used at 100 rpm for 10 seconds to deliver the sol and at 3000 rpm for 30 seconds to coat. All coated surfaces were dried at ambient temperature for at least 7 days prior to analysis.

Atomic Force Microscopy (AFM) Imaging Measurements. In order to determine surface roughness, xerogel samples were imaged 1 hour after immersion in artificial seawater (ASW) using the Molecular Force Probe AFM (Asylum Research, Santa Barbara, Calif.). V-shaped, silicon nitride cantilevers (Asylum Research, Santa Barbara, Calif.) with a nominal spring constant of 100 pN/nm were used. AFM images in ASW were obtained in a mode where the cantilever is actuated magnetically (iDrive). A small oscillating current flows through the cantilever legs in the presence of a magnetic field causing it to vibrate. The iDrive mode simplifies in-fluid imaging by eliminating the multitude of resonance peaks mechanically coupled from the holder and fluid.

Barnacle Removal Assays. A 0.4 mL drop of seawater containing 20 to 40 barnacle cypris larvae was placed on the xerogel surface coated on glass microscope slides. The larvae are allowed to settle for 72 hours, or until the settlement rate on glass control surfaces reaches 50%. At this time, the number of barnacles that settle on each surface were counted, and compare the settlement rates on the experimental coatings with the settlement rates of controls.

Laboratory rearing of juvenile barnacles. Newly metamorphosed juveniles on their respective coatings were transferred to growth chambers where they were fed the unicellular green alga *Dunaliella* sp. and the diatom *Skeletonema costratum* for two weeks and then a mixture of *Dunaliella* sp., *S. costratum*, and naupliar larvae of *Artemia* sp. Juveniles were maintained in a constant temperature incubator at 25° C. on a 12 hours:12 hours light:dark cycle for 6-8 weeks, which is the time it took the juvenile barnacles to reach a basal plate diameter of 3-5 mm, the minimum size necessary to conduct force gauge tests according to ASTM D 5618.

Critical removal stress for barnacles in shear. The procedures for critical removal stress followed from ASTM D 5618 with the following modifications: (i) The force measuring device was operated by a motorized stand, thus insuring a constant application of force during dislodgement; and (ii) Barnacle dislodgement studies from coatings were performed under water. The apparatus consists of an IMADA AXT 70 digital force gauge (4.4 lb) mounted on an IMADA SV-5 motorized stand. The slides are clamped into a custom-built Plexiglas chamber that allows their complete submersion during dislodgement tests.

Juvenile barnacles were selected for testing based on healthy appearance and minimum size requirements. Only barnacles occurring at least 5 mm from the edges of the slide were tested. Other barnacles in close proximity to the test subject were removed if they could potentially interfere with measurements. The barnacle base dimensions were measured with calipers. The base diameter was measured in two directions perpendicular to one another. Basal area (A) was then estimated using the formula $A=\pi(0.5d_1)(0.5d_2)$, which is the area of an ellipse. After size measurements were taken, the slide was clamped into the Plexiglas chamber. The force gauge mounted on the motorized stand was used to apply a shear force to the base of the barnacles at a rate of approximately 4.5 N s$^{-1}$ (1 lb s$^{-1}$) until the organism was detached. Force was applied parallel to the film surface. The force required for detachment was noted and observations were made as to the mode of failure. If any portion of the base of the organism was left attached to the substratum, the test was deemed void for removal. The surfaces were examined visually for damage to the xerogel film caused by barnacle removal and by stereomicroscope if there were any ambiguity. The critical removal stress was calculated by dividing the force (F, Newtons) required to remove the test subject by the area of attachment (A, mm$^2$).

For barnacles where a portion of the base of the organism was left attached to the substratum, the remaining basal plate is photographed and the exact percentage remaining after testing (% BPR) is calculated with digital image analysis.

Biofouling Assays. Coatings applied to glass slides were equilibrated in circulating deionized water for 24 hours prior to the start of assays with algae. One hour prior to the assay the slides were transferred to ASW. Silastic® T2 (PDMSE) coated slides c. 500 µm in thickness, provided by Dr AB Brennan, University of Florida (Schumacher et al. 2007), were included in the assays to provide a standard fouling-release coating.

Settlement of Zoospores of *Ulva*. Fronds of *Ulva linza* were collected from Llantwit Major, Wales (51840'N; 3848'W) and a spore suspension of $1.5 \times 10^6$ spores $mL^{-1}$. Three replicate slides of each treatment were placed in individual wells of 'quadriperm' polystyrene culture dishes and 10 mL of spore suspension were added. Dishes were incubated in the dark for 1 hour at ~20° C. After incubation the slides were gently washed in ASW to remove unattached (swimming) spores.

After washing away unattached spores, spores that had attached to the test surfaces were cultured in dishes containing supplemented seawater medium that was changed every 2 days. The dishes were placed in an illuminated incubator (75 mmol $m^{-2}$ $s^{-1}$ incident irradiation) for 7 days during which time the spores germinated and developed into sporelings (young plants).

The biomass produced was quantified by measuring the fluorescence of chlorophyll in a Tecan fluorescence plate reader (excitation=430 nm, emission=670 nm). Fluorescence was measured as relative fluorescence units (RFU) and was directly proportional to the quantity of biomass present. The RFU value for each slide was the mean of 70 point fluorescence readings taken from the central region.

The strength of adhesion of the sporelings was determined by exposing the slides to a range of impact pressures from an automated water jet, which traversed the central region of each slide. One replicate slide of each coating was exposed to one of five impact pressures. Pressures were selected to provide the widest range of biomass removal possible. The biomass that remained in the sprayed area after exposure to the water jet was quantified as described above. Percentage removal of sporelings was determined by comparison of the biomass (RFU) before exposure with that remaining attached to the coatings after exposure to the water jet. The critical impact pressure to remove 50% of the biomass was determined from plots of percentage removal vs water impact pressure.

Example 2

This is an example of the preparation and characterization of xerogel films of the present invention.

This example provides preparation and characterization of four-component xerogel films of 1 mole % n-octadecyltrimethoxysilane (C18) and 50 mole % tetraethoxysilane (TEOS) in combination with 1-24 mole % tridecafluoro-1,1,2,2-tetrahydrooctyltriethoxysilane (TDF) and 25 to 48 mole % n-octyltriethoxysilane (C8) and a 1:49:50 mole % C18/TDF/TEOS. Settlement of barnacle cyprids and removal of juvenile barnacles, settlement of zoospores of the alga *Ulva linza*, and strength of attachment of 7-day sporelings (young plants) of *Ulva* were compared amongst the xerogel formulations. Several of the xerogel formulations were comparable to poly(dimethylsiloxane) elastomer with respect to removal of juvenile barnacles and removal of sporeling biomass. The 1:4:45:50 and 1:14:35:50 C18/TDF/C8/TEOS xerogels displayed some phase segregation by atomic force microscopy (AFM) pre- and post-immersion in water. Imaging reflectance infrared microscopy showed the formation of islands of alkane-rich and perfluoroalkane-rich regions in these same xerogels both pre- and post-immersion in water. Surface energies were unchanged upon immersion in water for 48 hours amongst the TDF-containing xerogel coatings. AFM measurements demonstrated that surface roughness on the 1:4:45:50 and 1:14:35:50 C18/TDF/C8/TEOS xerogel coatings decreased upon immersion in water.

Materials and Methods. Chemical Reagents and Materials. Deionized water was prepared to a specific resistivity of at least 18 MΩ using a Barnstead NANOpure Diamond UV ultrapure water system. Tetraethoxysilane (TEOS), n-octadecyl-trimethoxysilane (C18), tridecafluoro-1,1,2,2-tetrahydrooctyltriethoxysilane (TDF), and n-octyltriethoxysilane (C8) were purchased from Gelest, Inc. and were used as received. Ethanol was purchased from Quantum Chemical Corp. Hydrochloric acid and isopropanol were obtained from Fisher Scientific Co. Borosilicate glass microscope slides were obtained from Fisher Scientific, Inc. Silastic® T2 (Dow Corning) coated slides ca 500 µm in thickness, were provided by Dr. AB Brennan, University of Florida.

Sol Preparation. The sol/xerogel composition is designated in terms of the molar ratio of Si-containing precursors. Thus, a 50:50 C8/TEOS composition contains 50 mole % C8 and 50 mole % TEOS. In all of the sol preparations described below, the aqueous HCl was added last. Unless noted otherwise, all sols were capped and stirred at ambient temperature.

50:50 C8/TEOS. A mixture of TEOS (2.09 g, 2.24 mL, 10 mmol), C8 (2.78 g, 3.16 mL, 10 mmol), isopropanol (4.0 mL), and 0.100 M HCl (1.23 mL, 0.123 mmol) was capped and stirred for 24 hours. This sample, which did not contain TDF, served as a control xerogel surface.

1:1:48:50 C18/TDF/C8/TEOS. A mixture of C18 (0.135 g, 0.36 mmol), TDF (0.184 g, 0.36 mmol), C8 (4.78 g, 17.3 mmol), TEOS (3.75 g, 18.0 mmol), ethanol (8.47 mL), and 0.1 M HCl (2.27 mL), was stirred for 24 hours.

1:4:45:50 C18/TDF/C8/TEOS. A mixture of C18 (0.135 g, 0.36 mmol), TDF (0.735 g, 1.44 mmol), C8 (4.48 g, 16.2 mmol), TEOS (3.75 g, 18.0 mmol), ethanol (11.9 mL), and 0.1 M (2.27 mL) was stirred for 24 hours.

1:9:40:50 C18/TDF/C8/TEOS. A mixture of C18 (0.135 g, 0.36 mmol), TDF (1.65 g, 3.24 mmol), C8 (3.98 g, 14.4 mmol), TEOS (3.75 g, 18.0 mmol), ethanol (11.9 mL), and 0.1 M HCl (2.27 mL) was stirred for 24 hours.

1:14:35:50 C18/TDF/C8/TEOS. A mixture of C18 (0.135 g, 0.36 mmol), TDF (2.57 g, 5.04 mmol), C8 (3.48 g, 12.6 mmol), TEOS (3.75 g, 18.0 mmol), ethanol (11.5 mL) and 0.1 M HCl (2.27 mL) was stirred for 24 hours.

1:19:30:50 C18/TDF/C8/TEOS. A mixture of C18 (0.135 g, 0.36 mmol), TDF (3.49 g, 6.84 mmol), C8 (2.99 g, 10.8 mmol), TEOS (3.75 g, 18.0 mmol), ethanol (11.5 mL), and 0.1 M HCl (2.27 mL) was stirred for 24 hours.

1:24:25:50 C18/TDF/C8/TEOS. A mixture of C18 (0.135 g, 0.36 mmol), TDF (4.41 g, 8.64 mmol), C8 (2.49 g, 9.0 mmol), TEOS (3.75 g, 18.0 mmol), ethanol (11.5 mL), and 0.1 M HCl (2.27 mL) was stirred for 24 hours.

Xerogel Film Formation. Prior to use, glass microscope slides (25-mm×75-mm) were soaked in piranha solution for 24 hours, rinsed with copious quantities of deionized water, soaked in isopropanol for 10 min, air dried and stored at ambient temperature. Xerogel films were formed by spin casting 400 µL of the sol precursor onto the microscope slides. A model P6700 spincoater (Specialty Coatings Systems, Inc.) was used at 100 rpm for 10 seconds to deliver the sol and at 3000 rpm for 30 seconds to coat. Profilometry indicated that the xerogel films cast in this manner were 1 to 2 µm thick.

For barnacle cyprid assays, glass 20-mm×60-mm Petri dish bottoms (VWR Scientific, Inc.) were soaked in piranha solution for 24 hours, rinsed with copious quantities of deionized water, and stored in an oven at 110° C. until use. The Petri dish bottoms were cooled to ambient temperature and 600 μL of the appropriate sol precursor was added. The Petri dish was manipulated until the bottom surface and approximately 5 mm of the side surface were covered. The excess sol precursor was removed via pipette. All coated surfaces (glass slides and Petri dishes) were dried at ambient temperature and humidity for at least 7 days prior to analysis.

Imaging Reflectance Infrared (IR) Microscopy of Xerogel Samples. Imaging reflectance IR microscopy was carried out using a Bruker Vertex 70 IR coupled with a Hyperion 3000 IR microscope (4 cm$^{-1}$, 64 scans, 15× objective, 64×64 focal plane array). IR scans were collected in reflectance mode utilizing an FPA (focal plane array) detector with a detection area of 200 μm×200 um. Samples of the 1:4:45:50 and 1:14:35:50 C18/TDF/C8/TEOS xerogel on aluminum-coated glass slides were prepared by spin casting 400 μL of the sol precursor onto 25-mm×75-mm×1.1-mm borosilicate float glass microscope slides coated with 50±1 nm aluminum (Deposition Research Laboratories, Inc.) and air drying the films at ambient temperature for at least seven days. One set of xerogel films was analyzed following air-drying while a second set of xerogel films was soaked in deionized water at 25° C. for 24 hours and then dried at ambient temperature and humidity for 2 hours. The IR data collected for the 200×200 micron area was baseline corrected relative to the aluminum-coated slide as a blank and then integrated over the C—H stretching region (2800-3000 cm$^{-1}$) and the C—F stretching region (1223-1275 cm$^{-1}$). The 2D color images of relative intensity were then converted to 32 bit black and white images using Image-J software, where the "color" intensity was converted to gray-scale intensity. The ratio of the two images (C—F/C—H) was then calculated using the Ratio Plus plugin, resulting in a single image in which black areas pertain to an enhancement of fluorocarbon signal or reduced signal pertaining to hydrocarbon species and white areas pertain to enhanced signal from hydrocarbon species or reduced signal from fluorocarbon species.

Atomic Force Microscopy (AFM) Imaging Measurements. The samples were imaged by AFM using a Nanoscope® Dimension 3100 scanning probe microscope (Bruker AXS, Santa Barbara, Calif.) in an environmentally controlled laboratory with the relative humidity set at 25%. Photomicrographs were acquired using TappingMode™ Atomic Force Microscopy (TM-AFM) under ambient conditions. With a TM-AFM, the tip is driven at a known amplitude and frequency of oscillation which is typically near the cantilever resonance. The oscillatory motion is reduced as the tip is brought closer to the surface. The changes in the amplitude allow the AFM to track the surface, providing topographical information. Single crystal silicon Nanoprobe™ with a spring constant of ca. 17 to 43 N/m and resonance frequencies in the 262 to 359 kHz range to examine the xerogel film surfaces was used. TappingMode™ AFM images were acquired at a 1-μm and 5-μm scan size with the z-scale set to 100-nm.

Phase mode AFM imaging can distinguish surface features that are related to surface composition differences. Phase shifts are registered as bright and dark regions in the phase AFM image. For the phase mode images of this example, brighter regions indicate stiffer material whereas darker regions indicate a softer material.

Comprehensive Contact Angle Analysis. The xerogel films were stored in air prior to characterization. Comprehensive contact angle analyses were performed in air. The approximate sampling depth of the contact angle technique is 5 Å. Up to thirteen different diagnostic liquids were utilized for the analysis of each sample: water, glycerol, formamide, thiodiglycol, methylene iodide, 1-bromonaphthalene, 1-methylnaphthalene, dicyclohexyl, n-hexadecane, n-tridecane, n-decane, n-octane, and n-heptane. Liquid/vapor surface tensions of these liquids were determined directly; reference values for the liquid/vapor surface tensions are not used. The technique of "advanced angle" analysis was used, wherein a sessile drop of liquid (8-15 μL depending on the viscosity of the liquid) is placed on the sample surface and the angle of contact (θ) between the liquid and the solid is measured with a contact angle goniometer (Raine-Hart, Model NRL 100); both sides of the droplet profile are measured.

Another droplet of the same fluid is placed on top of the first droplet (the fluid is advanced across the surface), and the measurements are repeated. If the contact angles for the first droplet are ≤20°, no further measurements are taken for that liquid on the sample; fluids having contact angles of ≤20° use a relatively large amount of the limited sample surface area. Zisman plots were constructed by plotting the cosine of the average angle measured for each liquid against the liquid/vapor surface tension of the diagnostic liquid. A linear least squares analysis is performed to determine the sample's critical surface tension ($\gamma_C$) at the cos θ=1 axis. In cases of large data scatter (non linearity), the data for the spreading liquid (θ=0) with the greatest liquid/vapor surface tension and for those liquids closest to, but greater than, in surface tension to the first spreading liquid are used to determine $\gamma_C$. The data were also treated to give the surface free energy ($\gamma_S$), as well as its polar ($\gamma_P$) and dispersion ($\gamma_D$) components, after the xerogel films were aged in air or soaked in deionized water for 48 hours and then air-dried for 1 hour.

Static water contact angles ($\theta_{Ws}$) were measured by the sessile drop technique where the angle between a 15-μL drop of water and the xerogel surface was measured with a contact angle goniometer (Rame-Hart, Model NRL 100); both sides of the droplet profile were measured.

Biofouling Assays with Barnacles. Barnacle cypris larvae were obtained from Duke University Marine Lab. Glass standards were acid washed in 10% HCl for 2 hours, rinsed well with deionized water, and dried completely prior to cyprid settlement. Silastic® T2 (T2) coated slides were included in the assays to provide a standard fouling-release (FR) coating.

Cyprid Settlement Assays. Approximately 10 mL of seawater was added to each xerogel-coated Petri dish. This volume covered the bottom of the dish and allowed the cyprids free range of movement across the surface. A 400-μl drop of seawater containing between 30 and 60 2 to 4-day-old barnacle cypris larvae was then added to each of the dishes. After 48 hours the percentage of cyprids that had settled in each dish was counted. The average percent settlement for each of the experimental coatings was compared to the controls. Glass and T2 coated dishes were used as standard settlement substrates.

Barnacle Removal Assays. A 400-μl drop of seawater containing between 20 and 40 2 to 4-day-old cypris larvae was placed on the surface of the xerogel film-coated glass microscope slides. The surfaces with larvae were placed in a constant temperature incubator at 25° C. on a 12 hours:12 hours light:dark cycle and the larvae were allowed to settle for 48 hours. Newly metamorphosed juveniles on their respective coatings were transferred to growth chambers where they were fed the unicellular green alga *Dunaliella tertiolecta* and the diatom *Skeletonema costatum* for two weeks, and then a mixture of *D. tertiolecta*, *S. costatum*, and naupliar larvae of

*Artemia* sp. for an additional week. Juveniles were then transferred to a 16-L aquarium tank in an automated rack system with temperature, salinity, and pH monitors and programmed for a 10% daily water change. Barnacles in the tank were fed a 500-mL flask of *Artemia* sp. 3 times a week for 4 to 6 weeks, which is the time it took the juvenile barnacles to reach a basal plate diameter of 3-5 mm—the minimum size necessary to conduct force gauge tests according to ASTM D 5618.

The procedures for critical removal stress were followed from ASTM D 5618 with the following modifications: (i) the force measuring device was operated by a motorized stand, ensuring a constant application of force during dislodgement; and (ii) barnacle dislodgement studies from coatings were performed under water. The apparatus consists of an IMADA ZP-11 digital force gauge mounted on an IMADA SV-5 motorized stand. The slides are clamped into a custom-built Plexiglas chamber that allowed their complete submersion during dislodgement tests.

Juvenile barnacles were selected for testing based on healthy appearance and minimum size requirements. Only barnacles positioned at least 5 mm from the edges of the slide were tested. Other barnacles in close proximity to the test subject were removed if they could potentially interfere with measurements. Prior to removal of barnacles each basal plate was photographed using a Canon™ EOS 10D camera attached to an Olympus™ SZX12 dissecting microscope and images were later used to calculate basal plate areas using NIH's ImageJ software. After photographs were taken, the slide was clamped into the Plexiglas chamber. The force gauge mounted on the motorized stand was used to apply a shear force to the base of the barnacles at a rate of approximately 4.5 N s$^{-1}$ until the organism was detached. Force was applied parallel to the film surface. The force required for detachment was noted and observations were made as to the mode of failure. If any portion of the base of the organism was left attached to the substratum, the test was deemed void for removal. The surfaces were examined visually for damage to the xerogel film caused by barnacle removal and by stereomicroscope if there were any ambiguity. The critical removal stress was calculated by dividing the force (F, Newtons) required to remove the test subject by the area of attachment (A, mm$^2$). For barnacles where a portion of the base of the organism was left attached to the substratum, the remaining basal plate was photographed and the area was calculated as described above and used to calculate the exact fraction remaining after testing (fraction BPR).

Biofouling Assays with *Ulva*. Coatings applied to glass slides were equilibrated in circulating deionized water for 48 hours prior to the start of assays with algae. One hour prior to the assay, the slides were transferred to artificial seawater (ASW). Silastic® T2-coated slides were included in the assays to provide a standard fouling-release coating.

Settlement of Zoospores of *Ulva*. Fronds of *Ulva linza* were collected from Llantwit Major, Wales (51840'N; 3848'W) and a spore suspension of 1.0×10$^6$ spores mL$^{-1}$ was prepared. Three replicate slides of each treatment were placed in individual wells of 'quadriperm' polystyrene culture dishes and 10 mL of spore suspension were added. Dishes were incubated in the dark for 1 hour at ~20° C. After incubation, the slides were gently washed in ASW to remove unattached (swimming) spores. Slides were fixed in 2.5% glutaraldehyde. The density of spores attached to the surfaces was counted using an image analysis system attached to a fluorescence microscope. Spores were visualized by autofluorescence of chlorophyll. Counts were made for thirty (30) fields of view (each 0.17 mm$^2$), 1 mm apart over the central region of each slide, using image analysis software (Axiovision 4.8.1, Carl Zeiss imaging systems) attached to a Zeiss epifluorescence microscope. Spore settlement data are expressed as the mean number of spores adhered per mm$^2$ with 95% confidence limits (n=90).

Adhesion Strength of Sporelings of *Ulva*. Spores were allowed to settle as described above. After washing away unattached spores, spores that had attached to the test surfaces were cultured in dishes containing supplemented seawater medium that was changed every 2 days. The dishes were placed in an illuminated incubator (75 mW m$^{-2}$ s$^{-1}$ incident irradiation) for 7 days during which time the spores germinated and developed into sporelings (young plants).

The biomass produced was quantified by measuring the fluorescence of chlorophyll in a Tecan fluorescence plate reader (excitation=430 nm, emission=670 nm). Fluorescence was measured as relative fluorescence units (RFU) and was directly proportional to the quantity of biomass present. The RFU value for each slide was the mean of 70 point fluorescence readings taken from the central region (middle third of the slide over a 1 in×1 in region).

The strength of adhesion of the sporelings was determined by exposing the slides to a range of impact pressures from an automated water jet, which traversed the central region (middle third of the slide over a 1 in×1 in region) of each slide. One replicate slide of each coating was exposed to one of five impact pressures. Pressures were selected to provide the widest range of biomass removal possible. The biomass that remained in the sprayed area after exposure to the water jet was quantified as described above. Percentage removal of sporelings was determined by comparison of the biomass (RFU) before exposure with that remaining attached to the coatings after exposure to the water jet. The critical impact pressure to remove 50% of the biomass ($CP_{50}$) was determined from plots of percentage removal vs. water impact pressure.

Results. Xerogel Surfaces. A series of xerogel surfaces containing C18, TDF, C8 and TEOS were prepared from sols with the following mole % ratios: 1:1:48:50, 1:4:45:50, 1:9:40:50, 1:14:35:50, 1:19:30:50 and 1:24:25:50 C18/TDF/C8/TEOS, respectively. A 1:49:50 C18/TDF/TEOS xerogel surface (C18/TDF/TEOS xerogel in the remainder of the manuscript) was also prepared and a 50:50 C8/TEOS xerogel surface (C8/TEOS xerogel in the remainder of the manuscript) was prepared as a xerogel control. The xerogel films prepared by spin coating were 1 to 2 μm thick as measured by profilometry. All of the xerogel films of this example were optically transparent.

The xerogel surfaces were aged in air at ambient temperature for 7 days and were then examined by comprehensive advanced contact angle analyses to give values of the critical surface tension ($\gamma_C$) and the surface free energy ($\gamma_S$) (Table 3). Static water contact angles, $\theta_{Ws}$, were measured for all xerogel surfaces described in this example and are compiled in Table 3. For the TDF-containing xerogels, values of $\gamma_C$ varied between 11.5 and 19.8 mN m$^{-1}$, values of $\gamma_S$ varied between 16.1 and 21.8 mN m$^{-1}$ and values of $\theta_{Ws}$ varied between 97.0° and 110.3°.

To evaluate the impact of water on surface properties, values of $\theta_{Ws}$ and $\gamma_S$ were measured before and after the xerogel surfaces were immersed in deionized water for 48 hours and air-dried for 1 hour. The values of $\theta_{Ws}$ and $\gamma_S$, pre- and post-immersion in deionized water, are compared graphically in FIG. 10. In pair-wise comparisons (Student t-test), values of $\gamma_S$ pre- and post-immersion in water are essentially unchanged with no significant differences (p>0.09) with the exception of the 1:19:30:50 C18/TDF/C8/TEOS xerogel where the increase in $\gamma_S$ upon immersion in water was significant (p<0.01).

Figure 11:
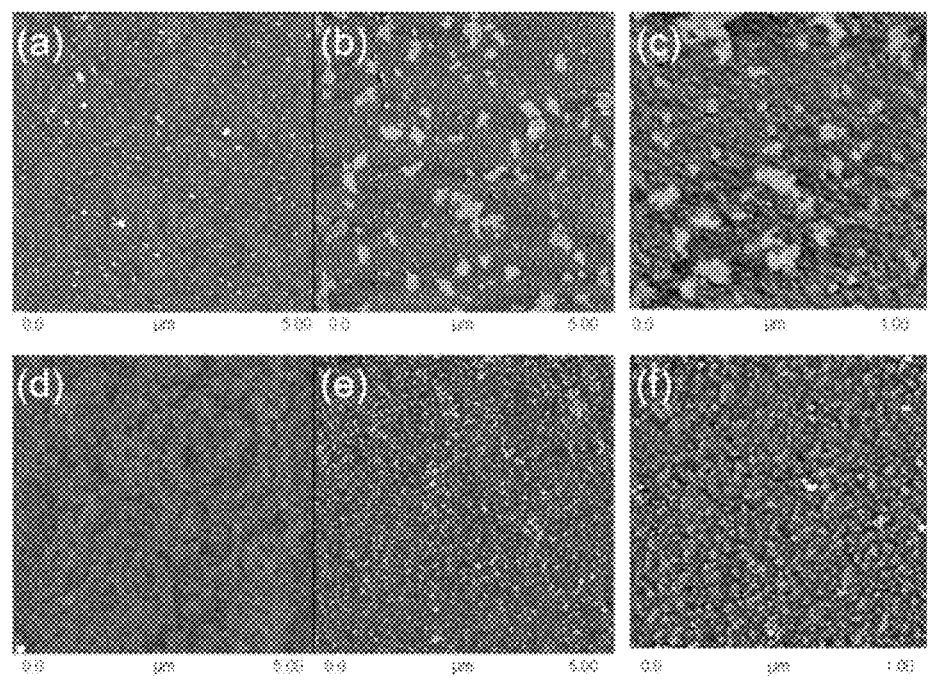
FIG. 11. Representative AFM images of the 1:4:45:50 C18/TDF/C8/TEOS xerogel. Panels (a)-(c) are the surfaces prior to immersion in deionized water. Panels (d)-(f) are post-immersion for 24 hours in deionized water and air-dried for 1 hour. Panels (a) and (d) compare AFM height images (image size: 5 μm×5 μm, Z-range: 100 nm). Panels (b) and (e) compare the subsequent phase images. Panels (c) and (f) compare the phase images acquired at a 1 μm×1 μm scan size. All AFM images were acquired in air.

The 1:4:45:50 and 1:14:35:50 C18/TDF/C8/TEOS xerogels were examined by AFM prior to immersion in water and after 24 hours immersion in deionized water. Immersed surfaces were air-dried for 1 hour prior to imaging in air. FIG. 11 shows representative images of the 1:4:45:50 C18/TDF/C8/TEOS xerogel prior to immersion (panels a-c) and post-immersion in deionized water (panels d-f). The phase images of the pre-immersion samples (panels b and c) clearly show inhomogeneities across the surface, which may be linked to phase segregation. After immersion in water, the features of inhomogeneity are smaller and are more evenly distributed across the surface.

Values of the root-mean-square roughness ($R_{rms}$) for the 1:4:45:50 and 1:14:35:50 C18/TDF/C8/TEOS xerogel surfaces pre- (1.87±0.20 and 2.31±0.21 nm, respectively, where error limits are ±one standard deviation) and post-immersion (0.93±0.05 and 0.95±0.03 nm, respectively) in deionized water were calculated on six 5-µm×5-µm images for each sample, where $R_{rms}$ is defined as the root mean square average of the topographic deviations (t) as shown in eq 1:

$$R_{rms} = \sqrt{\frac{1}{N}\sum_{i=1}^{N}(t_i - \bar{t})^2} \quad (1)$$

Figure 12:
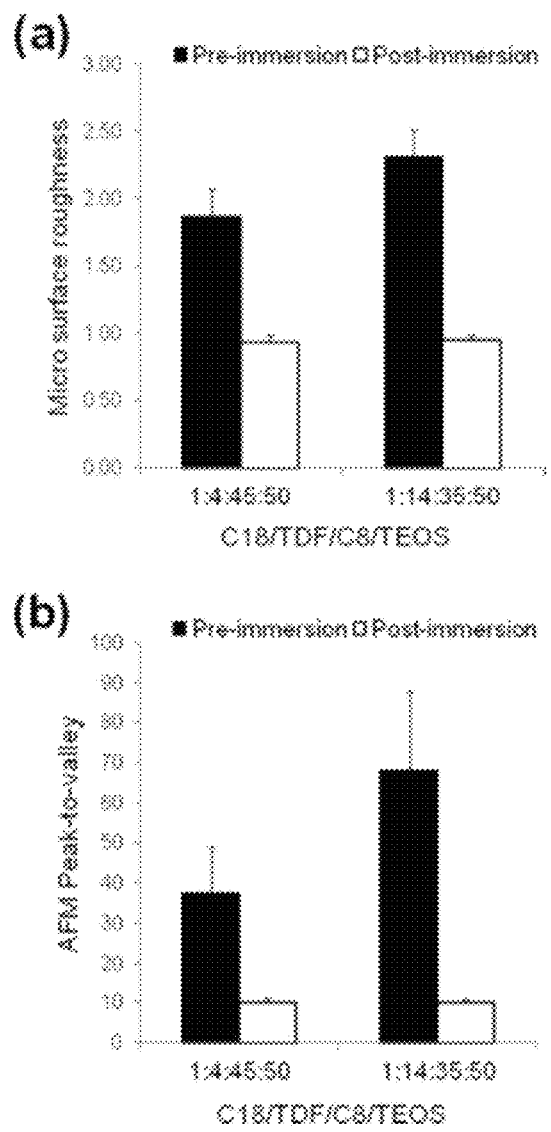
FIG. 12. Representative changes in surface topography for the 1:4:45:50 and 1:14:35:50 C18/TDF/C8/TEOS xerogels as measured by changes in (a) micro surface roughness and (b) AFM peakto-valley distances pre-immersion (black bars) and postimmersion (white bars) for 24 hours in deionized water and airdried for 1 hour. Averages were calculated from measurements on six 5 μm×5 μm images. Error bars represent one SD from the mean.

Values of $R_{rms}$ pre- and post-immersion in deionized water as well as changes in the peak-to-valley heights are shown graphically in FIG. 12. Immersion in water for both surfaces led to statistically significant decreased surface roughness in pair-wise comparisons (Student t-test, p<0.0001 for both surfaces) and decreased peak-to-valley heights (p=0.0002 and p<0.0001 for the 1:4:45:50 and 1:14:35:50 C18/TDF/C8/TEOS xerogel surfaces, respectively).

Figure 13:
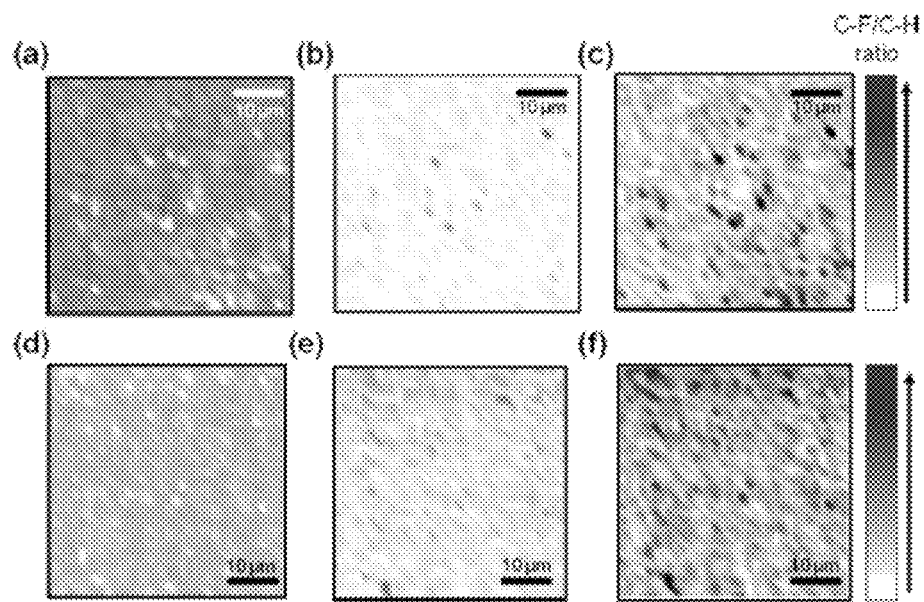
FIG. 13. Representative imaging reflectance IR microscopy comparing 50 μm×50 μm images of the fluorocarbon regions (C—F stretch, 1223 to 1275 cm$^{-1}$, panels a and d) and the hydrocarbon regions (C—H stretch, 2800 to 3000 cm$^{-1}$, panels b and e) of the 1:14:35:50 C18/TDF/C8/TEOS xerogel following air-drying for 7 days (panels a and b) or immersion in deionized water for 48 hours (panels d and e). In panels (a) and (d), lighter regions represent higher C—F stretching intensity and darker regions, lower C—F stretching intensity. In panels (b) and (e), lighter regions represent higher C—H stretching intensity and darker regions, lower C—H stretching intensity. In the ratio images of panels (c) and (f) relative scales were set arbitrarily to enhance contrast, darker regions represent higher C—F/lower C—H intensity while lighter regions represent lower C—F/higher C—H intensity as indicated by the intensity bar. Images pre- and post-immersion are extracted from similar areas of each slide, but are not from identical coordinates. Intensity scales are identical pre- and post-immersion.

Samples of the 1:4:45:50 and 1:14:35:50 C18/TDF/C8/TEOS xerogel on aluminum-coated glass slides were also examined by imaging reflectance IR microscopy. The sol-gel process produces xerogels with residual silanol functionality (3200 to 3700 $cm^{-1}$), which is uniformly distributed across the 1:4:45:50 and 1:14:35:50 C18/TDF/C8/TEOS xerogels. In contrast, IR microscopy images of the integrated C—F stretching region (1223 to 1275 $cm^{-1}$) and the integrated C—H stretching region (2800 to 3000 $cm^{-1}$) show some segregation into higher C—F/lower C—H-containing features and lower C—F/higher C—H-containing features across the 1:4:45:50 and 1:14:35:50 C18/TDF/C8/TEOS xerogel surfaces. These features are illustrated in FIG. 13 for the 1:14:35:50 C18/TDF/C8/TEOS xerogel prior to immersion (panels a and b) and post-immersion in deionized water for 24 hours (panels d and e). A ratio of the two images (C—F/C—H), resulting in a single image in which black areas reflect regions with enhanced signal from fluorocarbon species or decreased signal from hydrocarbon species and white areas reflect regions with enhanced signal from hydrocarbon species or decreased signal from fluorocarbon species as shown in panel c and f of FIG. 13. Enhanced fluorocarbon and hydrocarbon features on the ~1 µm-scale are discernable pre- and post-immersion in water. It should be noted that these features are with respect to the "bulk" surface—i.e., the entire thickness—and are not necessarily an indication of chemical identity at the surface.

Figure 14:
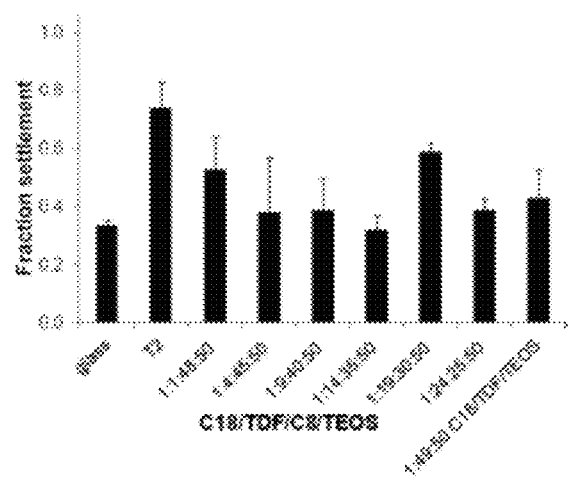
FIG. 14. Representative settlement of barnacle cypris larvae on xerogel coatings applied to glass dishes, and glass and T2 standards. Each value is the mean from 3 replicate measurements. Error bars represent the SE of the mean.

Settlement of *Cypris Larvae* and Removal of Juvenile Barnacles of *B. Amphitrite*. The settlement of 2 to 4-day-old barnacle cypris larvae that were placed on the xerogel coatings and the glass and T2 standard surfaces was compared (FIG. 14). There was no significant difference in settlement between individual xerogel test coatings or between xerogel test coatings and glass or T2 standards (ANOVA, p=0.233). The fraction of settled cyprids among the xerogel coatings was between 0.32 and 0.59.

The strength of attachment of juvenile barnacles to the seven TDF-containing xerogel surfaces, the C8/TEOS xerogel and glass and T2 standards was measured via force-gauge measurements with forces applied in shear. All barnacles on both the C8/TEOS xerogel and the glass standard broke when force was applied to them in shear, and left a complete or partial basal plate attached to the surface. For the glass standard, the fraction of the barnacle basal plate remaining was 1.00, i.e., essentially all of the barnacle basal plate remained on the glass surface. For the C8/TEOS xerogel, the fraction of the barnacle basal plate remaining was 0.80±0.04. All of the TDF-containing xerogel surfaces as well as the T2 standard performed as fouling-release surfaces as shown in FIG. 15a. The 1:1:48:50 C18/TDF/C8/TEOS xerogel gave complete release of 30% of attached barnacles (6/20 barnacles removed completely) while the C18/TDF/TEOS xerogel gave complete release of 20% of attached barnacles (4/20 barnacles removed completely). The 1:4:45:50 and 1:14:35:50 C18/TDF/C8/TEOS xerogels (fraction removed completely=1.00 and 0.94, respectively) were comparable to the T2 standard (fraction removed completely=0.93, FIG. 11a). The 1:9:40:50, 1:19:30:50 and 1:24:25:50 C18/TDF/C8/TEOS xerogels gave intermediate performance (fraction removed completely=0.69-0.85).

There was a significant difference in critical removal stress (CRS) between test coatings (ANOVA p<0.001). The value of CRS for the 1:1:48:50 C18/TDF/C8/TEOS xerogel surface (0.24±0.01 MPa, FIG. 15b) was significantly higher in comparison to the other TDF-containing xerogel surfaces and the T2 standard (in pair-wise comparisons using the Student t-test). Values of CRS for the 1:4:45:50, 1:9:40:50, 1:14:35:50, 1:19:30:50 and 1:24:25:50 C18/TDF/C8/TEOS xerogel surfaces and the C18/TDF/TEOS xerogel surface were 0.12 to 0.20 MPa. These values are not significantly different from the CRS for the T2 surface (0.14±0.01 MPa). The value of CRS for the 1:14:35:50 C18/TDF/C8/TEOS xerogel surface (0.12±0.01 MPa) was significantly lower in comparison to CRS for the C18/TDF/TEOS xerogel surface (0.20±0.02 MPa).

For barnacles not completely removed, the percentage of the basal plate remaining (BPR) was calculated with digital image analysis. These results were combined with data for barnacles completely removed (fraction BPR=0.0) and are shown in FIG. 15c. The fraction of the BPR on the T2 standard was 0.02±0.01 (FIG. 15c). In pair-wise comparisons, the 1:4:45:50 and 1:14:35:50 C18/TDF/C8/TEOS xerogel surfaces retained significantly less of the basal plate (p<0.05) than the T2 standard, the 1:1:48:50 C18/TDF/C8/TEOS xerogel and the C18/TDF/TEOS xerogel retained significantly more of the basal plate than the T2 standard and the other TDF-containing xerogels (p<0.02), while the glass standard and C8/TEOS xerogel control retained essentially all of the basal plate (fraction BPR=1.00 and 0.80±0.04, respectively), which was significantly greater than all of the other surfaces (p<0.0001).

Figure 16:
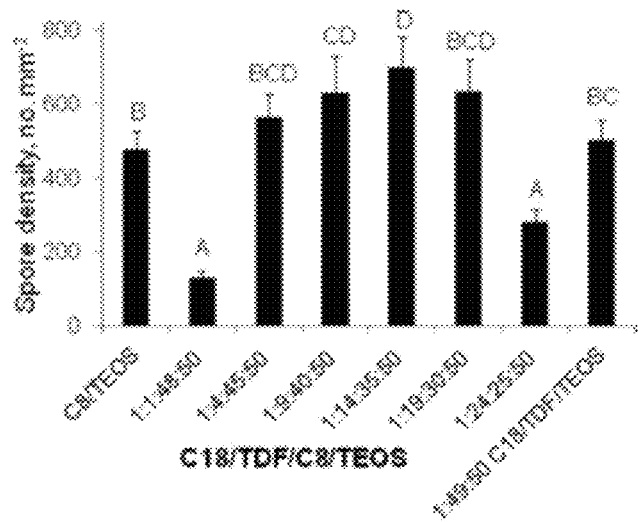
FIG. 16. Representative settlement of zoospores of *Ulva* on 50:50 C8/TEOS and TDF-containing xerogel coatings. Each value is the mean of 90 counts on each of 3 replicate slides. Error bars represent the 95% confidence limits. Coatings that share a letter have values for zoospore settlement that are not significantly different from one another.

Settlement and Removal of Zoospores of *Ulva*. Settlement of zoospores, the growth of sporeling biomass and the impact pressure needed to remove 50% from the TDF-containing xerogel surfaces, the C8/TEOS xerogel control, and the T2 standards were examined. Spore settlement densities on the C18/TDF/C8/TEOS coatings and the C8/TEOS xerogel did not follow a trend in terms of composition of the C18/TDF/C8/TEOS xerogels (FIG. 16). One-way analysis of variance and Tukey tests indicated significant differences among the C8/TEOS control and TDF-containing coatings ($F_{7, 712}$=33.0 p<0.05). Settlement densities on the 1:1:48:50 and 1:24:25:50 C18/TDF/C8/TEOS xerogels were significantly lower in comparison to settlement on the C8/TEOS xerogel control or the other TDF-containing xerogels. Zoospore settlement densities on the 1:4:45:50 C18/TDF/C8/TEOS xerogel and the C18/TDF/TEOS xerogel were not significantly different in comparison to those on the C8/TEOS xerogel control. Settlement densities were highest on the 1:4:45:50, 1:9:40:50, 1:14:35:50, and 1:19:30:50 C18/TDF/C8/TEOS xerogels, which are the mid-range of the TDF/C8 ratios, and were not significantly different from one another.

Strength of Attachment of Sporelings of *Ulva*. Sporelings grew well and after 7 days, a green covering was visible on all surfaces. The TDF-containing xerogels and the C8/TEOS control and glass and T2 standards were exposed to a range of water pressures (20 to 54 kPa) to determine the critical water pressure ($CP_{50}$) required to remove 50% of 7-day sporeling biomass. These values are shown graphically in FIG. 17. Values of $CP_{50}$ for all of the C18/TDF/TEOS xerogels and the C8/TEOS xerogel fell in the range 23.5–36 kPa and are comparable to $CP_{50}$ (23 kPa) for the T2 surface. The similarity of $CP_{50}$ for the TDF-containing xerogels and $Cp_{50}$ for the T2 surfaces was confirmed in a second experiment.

A value of $CP_{50}$ could not be determined for the glass standard. At the highest pressure examined (54 kPa), the fraction of sporelings removed was less than 0.2. In previous studies, $CP_{50}$ for glass has been estimated at >200 kPa and, in the current example, would be estimated to be at least 100 kPa.

Scanning electron microscopy (SEM) studies of several xerogel surfaces indicate that these surfaces are uniform, uncracked, and topographically smooth when dry. Atomic force microscopy (AFM) measurements on the same series of xerogels submerged in ASW show very low surface roughness (≤0.8 nm) and no phase segregation. Time-of-flight, secondary-ion mass spectrometry (ToF-SIMS) studies show that there is no phase segregation of fluorocarbon and hydrocarbon groups on the μm scale in a 25:25:50 trifluoropropyl-trimethoxysilane/C8/TEOS xerogel.

Figure 10:
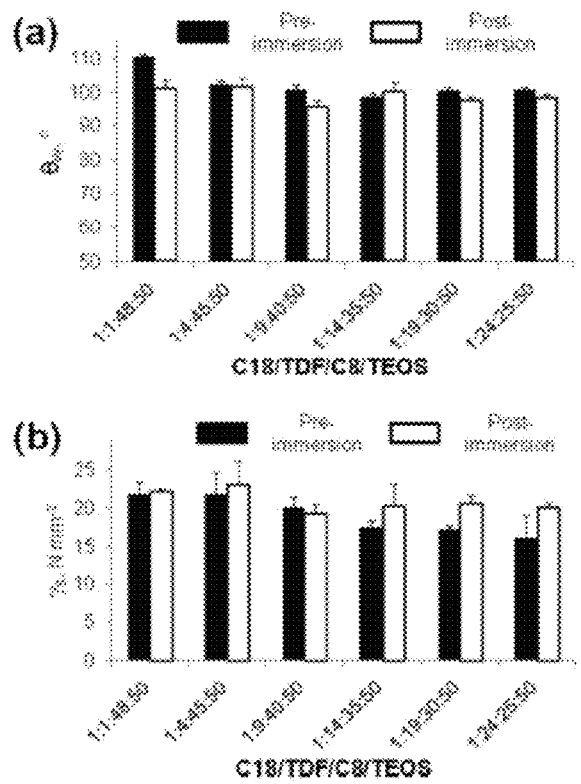
FIG. 10. Representative changes in (a) static water contact angle ($\theta_{WS}$) and (b) surface energy ($\gamma_S$) between xerogel samples air-dried for 7 days (black bars) and xerogels samples soaked for 48 hours in deionized water (white bars). Error bars represent ±one SD from the mean for three independent measurements pre- and post-immersion.

Chemical segregation in the bulk xerogel is possible and can lead to topographical features over multiple scales. The C18- and TDF-containing xerogel coatings of this example showed decreased surface roughness upon exposure to water. Both AFM (FIG. 11) and IR microscopy (FIG. 13) showed non-homogeneous surfaces. Prior to immersion in water, topographic AFM images of the 1:4:45:50 and the 1:14:35:50 C18/TDF/C8/TEOS xerogels showed spherical (ca. 20 to 25 nm diameter) nanodomains that were segregated from the xerogel continuous phase (FIG. 11a). Upon immersion in deionized water for 48 hours, some surface reorganization was apparent: the spherical nanodomains become less apparent (FIG. 11d) and, overall, there was a significant decrease in surface roughness as shown in FIG. 12. AFM phase images showed a non-homogeneous surface with nanodomains of ca. 100 to 150 nm diameter prior to immersion in deionized water (FIG. 11b) and much smaller domains after immersion (FIG. 11e). The surface reorganization upon immersion in water (FIG. 12) had minimal impact on measurable surface properties such as the surface free energy ($\gamma_S$) and the static water contact angle ($\theta_{WS}$), which were relatively unchanged pre- and post-immersion over the entire range of TDF concentrations (1 to 24 mole %) in this example (FIG. 10).

The nature of the cross-linking and functional group distribution in the xerogels differs from that of fluorinated block copolymers that undergo surface reorganization upon exposure to water. Immersion in water did not change the relative intensity of the silanol bands in the surface regions shown in FIG. 13 (data not shown) suggesting that further cross-linking of the surface is not responsible for the change.

The IR microscope showed some segregation of chemical functionality in the bulk xerogel on roughly the μm scale, which is the spatial resolution of the IR microscopy images (FIG. 13). While the IR microscope does not give absolute hydrocarbon and fluorocarbon domains, μm-scale features characterized by either increased hydrocarbon content or increased fluorocarbon content are apparent in the "ratio" images of FIG. 13 both pre- and post-immersion in water (panels c and f, respectively). Immersion in water appears to have little impact on the distribution of the larger μm-scale, bulk features, suggesting that surface reorganization is on the nm-scale within the regions of higher fluorocarbon and/or hydrocarbon content.

The experimental values of $\gamma_S$ (Table 3) for the TDF-containing xerogels of this example are lower in comparison to values of $\gamma_S$ for the C8/TEOS xerogel control surface and T2 standard surface and are also either below or at the low end of the 20-25 mN m$^{-1}$ range of the "Baier curve" where minimal bioadhesion has been reported. Materials with lower values of $\gamma_S$ have shown increased bioadhesion.

One might expect less than optimal performance for the lower surface energy materials as either AF or FR surfaces relative to surfaces with values of $\gamma_s$ in the 20-25 mN m$^{-1}$ range of the "Baier curve" if surface energy alone were the sole determining factor. The T2 standard, for example, has $\gamma_S$ of 23.0±0.4 mN m$^{-1}$, which is in the middle of the Baier minimum. In particular, the 1:4:45:50 through 1:24:25:50 C18/TDF/C8/TEOS surfaces had values of $\gamma_C$ in the range 11.5 to 19.8 mN m$^{-1}$ and values of $\gamma_S$ in the range 16.1 to 21.8 mN m$^{-1}$ and gave release of 68 to 100% of juvenile barnacles. In contrast, the 50:50 C8/TEOS xerogel with $\gamma_C$ of 21.3 mN m$^{-1}$ and $\gamma_S$ of 27.1 mN m$^{-1}$ in the middle of the Baier minimum gave 0% release of juvenile barnacles.

Settlement studies of cypris larvae of the barnacle *B. amphitrite* showed that there were no significant differences between the TDF-containing xerogel test coatings and the C8/TEOS xerogel control surface or glass and T2 standards (FIG. 14). The TDF-containing and C8/TEOS xerogels and the T2 surface are all hydrophobic surfaces ($\theta_{WS}$≥97°) and the range of surface energies, which are actually fairly similar among these coatings (~10 mN m$^{-1}$ range), had no significant impact on settlement.

Settlement studies of zoospores of *Ulva linza* indicated significant differences among the C8/TEOS and TDF-containing coatings, but these differences did not correlate with either $\theta_{WS}$ or with $\gamma_S$. Settlement densities on the 1:1:48:50 and 1:24:25:50 C18/TDF/C8/TEOS xerogels were significantly lower in comparison to settlement on the C8/TEOS xerogel standard while settlement on the 1:4:45:50 C18/TDF/C8/TEOS xerogel and the C18/TDF/TEOS xerogel was not significantly different in comparison to settlement on the C8/TEOS xerogel standard. All four of these surfaces had values of $\gamma_S$ (17.2 to 21.8 mN m$^{-1}$) well below that of the C8/TEOS xerogel (27.1 mN m$^{-1}$). In contrast, settlement densities were highest on the 1:4:45:50, 1:9:40:50, 1:14:35:50, and 1:19:30:50 C18/TDF/C8/TEOS xerogels with values of $\gamma_S$ in the same range. With the exception of the 1:1:48:50 C18/TDF/C8/TEOS xerogel ($\theta_{WS}$=110°), all of the other xerogel surfaces including the C8/TEOS xerogel had a value of $\theta_{WS}$ of ~100° (within experimental error). On these surfaces, settlement of zoospores does not appear to be correlated with either total surface energy or hydrophobicity.

Figure 15:
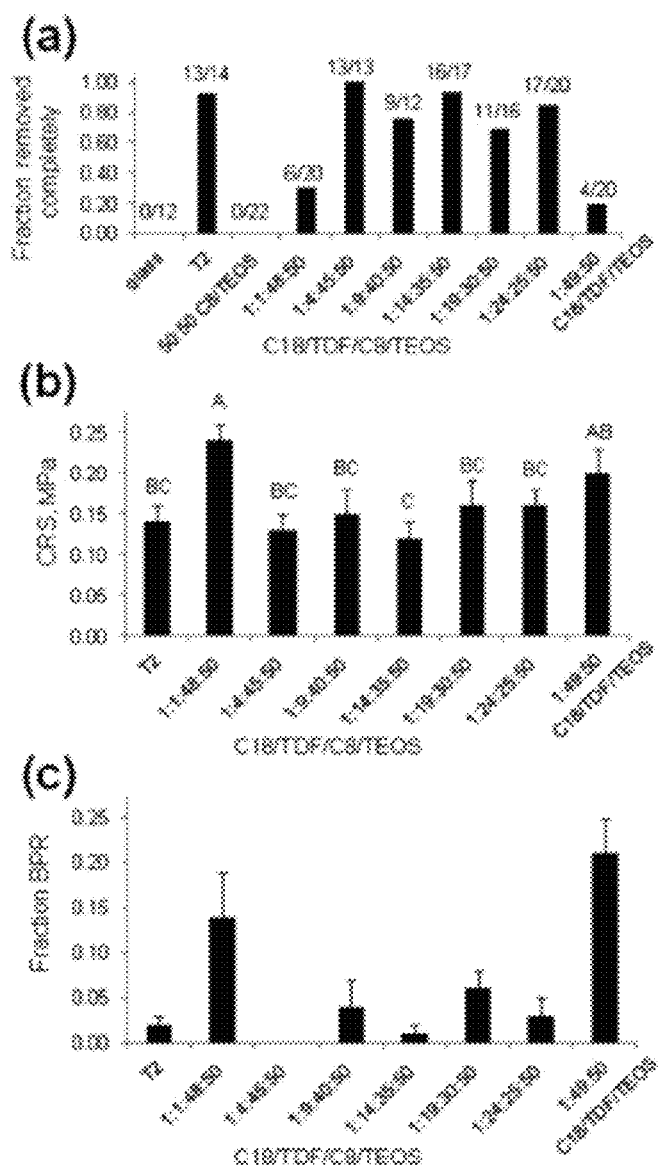
FIG. 15. Representative fraction of juvenile barnacles removed completely via shear pressure (panel a), critical removal stress (CRS) in MPa for barnacles removed completely (panel b), and fraction of barnacle basal plate remaining (BPR) from those barnacles removed completely or incompletely (panel c). In panel (b), coatings that share a letter have values of CRS that are not significantly different from one another. Number of barnacles, n, removed completely in each group and total number of barnacles pushed given in panel (a). Error bars are the SE from the mean.
Figure 17:
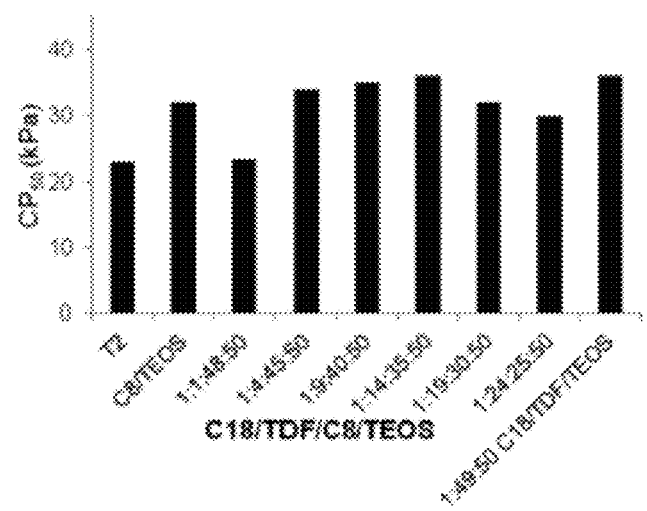
FIG. 17. Representative critical water pressure ($CP_{50}$) to remove 50% of sporelings of *Ulva* from the T2 standard and the C18/TDF/C8/TEOS and C18/TDF/TEOS xerogel coatings.

The TDF-containing xerogel surfaces acted as FR surfaces with several comparable to the T2 standard with respect to release of juvenile barnacles and 7-day *Ulva* sporeling growth. The 1:4:45:50 and 1:14:35:50 C18/TDF/C8/TEOS xerogel surfaces and T2 standard gave essentially complete release of juvenile barnacles (FIG. 15). Values of the critical removal stress (CRS) were statistically identical among these three coatings (0.12 to 0.14 MPa). The remaining TDF-containing coatings also functioned as FR surfaces although not as effectively as the 1:4:45:50 and 1:14:35:50 C18/TDF/C8/TEOS xerogel surfaces. In contrast, the C8/TEOS xerogel surface did not function as a FR surface—all barnacles broke before removal (FIG. 15). Again, there is no direct correlation of individual coating performance with either $\gamma_S$ or $\theta_{Ws}$. Values of $CP_{50}$ for 7-day sporeling removal were comparable on all of the C18/TDF/C8/TEOS xerogel surfaces and were described by a narrow range (23.5 to 36 kPa), which was comparable to the T2 standard as shown in FIG. 17.

The data for 7-day sporeling removal taken with the performance of the TDF-containing xerogel surfaces for removal of juvenile barnacles suggest that the 1:4:45:50 and 1:14:35:50 C18/TDF/C8/TEOS xerogels perform similarly to the T2 standard as FR surfaces. The thinner, harder xerogel surfaces may release the macrofoulers via shear rather than by peeling as one might expect with T2 and related silicone elastomers.

The chemical segregation of the C18/TDF/C8/TEOS xerogels of this example into nm- and µm-domains of higher fluorocarbon and hydrocarbon content likely contributes to the FR performance observed in these systems in addition to other surface properties. The hydrophobic nature of C18/TDF/C8/TEOS xerogel coatings and low surface energy likely contribute to their FR behavior, as well.

Xerogel surfaces can be fine-tuned to provide surfaces with different wettability and values of $\gamma_C$ or $\gamma_S$. The topography of the xerogel surfaces can also be fine-tuned by the incorporation of a long-chain alkyl component and varying amounts of the polyfluorinated TDF as shown by the xerogels of this example. The formulation and coating of these TDF-containing xerogel surfaces require no special attention or preparation (pre-patterning). Depositing the xerogel by spin coating leads to self-segregation of hydrocarbon and fluorocarbon domains.

Overall, xerogel surfaces have high potential as FR or easy-clean materials with the 1:4:45:50 and 1:14:35:50 C18/TDF/C8/TEOS xerogels of this example being perhaps the most promising leads yet in xerogel surface chemistry. These coatings can be useful as AF/FR surfaces, for example, in applications where thicker coatings are not optimal or practical. In particular, these coatings, as with other xerogel coatings, are optically transparent and have applications as AF/FR coatings where optical transparency is important (marine sensors, underwater cameras, submersible solar panels).

TABLE 3

Static water contact angles ($\theta_{Ws}$), critical surface tensions ($\gamma_C$) and surface energies ($\gamma_S$) for the xerogel surfaces of this example and glass, T2 and C8/TEOS standards.

| Sample | $\theta_{Ws},^a$ ° | $\gamma_C,^b$ mN m$^{-1}$ | $\gamma_S,^c$ mN m$^{-1}$ |
|---|---|---|---|
| Glass | 21 ± 1 | — | — |
| T2 | 109$^d$ | 23.0 ± 0.4$^e$ | 23.0 ± 0.4$^d$ |
| 50:50 C8/TEOS | 100$^f$ | 21.3 ± 0.1$^f$ | 27.1 ± 0.3$^f$ |
| 1:1:48:50 C18/TDF/C8/TEOS | 110.3 ± 0.7 | — | 21.8 ± 1.6 |
| 1:4:45:50 C18/TDF/C8/TEOS | 102.4 ± 0.8 | 19.3 ± 1.4 | 21.8 ± 2.8 |
| 1:9:40:50 C18/TDF/C8/TEOS | 100.8 ± 1.6 | 19.8 ± 0.5 | 20.1 ± 1.4 |
| 1:14:35:50 C18/TDF/C8/TEOS | 98.9 ± 1.6 | 18.8 ± 0.2 | 17.6 ± 0.5 |
| 1:19:30:50 C18/TDF/C8/TEOS | 100.7 ± 0.3 | 11.5 ± 2.3 | 17.2 ± 0.5 |
| 1:24:25:50 C18/TDF/C8/TEOS | 100.8 ± 0.1 | 12.4 ± 0.5 | 16.1 ± 3.0 |
| 1:49:50 C18/TDF/TEOS | 97.0 ± 1.1 | — | 17.3 ± 0.5 |

$^a$Mean of five (5) independent measurements for coatings stored in air prior to measurement. ± one standard deviation.
$^b$Mean of two (2) independent measurements for coatings stored in air for 7 days prior to measurement.
$^c$Mean of three (3) independent measurements for coatings stored in air for 7 days prior to measurement.
$^d$From Tang et al. (2005).
$^e$From Feinberg et al. (2003).
$^f$From Gunari et al. (2011).

The first three entries in Table 3 are comparative examples.

Example 3

This is an example of the preparation and characterization of xerogel films of the present invention.

Five non-biocidal xerogel coatings were compared to two commercial non-biocidal coatings and a silicone standard with respect to antifouling (AF)/fouling-release (FR) characteristics. The formation and release of bacterial biofilm of *Cellulophaga lytica*, the attachment and release of the microalga *Navicula incerta*, and the fraction removal and critical removal stress of reattached adult barnacles of *Amphibalanus amphitrite* were evaluated in laboratory assays. Correlations of AF/FR performance with surface characteristics such as wettability, surface energy, elastic modulus, and surface roughness were examined. Several of the xerogel coating compositions performed well against both microfouling organisms while the commercial coatings performed more poorly toward the removal of microalgae. Reattached barnacle adhesion as measured by critical removal stress was significantly lower on the commercial coatings when compared to the xerogel coatings. However, two xerogel compositions showed release of 89 to 100% of reattached barnacles. These two formulations were also tested in the field and showed similar results.

The AF and FR performance of several xerogel surfaces with the AF and FR performance of the commercial coatings IS700 and IS900 and a Silastic® T2 (T2) poly(dimethylsiloxane)elastomer standard with respect to micro- and macrofoulers in laboratory assays was compared. Specifically, the biofilm growth and removal of the marine bacterium *Cellulophaga lytica*, attachment and removal of the marine microalga (diatom) *Navicula incerta*, and the removal of reattached adult barnacles of *Amphibalanus amphitrite* were compared. Two of the xerogel coatings showed desirable FR behavior toward all three fouling organisms. The same two coatings were also tested at a static immersion test site in Morro Bay, Calif. In the field, both coatings exhibited good FR performance (i.e., removal of the barnacle *Balanus crenatus*) and cleaned back relatively easily using a standard water jet apparatus.

Materials and Methods. Chemical Reagents and Materials. Deionized water was prepared to a specific resistivity of at least 18 MΩ using a Barnstead NANOpure Diamond UV ultrapure water system. 3-N,N-Dimethylaminopropyltriethoxysilane (DMAP), TEOS, C18, C8 and TDF were purchased from Gelest, Inc. and were used as received. Ethanol was purchased from Quantum Chemical Corp. Hydrochloric acid and borosilicate glass microscope slides were obtained from Fisher Scientific Co.

Sol Preparation. The sol/xerogel composition is designated in terms of the molar ratio of Si-containing precursors. Thus, a 50:50 C8/TEOS composition contains 50 mole % C8 and 50 mole % TEOS. In all of the sol preparations described below, the aqueous HCl was added last. Unless noted otherwise, all sols were stirred at ambient temperature.

Sol TEOS. TEOS (11.9 g, 51.3 mmol, 10.05 ml), water (1.62 ml, 90 mmol), ethanol (10.2 ml), and HCl (0.10 M, 45 ml) were stirred for 6 hours.

Sol DMAP. DMAP (3.16 g, 14.5 mmol) was added dropwise to a mixture of 6.67 M HCl (2.87 ml) and ethanol (14.0 ml). The resulting solution was stirred for 40 min.

1:9 DMAP/TEOS. Sol DMAP (15.3 ml, 11.0 mmol) was added dropwise to sol TEOS (48.6 ml, 99.3 mmol). The mixture was stirred for 20 min.

50:50 C8/TEOS. A mixture of TEOS (20.9 g, 22.4 mL, 0.10 mol), C8 (27.8 g, 31.6 mL, 0.10 mol), isopropanol (40.0 mL), and 0.100 N HCl (12.3 mL, 1.23 mmol) was stirred for 24 hours.

1:49:50 C18/C8/TEOS. A mixture of C18 (0.54 g, 1.4 mmol, 0.61 mL), C8 (19.5 g, 70.6 mmol, 22.1 mL), TEOS (15.0 g, 72.0 mmol, 16.1 mL), 0.1 N HCl (9.1 mL, 0.91 mmol), and isopropanol (46.2 mL) was stirred at ambient temperature for 24 hours.

1:4:45:50 C18/TDF/C8/TEOS. A mixture of C18 (0.405 g, 1.08 mmol), TDF (2.20 g, 4.3 mmol), C8 (13.4 g, 48.6 mmol), TEOS (11.25 g, 54.0 mmol), ethanol (35.7 mL), and 0.1 M HCl (6.8 mL, 0.68 mmol) was stirred for 24 hours.

1:14:35:50 C18/TDF/C8/TEOS. A mixture of C18 (0.405 g, 1.08 mmol), TDF (7.71 g, 15.1 mmol), C8 (10.4 g, 38.1 mmol), TEOS (11.25 g, 54.0 mmol), ethanol (34.5 mL) and 0.1 M HCl (6.8 mL, 0.68 mmol) was stirred for 24 hours.

Preparation of Coatings. Xerogel films were formed by spin casting 400 μL of the sol precursor onto 25-mm×75-mm glass microscope slides. Prior to use, the slides were soaked in piranha solution for 24 hours, rinsed with copious quantities of deionized water, soaked in isopropanol for 10 min, air dried and stored at ambient temperature. A model P6700 spincoater (Specialty Coatings Systems, Inc.) was used at 100 rpm for 10 seconds to deliver the sol and at 3000 rpm for 30 seconds to coat.

The xerogel coatings were applied to aluminum Q-panels® (102×204 mm, 0.6-mm thickness, type A, alloy 3003 H14, obtained from Q-lab) that had been primed via air-assisted spray with Intergard® 264 at a thickness of 70 to 80 μm. The sol solutions were applied to the surface via dip-coating and air dried for 7 days to give xerogel surfaces of a thickness of ~10 μm as determined by profilometry. Discs of the xerogel-coated aluminum were adhered to the bottom of each well of 24-well polystyrene plates as described previously.

The xerogel coatings were also applied to G10 fiberglass panels (102×204×4.8 mm, Piedmont Plastics, Inc.) that had been primed via brushing with Interlux® Epoxy Primekote at a thickness of 70 to 80 μm. The sol solutions were applied to the surface via dip-coating and the resulting surfaces were air dried for 7 days to give xerogel surfaces of a thickness of ~10 μm as determined by profilometry.

In addition to the experimental coatings, reference T2 poly(dimethylsiloxane) elastomer coatings and the commercial coatings IS700 and IS900 were deposited (0.25 mL) using an Eppendorf Repeater plus pipetter into wells of 24-well plates (6 columns and 4 rows) modified with primed aluminum discs in each well. The primer used was Intergard® 264. Deposition or adhesion of discs was done such that a given coating composition occupied three entire columns of the 24-well plate (12 replicate samples per plate). Coatings were allowed to cure for 24 hours at room temperature and then heated at 50° C. for 24 hours to ensure full cure. (While heating to 50° C. is not in the manufacturer's specifications, 8 years' experience with this procedure has always given good agreement between laboratory and field testing.) For the barnacle reattachment assay, 1.0 mL of each coating was deposited into 3 wells of a stamped aluminum panel.

Surface Energy Analysis. Contact angles were measured for all xerogel formulations with a contact angle goniometer (Rame-Hart, Model NRL 100) at room temperature using the sessile drop technique with water and diiodomethane. Surface free energies ($\gamma_S$) as well as dispersive ($\gamma_D$) and polar components ($\gamma_P$) were determined by using static contact angles for xerogel surfaces on glass slides that had been air-dried for 7 days.

Adult Barnacle Reattachment Assay. An adult barnacle reattachment assay was utilized to gauge the fouling-release performance of the coatings with respect to macrofouling. Adult barnacles of A. amphitrite with a basal diameter of ~5 mm were removed from a coating of T2 on glass and placed on the coating surfaces that had been pre-conditioned for 14 days in running tap water to remove leachates from the coatings prior to the biological assay. Nine barnacles were allowed to reattach to the coating surfaces by immersing the panels in artificial sea water (ASW) for 14 days with daily feedings of brine shrimp nauplii. The reattached barnacles were dislodged from the coating surfaces using a hand held digital force gauge in accordance with ASTM D5618-94. In this regard, the force gauge was placed at the barnacle base plate, parallel to the coating surface, and pushed laterally (i.e., in shear) until the barnacle became detached from the surface. Once detached, the area of the barnacle base plates were measured using digital image analysis (Sigma Scan Pro 5.0) and barnacle adhesion strengths (i.e., critical removal stress in shear (CRS) values) were calculated from the removal force and the area of the barnacle basal plates. The adhesion values for each coating were reported as the mean of the total number of barnacles exhibiting a measurable removal force. The number of reattached barnacles that exhibited any detectable shell breakage or baseplate damage during force gauge removal was recorded for each coating (i.e., fraction removal) and excluded from the CRS calculations.

C. lytica Biofilm Retention and Adhesion. The high-throughput assessment of bacterial biofilm retention on coatings was prepared. After 14 days of pre-conditioning in running tap water to remove leachates, the coating plates were inoculated with 1.0 mL of a $10^7$ cells mL$^{-1}$ suspension of C. lytica in biofilm growth medium (0.1 g yeast extract and 0.5 g of peptone per IL of ASW) and incubated at 28° C. for 24 hours. Following the incubation, the planktonic growth was discarded and the plates were rinsed three times with ASW to remove unattached cells or biofilm that was only weakly attached to the coating surfaces. The retained biofilms were dried at ambient laboratory conditions for ~1 hour and stained with crystal violet (0.3% w/v in deionized water). The crystal violet stain was subsequently extracted from the biofilm retained on the coating surfaces with 0.5 mL of 33% glacial acetic acid and the resulting eluates were transferred to a 96-well plate and measured for absorbance at 600 nm using a multi-well plate spectrophotometer. The absorbance values ($\lambda$=600 nm) were reported as the mean of three replicate wells and were considered to be directly proportional to the amount of biofilm retained on the coating surfaces.

C. lytica biofilm adhesion was determined after 24 hours of incubation using an automated water jet apparatus. The first column of each coating was not treated with the water jet and served as the measure of the biofilm retained on the coating surface before water jetting. The second and third column of each coating was jetted for 5 seconds at a pressure of 69 and 138 kPa, respectively. The percent removal was recorded as the difference in absorbance values between the coating replicates that were exposed to the water-jet and those which were not.

Attachment and Adhesion of N. incerta. The assay for attachment and adhesion of the diatom N. incerta was carried out in a similar manner to the assay for retention and adhesion of C. lytica biofilm. After 14 days of pre-conditioning in running tap water to remove leachates, the coating plates were inoculated with 1.0 mL of a $10^5$ cells $mL^{-1}$ suspension of N. incerta in F/2 medium and incubated at ambient laboratory conditions for 2 hours. Water jetting followed the incubation of the plates. The first column of each coating was not treated with the water jet and served as the measure of the N. incerta cell attachment on the coating surface before water jetting. The second and third column of each coating was jetted for 5 seconds at a pressure of 69 and 138 kPa, respectively. One milliliter of DMSO was immediately added to each well and the plates were incubated in darkness for 30 min. A homogeneous solution was obtained by gentle shaking and 0.2 mL of the solution was transferred to a 96-well plate for fluorescence measurements of chlorophyll using a multi-well plate spectrophotometer (excitation wavelength: 360 nm, emission wavelength: 670 nm). The percent removal was recorded as the difference in relative fluorescence units (RFU) between the coating replicates that were exposed to the water-jet and those which were not.

Field testing. The 1:4:45:50 C18/TDF/C8/TEOS and 1:14:35:50 C18/TDF/C8/TEOS xerogel coatings were applied to fiberglass panels as described above and deployed at a static immersion test site in Morro Bay, Calif. for a series of field tests. Panels were submerged approximately 1 m below the surface from a floating dock. Panels were deployed at the beginning of the heaviest fouling season and were observed monthly over approximately six months. Panels were subjected to tests quantifying antifouling and fouling-release performance. Antifouling performance was quantified in accordance with ASTM D6990-05. Fouling-release performance was estimated using two separate tests: removal of adult barnacles in accordance with ASTM D5618-94 and an adaptation of water jet testing.

Adult barnacles (*Balanus crenatus*) recruited directly onto panels in the field and were then removed from test panels in accordance with ASTM standard D5618-94. Barnacle removal testing was conducted 126 days later once all individuals met the minimum size requirements for testing according to the ASTM standard. Values of CRS were calculated for all barnacles that could be removed from test panels with less than an estimated 10% basal plate remaining on the coating surface as per the ASTM standard. All barnacles that were isolated and met the minimum size requirements were removed from each panel replicate so sample sizes were not equal. Few barnacles settled and grew on the IS900 control panel so this sample size was much smaller than for the other two test coatings; however, CRS was consistent with what was seen in other field trials.

One replicate panel of each formulation was reserved for water-jet testing to provide another measure of FR performance. A pressurized stream of water was applied perpendicular to and ~25 mm away from the surface as evenly as possible across the entire surface of the panel at a series a pressures (40, 80, 120, 180 and 240 psi). Panels were observed after each water pressure was applied and assessed for complete removal of organisms or estimated percentage cover remaining. These estimates were then used to rank coatings based on how easily biofouling could be removed. All water jet testing was done on about one months' accumulated fouling.

Antifouling and physical performance of coatings were evaluated as outlined in ASTM standard D6990-05. Each panel was given a fouling rating with 100 being completely free of fouling. Each panel was also given a physical deterioration rating (PDR) with 100 being completely free of deterioration. Fouling rating is only reported for the $92^{nd}$ day because after that time all panels were altered in order to remove barnacles to measure CRS values.

RESULTS. Characterization of Xerogel Surfaces. Static water contact angles, $\theta_{WS}$, are compiled in Table 4 along with values of surface free energy ($\gamma_S$) and the corresponding dispersive ($\gamma_D$) and polar ($\gamma_P$) components determined for the 10:90 DMAP/TEOS (referred to as DMAP/TEOS in the remainder of the manuscript), 50:50 C8/TEOS (referred to as C8/TEOS in the remainder of the manuscript), 1:1:48:50 C18/C8/TEOS (referred to as C18/C8/TEOS in the remainder of the manuscript), 1:4:45:50 C18/TDF/C8/TEOS, and 1:14:35:50 C18/TDF/C8/TEOS xerogel coatings. Literature values of $\theta_{WS}$ and $\gamma_S$ for T2 and IS700 and IS900 are compiled in Table 4 as are values of Young's modulus for the 1:4:45:50 and 1:14:35:50 C18/TDF/C8/TEOS xerogels. Literature values of Young's modulus for the remaining xerogels, T2. and the commercial standards IS700 and IS900 are also compiled in Table 4 as are literature values of root-mean-square roughness for the five comparative examples of xerogel coatings and the IS700 and IS900 coatings.

Figure 24:
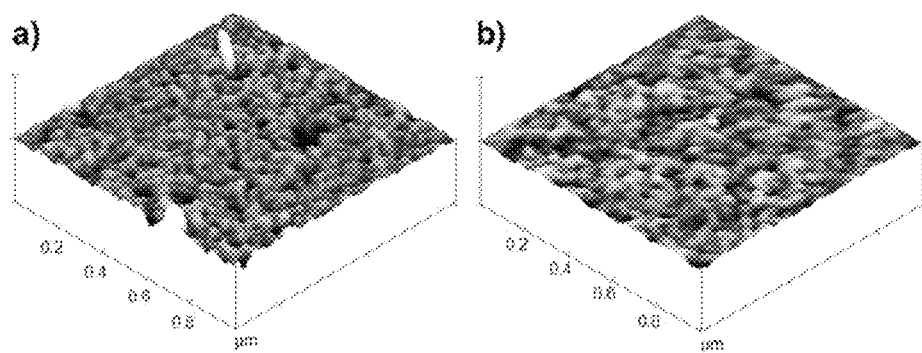
FIG. 24. Representative AFM images of the 1:14:35:50 C18/TDF/C8/TEOS xerogel. Panel (a) is prior to immersion in deionized water. Panel (b) is post-immersion for 24 hours in deionized water and air-dried for 1 hour. (Image size: 1 μm×1 μm, Z-range: ±100 nm.) Both AFM images were acquired in air.

Values of the root-mean-square roughness for the xerogel surfaces (~$10^{-9}$ to $10^{-10}$ m) were calculated from AFM measurements. AFM images of the 1:14:35:50 C18/TDF/C8/TEOS xerogel prior to and after immersion in water are shown in FIG. 24. Values of the root-mean-square roughness for the IS700 and IS900 surfaces (~$6 \times 10^{-5}$ m) were determined by laser profilometry.

AF/FR Properties in Laboratory Testing. Three organisms were used in laboratory testing to characterize AF and FR properties for the xerogel, T2, IS700, and IS900 coatings. Biofilm growth and removal of the marine bacterium *C. lytica* and the attachment and removal of the marine microalga *N. incerta* were measured in this example to determine AF and FR properties towards microfoulers while the adhesion strength of reattached barnacles (*A. amphitrite*) was used to evaluate the FR properties of the coatings toward a macrofouler.

Figure 18:
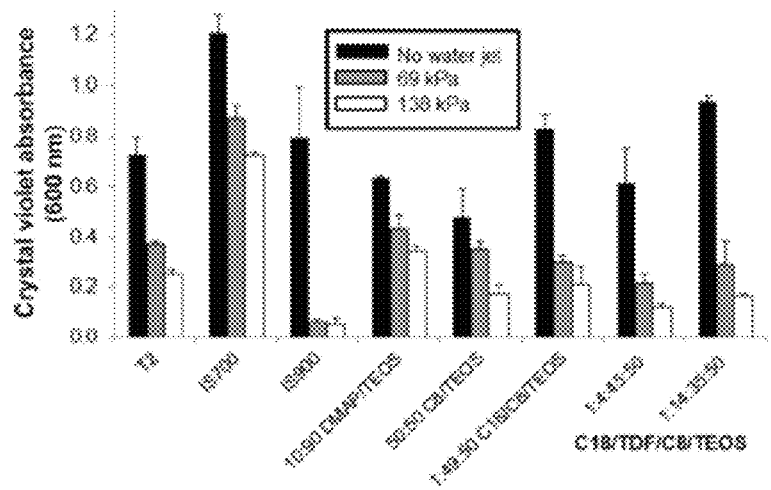
FIG. 18. Representative evaluation of bacterial (*C. lytica*) biofilm retention on xerogel, T2 and commercial surfaces using crystal violet staining. The absorbance value is directly proportional to the amount of biofilm retained on the coating surface a) prior to exposure to the water jet (black bars), b) after 5 second exposure to a water jet pressure of 69 kPa (gray bars) and c) after 5 second exposure to a water jet pressure of 138 kPa (white bars). Absorbance values are reported as the average of three replicates and error bars represent ±one standard deviation of the mean.
Figure 19:
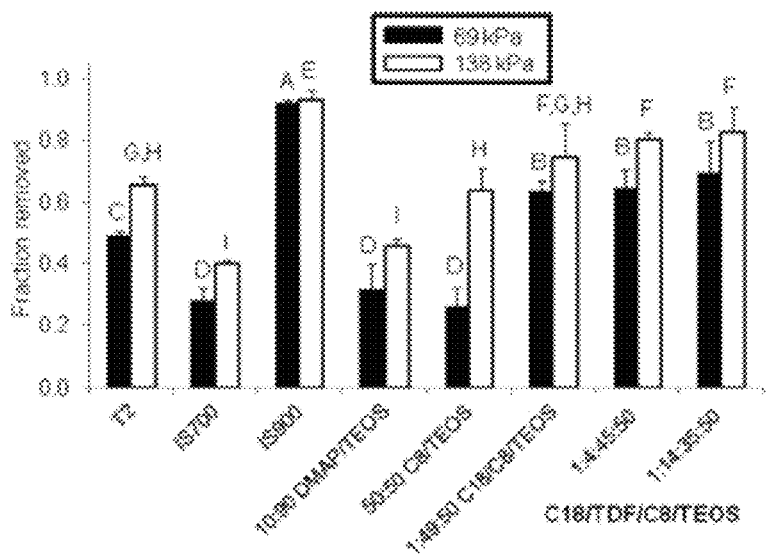
FIG. 19. Representative evaluation of bacterial biofilm adhesion on xerogel, T2 and commercial surfaces. Percent removal of *C. lytica* biofilm a) after 5 second exposure to a water jet pressure of 69 kPa (black bars) and b) after 5 second exposure to a water jet pressure of 138 kPa (white bars). Percent removal values are reported as the average of three replicates and error bars are ±one standard deviation of the mean. Coatings that share a letter have values of biofilm removal that are not significantly different from one another.

The significance level, $\alpha$, for the statistical tests described below was $\alpha=0.05$. There were significant differences among the surfaces in the quantity of biofilm attaching to the material (ANOVA $p<0.0001$, FIG. 18) and the amount of biofilm remaining after water-jetting at 69 kPa (ANOVA $p<0.0001$, FIG. 19) and 138 kPa (ANOVA $p<0.0001$, FIG. 19). Biofilm from *C. lytica* was significantly heavier on the IS700 surface relative to all other surfaces before and after water jetting. Biofilm formation was lower and comparable on all the remaining surfaces (FIG. 18). In terms of percentage removal, the IS900 surface was significantly better in comparison to any of the other surfaces and gave more than 90% removal of biofilm at a water-jet pressure of either 69 or 138 kPa (FIG. 19). The 1:4:45:50 and 1:14:35:50 C18/TDF/C8/TEOS xerogels exhibited >80% removal at 138 kPa, which was significantly greater in comparison to all other surfaces other than IS900 and C18/C8/TEOS. The C18/C8/TEOS xerogel surface was not significantly different from the two TDF-containing xerogel surfaces. The IS700 and DMAP/TEOS xerogel coatings with <50% biofilm removal at 69 or 138 kPa were significantly poorer performers in comparison to all of the other coatings.

Figure 20:
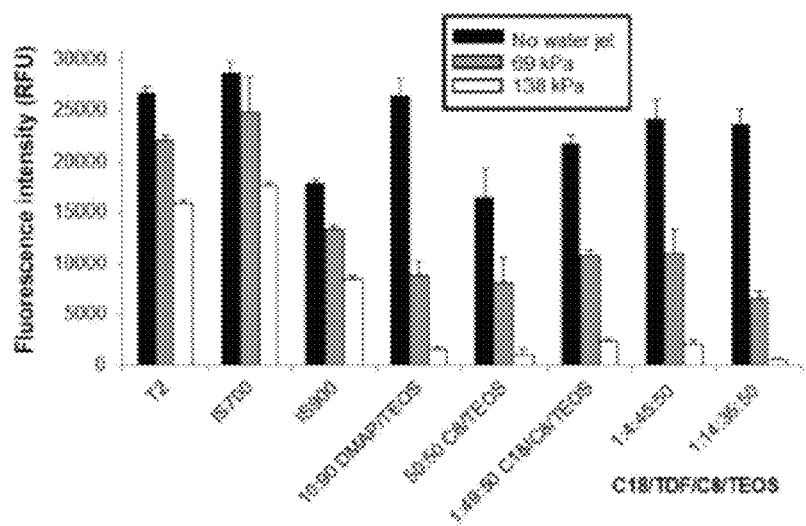
FIG. 20. Representative evaluation of microalgal cell attachment on xerogel, T2 and commercial surfaces. The fluorescence value reported (in relative fluorescence units, RFU) is directly proportional to the number of cells of *N. incerta* attached to the coating surface a) prior to exposure to the water jet (black bars), b) after 5 second exposure to a water jet pressure of 69 kPa (gray bars) and c) after 5 second exposure to a water jet pressure of 138 kPa (white bars). Each value is reported as the mean from three replicate measurements. Error bars represent ±one standard deviation of the mean.
Figure 21:
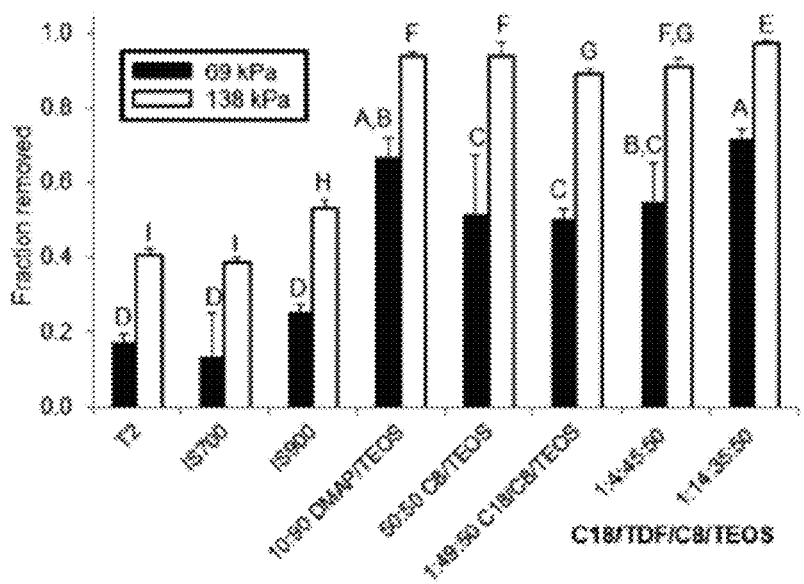
FIG. 21. Representative evaluation of microalgal cell adhesion on xerogel, T2 and commercial surfaces. Percent removal of *Navicula incerta* a) after 5 second exposure to a water jet pressure of 69 kPa (black bars) and b) after 5 second exposure to a water jet pressure of 138 kPa (white bars). Percent removal values are the average of three replicates and error bars represent ±one standard deviation of the mean. Coatings that share a letter have values of microalgal cell removal that are not significantly different from one another.

There were significant differences among the surfaces with respect to attachment of the microalgae (ANOVA $p<0.0001$, FIG. 20) and the removal of the microalgae following water-jetting at 69 kPa (ANOVA $p<0.0001$, FIG. 21) and 138 kPa (ANOVA $p<0.0001$, FIG. 21). Initial microalgae attachment was significantly lower on the C8/TEOS surface relative to all other surfaces with the exception of IS900. Attachment on all of the xerogel surfaces was significantly lower in comparison to attachment on IS700. The removal of $N.$ $incerta$ biomass was significantly greater on all of the xerogel surfaces (50 to 72% removal at 69 kPa, 89 to 97% removal at 138 kPa) in comparison to the T2, IS700, and IS900 surfaces (13 to 25% removal at 69 kPa, 38 to 53% removal at 138 kPa, FIG. 21) at both pressures. At 69 kPa, removal from the 1:14:35:50 C18/TDF/C8/TEOS xerogel coating was significantly greater in comparison to removal from all other coatings with the exception of the DMAP/TEOS coating. At 138 kPa, removal from the 1:14:35:50 C18/TDF/C8/TEOS xerogel coating was significantly greater in comparison to removal from all other coatings.

Figure 22:
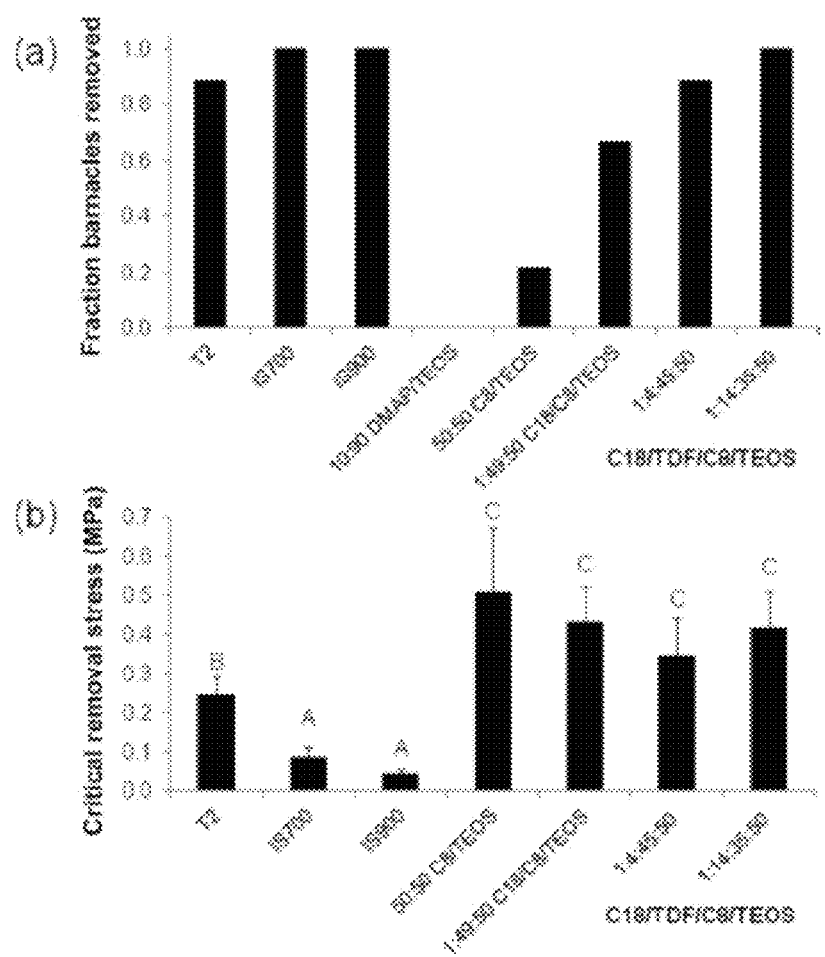
FIG. 22. Representative nine (9) adult barnacles (*A. amphitrite*) were reattached to the xerogel, T2 and commercial coatings for two weeks. a) Fraction of reattached barnacles removed completely via shear pressure and b) critical removal stress (CRS) in MPa for barnacles removed completely. Values of CRS are reported as the mean of barnacle displacements that resulted in a measureable force (no shell breakage or base plate damage, <10% basal plate remaining) and error bars represent ±one standard deviation of the mean. Coatings that share a letter have values of CRS that are not significantly different from one another.

The strength of attachment of reattached adult barnacles was measured via force-gauge measurements with forces applied in shear. Nine barnacles were removed from each surface and the fraction removed completely is shown in FIG. 22$a$. Complete removal was defined as no detectable shell breakage or basal plate remaining on the coating surfaces after force gauge measurements. The critical removal stress (CRS) for removal of barnacles from each surface is shown in FIG. 22$b$. Only those barnacles with <10% basal plate remaining were used in the calculation of CRS as specified by ASTM D 5618-94.

The T2, IS700, IS900, 1:4:45:50 C18/TDF/C8/TEOS xerogel, and 1:14:35:50 C18/TDF/C8/TEOS xerogel surfaces all released >89% of the reattached barnacles completely (FIG. 22$a$). The DMAP/TEOS xerogel surface and the C8/TEOS xerogel surface displayed poor FR behavior (0/9 and 2/9 barnacles, respectively, released completely). The C18/C8/TEOS xerogel was intermediate in behavior (6/9 barnacles released completely).

One-way analysis of variance and Tukey tests indicate that there are significant differences among the surfaces of this example with respect to the CRS (ANOVA $p<0.0001$). Values of CRS were significantly lower on the IS700 (0.090±0.025 MPa) and IS900 surfaces (0.043±0.015 MPa) relative to all the other surfaces (FIG. 22$b$). The CRS for the T2 surface (0.25±0.05 MPa) was significantly lower than for all of the xerogel surfaces. The CRS for the 1:4:45:50 C18/TDF/C8/TEOS xerogel (0.35±0.10 MPa) was the lowest CRS among the xerogels that released barnacles, but none of the values of CRS were significantly different from one another (CRS of 0.35 to 0.51 MPa).

Figure 23:
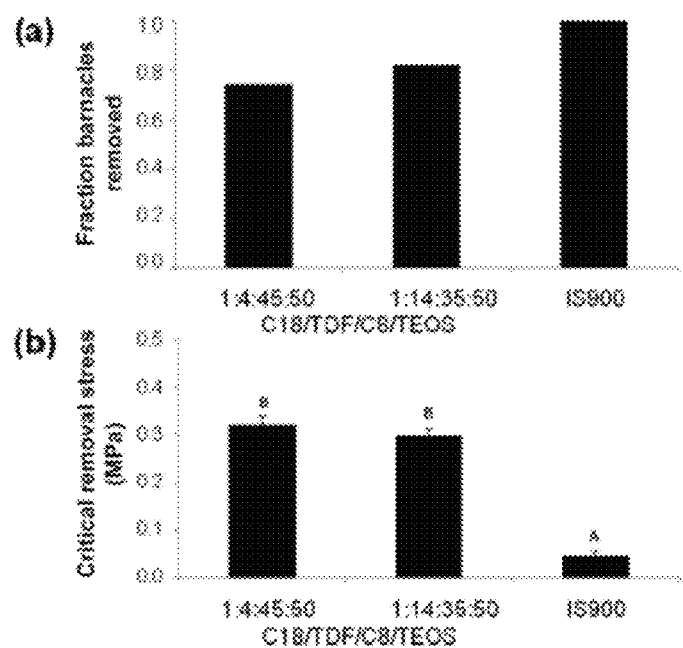
FIG. 23. Representative adult barnacles (*B. crenatus*) recruited, were allowed to grow and then removed from test panels at the Morro Bay static immersion test site. Sample sizes were not equal due to random recruitment and were 70, 78, and 6 for each coating, respectively. a) Fraction of barnacles removed completely via shear pressure and b) critical removal stress (CRS) for barnacles removed completely. Values of CRS are reported as the mean of those animals with no shell breakage or basal plate damage (<10% basal plate remaining). Error bars represent ±one standard effort from the mean. Coatings that share a letter have values of CRS that are not significantly different from one another.

AF/FR Properties in Field Testing. The 1:4:45:50 C18/TDF/C8/TEOS and 1:14:35:50 C18/TDF/C8/TEOS xerogel coatings were also assessed for AF and FR properties under static immersion conditions in the field. Analysis using a one-way ANOVA and Tukey tests indicate that there were significant differences in CRS of barnacles among coating surfaces exposed at the static field site (ANOVA $p<0.00001$). In the field tests, only those barnacles with <10% basal plate remaining following removal were used in the calculation of CRS. Values of CRS were significantly lower on the IS900 surfaces (0.046±0.012 MPa) in comparison to the 1:4:45:50 C18/TDF/C8/TEOS (0.322±0.018 MPa) or 1:14:35:50 C18/TDF/C8/TEOS (0.299±0.014 MPa) xerogel coatings, which were not statistically different from one another (FIG. 23).

The results for water-jet testing of the 1:4:45:50 C18/TDF/C8/TEOS and 1:14:35:50 C18/TDF/C8/TEOS xerogel surfaces showed that the coatings cleaned back relatively well with only small amounts of hard foulers (in this case encrusting bryozoans) and slime remaining on the surfaces after the highest pressure was applied (Table 5). The IS900 control panel cleaned back completely at low pressures and had much less fouling accumulation initially.

Table 6 shows fouling ratings and physical deterioration rating (PDR) for the 1:4:45:50 C18/TDF/C8/TEOS and 1:14:35:50 C18/TDF/C8/TEOS xerogel coatings and the IS900 surface. The fouling ratings of the 1:4:45:50 C18/TDF/C8/TEOS and 1:14:35:50 C18/TDF/C8/TEOS xerogel surfaces were significantly lower in comparison to the IS900 control surfaces (ANOVA, $p<0.001$) but were not significantly different from each other. No defects were observed on any of the coatings for the duration of testing giving a PDR of 100 for all coatings.

Surface energy, elastic modulus, wettability, and roughness are important surface properties for determining the settlement and the ease of removal of fouling. The elastic modulus in particular influences the fracture mechanism of fouling organisms. As shown in Table 4, T2, IS700, and IS900 (all with elastic modulus of ~1 MPa) are low modulus materials. They are typically applied as "thick" coatings (thickness≥150 μm) and macrofoulers often are released by a peeling mechanism involving interfacial slippage with failure at the bioadhesive-surface interface. The interfacial slippage involves both extensional deformation of the adhesive and shrinkage at the base area of. In contrast, the harder (elastic modulus>60 MPa, Table 4), thinner xerogel coatings (~1 to 10 μm by profilometry) cannot undergo similar deformation, and release of fouling will be more dependent upon shear.

The coatings of this example provide an interesting contrast between high-(C8/TEOS, C18/C8/TEOS, and 1:4:45:50 C18/TDF/C8/TEOS xerogels) and low-modulus coatings (T2) with surface energies near the Baier minimum (21.3 to 23.1 mN m$^{-1}$, Table 4), high- (DMAP/TEOS xerogel) and low-modulus coatings (IS700 and IS900) with surface energies higher in comparison to the Baier minimum (34 to 54.7 mN m$^{-1}$, Table 4), and a high-modulus coating (1:14:35:50 C18/TDF/C8/TEOS xerogel) with surface energy below the Baier minimum (17.6 mN m$^{-1}$, Table 4). The removal of barnacles from these surfaces offers a comparison of the importance of these two parameters—modulus and surface energy. All three low-modulus coatings (T2, IS700, IS900) displayed excellent FR behavior with respect to reattached adult barnacles in the laboratory assay as did the high-modulus C18/TDF/C8/TEOS and 1:14:35:50 C18/TDF/C8/TEOS xerogel coatings (FIG. 22$a$). When tested in the field the 1:4:45:50 C18/TDF/C8/TEOS and 1:14:35:50 C18/TDF/C8/TEOS xerogels also showed good FR behavior with many barnacles removing completely (52/70 and 64/78 respectively) as did the IS900 surface (6/6 barnacles removed completely).

While both low- and high-modulus coatings released barnacles, the energy required in the removal process as measured by CRS both in the laboratory assay and field testing indicate the importance of modulus to the removal process. Values of CRS for the 1:4:45:50 C18/TDF/C8/TEOS xerogel (0.35 MPa) and 1:14:35:50 C18/TDF/C8/TEOS xerogel (0.42±0.08 MPa) coatings are 4- to 5-fold greater in comparison to CRS for the IS700 coating (0.090 MPa) and 8- to 10-fold greater in comparison to CRS for the IS900 coating (0.043 MPa). The field testing gave similar results with values of CRS for the 1:4:45:50 C18/TDF/C8/TEOS xerogel (0.32 MPa) and 1:14:35:50 C18/TDF/C8/TEOS xerogel (0.30 MPa) coatings roughly 7-fold greater than CRS for the IS900 coating (0.046 MPa). These results show a similar relationship to the CRS values reported for the low surface energy Teflon® and UHM polyethylene with high modulus (0.588 MPa and 0.776 MPa, respectively) when compared to polydimethylsiloxane coatings of lower modulus (0.09 to 0.29 MPa).

The FR characteristics are contrary to those predicted by surface energy and the Baier curve where the IS700 and IS900 coatings have significantly higher surface energies ($p<0.01$, Student t-test) than either the 1:4:45:50 C18/TDF/C8/TEOS or 1:14:35:50 C18/TDF/C8/TEOS xerogel and would be expected to be poorer performers based on surface energy alone (Baler et al. 1968; Baier 1984). The T2 standard has a value of surface energy similar to those of the two C18/TDF/C8/TEOS xerogels and within the Baier minimum. However, CRS for the T2 surface (0.25 MPa) is significantly lower ($p<0.03$, Student t-test) in comparison to CRS for either C18/TDF/C8/TEOS xerogel surface. It must be remembered, however, that the Baier curve was developed from observations of microfouling and not barnacle attachment. The results emphasize the importance of a thick, low-modulus surface to provide lower values of CRS for the removal of barnacles.

Since the xerogels are all harder, high-modulus surfaces, one can ask the reasonable question of whether release of barnacles follows a trend based on surface energies? The strength of protein adhesion to a series of xerogel coatings reproduced the Baier curve with respect to either surface tension ($\gamma_S$) or critical surface tension ($\gamma_C$). However, the strength of attachment of *Ulva* sporelings as measured by water-jet pressure for removal did not show similar agreement with the Baier curve for the same series of xerogels. In the *Ulva* sporeling study, it was postulated that the amine-containing xerogels might interact chemically with the sporeling adhesive. When the amine-containing xerogels were excluded from the correlation, linear correlations of adhesion strength with either water contact angle or polar contributions to the surface energy ($\gamma_P$) were then observed.

The removal of reattached barnacles from the xerogel surfaces roughly correlated with surface energy. The DMAP/TEOS xerogel coating has a value of $\gamma_S$ (54.7 mN $m^{-1}$) that is well above the Baier zone of minimal bioadhesion and this surface did not release barnacles at all. The basal plate remained affixed to the surface. The 1:4:45:50 C18/TDF/C8/TEOS, C8/TEOS, and C18/C8/TEOS xerogels have values of $\gamma_S$ within the Baier zone of minimal bioadhesion (21.3-23.1 mN $m^{-1}$) and all three surfaces released some barnacles completely (2/9 for C8/TEOS, 6/9 for C18/C8/TEOS, and 8/9 for 1:4:45:50 C18/TDF/C8/TEOS). The value of $\gamma_S$ for the 1:14:35:50 C18/TDF/C8/TEOS xerogel (17.6 mN $m^{-1}$) was well outside the Baier zone of minimal bioadhesion, but on the low energy side, yet released 9/9 reattached barnacles completely. All of the values of CRS for the xerogel surfaces that released barnacles were statistically equivalent (0.35 to 0.51 mN $m^{-1}$, $p>0.20$, Student t-test).

With respect to the xerogel surfaces, one can also consider other factors influencing adhesion strength other than modulus and surface energy. Surface roughness is one parameter with statistically significant differences in all pair-wise comparisons of the xerogel coatings (Table 4, $p<0.005$, Student t-test). Among xerogel coatings that released reattached barnacles, the percentage released completely increased with surface roughness. The C8/TEOS xerogel had the lowest value of root-mean-square roughness and released the fewest barnacles, while the 1:14:35:50 C18/TDF/C8/TEOS xerogel, whose topography as measured by AFM is shown in FIG. 24, had the highest root-mean-square roughness and released all reattached barnacles.

In comparisons of the C8/TEOS, C18/C8/TEOS, and the two C18/TDF/C8/TEOS xerogels, the increase in root-mean-square roughness is also accompanied by chemical segregation of functionality. The C8/TEOS xerogel is "smooth" topographically by AFM imaging of topography and chemically by IR microscopy of bulk chemical composition. The C18/C8/TEOS xerogel in contrast shows a network of nanoscale pores by AFM imaging of topography and regions of higher and lower hydrocarbon content in the bulk surface by IR microscopy. In the two C18/TDF/C8/TEOS xerogels, AFM phase images show islands of harder and softer material, which also appear as chemical inhomogeneities in hydrocarbon and fluorocarbon content in the IR microscopy images. Perhaps the chemical "mosaic" presented by the C18/C8/TEOS and the two C18/TDF/C8/TEOS xerogels contributes to the increased fraction of reattached barnacles removed via shear.

The idea of a chemical "mosaic" also comes into play in comparisons of comparative examples, commercial IS700 and IS900 coatings. With respect to biofilm growth and removal of the *C. lytica* biofilm, there is no apparent correlation of surface energy ($\gamma_S$), water contact angle ($\theta_{Ws}$), elastic modulus or surface roughness with either AF or FR character. The IS700 and IS900 coatings, with nearly identical values of elastic modulus, surface energy, and roughness were the "best" and "worst" surfaces, respectively, for FR behavior with *C. lytica* biofilm among the seven coatings of this example. However, the fluoropolymer-modified silicone composition of 15900 provides a chemical "mosaic" (enforced by the block co-polymer structure) not present in the silicone-based IS700, and chemical interactions of the surface with the biofilm may be quite different. It is also interesting that the C18/C8/TEOS and the two C18/TDF/C8/TEOS xerogels—all with demonstrated chemical segregation of functionality—also outperformed the other chemically homogenous xerogel surfaces, T2 silicone, and IS700 silicone with respect to *C. lytica* removal and were comparable to IS900.

The attachment of diatoms to a surface involves the initial secretion of an adhesive consisting of various proteoglycans. Attachment of diatoms appears to be stronger on hydrophobic surfaces relative to hydrophilic surfaces. However, the seven coatings of this example suggest that factors other than surface energy and wettability may be involved. The low-modulus and "rough" commercial T2, IS700, and IS900 coatings all gave poorer FR performance than all of the xerogel coatings with respect to percentage removal of microalgae biomass (FIG. 21) and/or remaining microalgae biomass (FIG. 20). These data suggest that the diatoms adhere more strongly to the low elastic modulus/higher roughness materials relative to the higher modulus/smoother materials and that the strength of adhesion is independent of the surface energy of the coatings. Surface roughness may be an important contributor to these differences. The IS700 and IS900 coatings have a roughness on the order of $6\times10^{-5}$ m, which is much greater than the xerogel surfaces with roughness on the order of $10^{-9}$ to $10^{-10}$ m (Table 4). The rougher IS700 and IS900 coatings may contribute to stronger "mechanical locking" of the secreted adhesives to these surfaces relative to the smoother xerogel surfaces, which might be more significant than factors such as surface energy in determining the strength of adhesion of diatoms to these surfaces.

The tunability of the xerogel surfaces can show improved release of barnacles and other hard foulers through control of surface energy, chemical homogeneity/heterogeneity, and roughness. The xerogel coatings may be particularly useful as AF/FR surfaces in applications where, for example, thicker coatings are not optimal or practical. The xerogel coatings of this example, are optically transparent and have applications as AF/FR coatings where optical transparency is important (e.g., marine sensors, underwater cameras, submersible solar panels). Typically, coatings for these applications are thinner and the xerogels are appropriate materials.

The performance of 1:4:45:50 and 1:14:35:50 C18/TDF/C8/TEOS xerogel coatings in the field with respect to barnacle removal and, after six months in the field, physical condition (PDR=100 for both) indicates that these materials are quite robust. The xerogel coatings may be excellent candidates for deployment where grooming in the field will be used to control the buildup of biofouling and coatings will need to survive the physical demands of grooming.

The control of chemical heterogeneities in the xerogel surfaces, surface energies, and roughness as well as the control of the physical characteristics of the coatings (thickness, modulus) all provide means for improving the AF/FR performance of the xerogel surfaces. The path forward is characterized by defining the surface properties and physical characteristics necessary to minimize the settlement and adhesion of both microfoulers and macrofoulers under a variety of field conditions.

TABLE 4

Experimental and reported values of static water contact angles ($\theta_{Ws}$), surface energies ($\gamma_S$) with dispersive ($\gamma_S$) and polar components ($\gamma_S$), modulus, and surface roughness for the xerogel surfaces of this example, commercial IS700 and IS900 coatings, and T2 standard.

| Sample | $\theta_{Ws}$,[a] ° | $\gamma_S$,[b] mN m$^{-1}$ | $\gamma_D$,[b] mN m$^{-1}$ | $\gamma_P$,[b] mN m$^{-1}$ | %$\gamma_P$[b] | Modulus, MPa | Roughness, m |
|---|---|---|---|---|---|---|---|
| T2 | 109[c] | 23.0 ± 0.4[d] | — | — | — | 0.6[d] | — |
| IS 700 | 99 ± 1[e] | 33.9 ± 0.8[e] | 33.6 ± 0.8[e] | 0.3 ± 0.3[e] | 0.8 ± 0.8[a] | 1.1[e] | 6.6 × 10$^{-5e}$ |
| IS900 | 76 ± 2[f] | 34.2 ± 2.0[f] | 24.8 ± 1.8[f] | 9.1 ± 0.5[f] | 27 ± 2[f] | 1.0[e] | 5.4 × 10$^{-5e}$ |
| DMAP/TEOS | 42 ± 1 | 54.7 ± 2.7 | 23.0 ± 0.6 | 31.7 ± 3.3 | 58 ± 3 | 1.7 × 10$^{4f}$ | (6.0 ± 0.3) × 10$^{-10f}$ |
| C8/TEOS | 100 ± 1 | 21.3 ± 0.3 | 19.8 ± 0.1 | 1.5 ± 0.3 | 7 ± 1 | 60[f] | (2.4 ± 0.2) × 10$^{-10g}$ |
| C18/C8/TEOS | 110 ± 1 | 23.1 ± 0.4 | 21.0 ± 0.7 | 1.2 ± 0.3 | 5 ± 1 | 1.0 × 10$^{3f}$ | (1.15 ± 0.04) × 10$^{-9g}$ |
| C18/TF/C8/TEOS: | | | | | | | |
| 1:4:45:50 | 103 ± 1 | 21.8 ± 2.8 | 18.4 ± 1.3 | 3.5 ± 1.6 | 16 ± 6 | 300 ± 40 | (1.87 ± 0.20) × 10$^{-9h}$ |
| 1:14:35:50 | 103 ± 1 | 17.6 ± 0.5 | 15.1 ± 0.5 | 2.6 ± 0.3 | 15 ± 1 | 250 ± 30 | (2.31 ± 0.21) × 10$^{-9h}$ |

[a]Mean of five (5) independent measurements for coatings stored in air prior to measurement. ± one standard deviation.
[b]Mean of three (3) independent measurements for coatings stored in air for 7 days prior to measurement.
[c]From Tang et al. 2005.
[d]From Feinberg et al. 2003.
[e]From Dobretsov and Thomason 2011.
[f]From Bennett et al. 2010.
[g]From Gunari et al. 2011.
[h]From Sokolova et al. 2012.

The first five entries are comparative examples.

TABLE 5

Summary of water-jet testing. Values indicate the lowest water pressure (psi) required to remove all fouling from coating surface (green). If complete removal was not achieved the estimated percent cover of fouling remaining is in parenthesis following the highest applied water pressure (≤10%, yellow; >10%, pink). Dashes indicate that none of that fouling type was present on the panel initially.

| | Date | | | | | | | | | | | |
|---|---|---|---|---|---|---|---|---|---|---|---|---|
| | May 20th 2011 | | | Jun. 21st, 2011 | | | Sep. 26th, 2011 | | | Nov. 1st, 2011 | | |
| Panel | Slimes | Soft | Hard | Slimes | Soft | Hard | Slimes | Soft | Hard | Slimes | Soft | Hard |
| IS900 | 120 | — | — | 240 | — | — | 80 | 40 | 40 | 80 | 40 | 40 |
| C18/TDF/C8/TEOS: | | | | | | | | | | | | |
| 1:4:45:50 | 240 (5) | 80 | 40 | 240 (17) | 120 | 240 (2) | 240 (10) | 120 | 240 (2) | 240 (80) | 240 | 240 (10) |
| 1:14:35:50 | 240 (5) | 80 | 40 | 240 (15) | 120 | 240 | 240 (10) | 120 | 240 (1) | 240 (70) | 240 | 240 (8) |

The first entry is a comparative example.

TABLE 6

Fouling rating (after 3-months testing), physical deterioration rating (PDR, after 6-months testing), number of barnacles removed completely (pushed) and critical removal stress (CRS) for barnacles removed completely for each coating formulation.

| Sample | Fouling Rating[a] | PDR | Barnacles Removed (Pushed) | CRS, MPa[b] |
|---|---|---|---|---|
| IS900 | 67 ± 3 | 100 | 6 (6) | 0.046 ± 0.012 |
| C18/TF/C8/TEOS: | | | | |
| 1:4:45:50 | 17 ± 3 | 100 | 52 (70) | 0.322 ± 0.018 |
| 1:14:35:50 | 22 ± 7 | 100 | 64 (78) | 0.299 ± 0.014 |

[a]Mean of three panels. Error limits are ±1 SEM.
[b]Mean of barnacles removed completely (<10% basal plate remaining). Error limits are ±1 standard deviation of the mean.

The first entry is a comparative example.

Atomic Force Microscopy (AFM) Measurements. The samples were imaged by atomic force microscopy (AFM) using a Nanoscope Dimension 3100 scanning probe microscope (Bruker AXS) in an environmentally controlled laboratory with the relative humidity set at 25%. Photomicrographs were acquired using TappingMode™ Atomic Force Microscopy (TM-AFM) under ambient conditions with a single crystal silicon Nanoprobe™ with a spring constant of ca. 17 to 43 N/m and resonance frequencies in the 262 to 359 kHz range. TappingMode™ AFM images were acquired at a 1-μm scan size with the z-scale set to 100-nm. Nanoindentation experiments yielded force-indentation curves, which were analyzed with custom-programmed analysis software (Igor Pro, Wavemetrics) allowing the calculation of the Young's modulus for the 1:4:45:50 and 1:14:35:50 C18/TDF/C8/TEOS xerogels.

The Young's modulus (Table 4) was determined by considering load-indentation dependence for a paraboloidal tip shape given by equation (1):

$$F = \frac{4E\sqrt{R}}{3(1-\nu^2)}\delta^{3/2} \qquad (1)$$

Here, F is the loading force in nN, E is Young's modulus in Pa, R is the radius of curvature of the tip in nm, δ is the indentation in nm, and ν is the Poisson's ratio (0.3).

Example 4

This is an example of the preparation and characterization of xerogel films of the present invention.

Mixtures of n-octadecyltrimethoxysilane (C18, 1 to 5 mole %), n-octyltriethoxysilane (C8) and tetraethoxysilane (TEOS) gave xerogel surfaces of varying topography. The 1:49:50 C18/C8/TEOS xerogel formed 100 to 400-nm-wide, 2 to 7-nm deep pores by AFM while coatings with ≥3% C18 were free of such features. Segregation of the coating into alkane-rich and alkane-deficient regions in the 1:49:50 C18/C8/TEOS xerogel was observed by IR microscopy. 48-hour immersion in ASW gave no statistical difference in surface energy for the 1:49:50 C18/C8/TEOS xerogel and a significant increase for the 50:50 C8/TEOS xerogel. Settlement of barnacle cyprids and removal of juvenile barnacles, settlement of zoospores of the alga *Ulva linza*, and strength of attachment of 7-day sporelings were compared amongst the xerogel formulations. Settlement of barnacle cyprids was significantly lower in comparison to glass and polystyrene standards. The 1:49:50 and 3:47:50 C18/C8/TEOS xerogels were comparable to PDMSE with respect to removal of juvenile barnacles and sporeling biomass, respectively.

Materials and Methods. Chemical Reagents. Deionized water was prepared to a specific resistivity of at least 18 MΩ using a Barnstead NANOpure Diamond UV ultrapure water system. Tetraethoxysilane (TEOS), n-octadecyltrimethoxysilane (C18), and n-octyltriethoxy-silane (C8) were purchased from Gelest, Inc. and were used as received. Ethanol was purchased from Quantum Chemical Corp. Hydrochloric acid was obtained from Fisher Scientific Co. Borosilicate glass microscope slides were obtained from Fisher Scientific, Inc.

Sol Preparation. The sol/xerogel composition is designated in terms of the molar ratio of Si-containing precursors. Thus, a 50:50 C8/TEOS composition contains 50 mole % C8 and 50 mole % TEOS. In all of the sol preparations described below, the aqueous HCl was added last.

50:50 C8/TEOS. A mixture of TEOS (2.09 g, 2.24 mL, 10 mmol), C8 (2.78 g, 3.16 mL, 10 mmol), isopropanol (4.0 mL), and 0.100 N HCl (1.23 mL, 0.123 mmol) was capped and stirred at ambient temperature for 24 hours.

5:45:50 C18/C8/TEOS. A mixture of C18 (0.269 g, 0.720 mmol, 0.305 mL), C8 (1.79 g, 6.48 mmol, 2.03 mL), TEOS (1.50 g, 7.20 mmol, 1.61 mL), 0.1 N HCl (0.91 mL, 0.09 mmol), and isopropanol (4.62 mL) was stirred at ambient temperature for 24 hours.

4:46:50 C18/C8/TEOS. A mixture of C18 (0.215 g, 0.580 mmol, 0.244 mL), C8 (1.83 g, 6.62 mmol, 2:08 mL), TEOS (1.50 g, 7.20 mmol, 1.61 mL), 0.1 N HCl (0.91 mL, 0.09 mmol), and isopropanol (4.62 mL) was stirred at ambient temperature for 24 hours.

3:47:50 C18/C8/TEOS. A mixture of C18 (0.161 g, 0.430 mmol, 0.183 mL), C8 (1.87 g, 6.77 mmol, 2.12 mL), TEOS (1.50 g, 7.20 mmol, 1.61 mL), 0.1 N HCl (0.91 mL, 0.09 mmol), and isopropanol (4.62 mL) was stirred at ambient temperature for 24 hours.

2:48:50 C18/C8/TEOS. A mixture of C18 (0.108 g, 0.29 mmol, 0.122 mL), C8 (1.91 g, 6.91 mmol, 2.17 mL), TEOS (1.50 g, 7.20 mmol, 1.61 mL), 0.1 N HCl (0.91 mL, 0.09 mmol), and isopropanol (4.62 mL) was stirred at ambient temperature for 24 hours.

1:49:50 C18/C8/TEOS. A mixture of C18 (0.054 g, 0.14 mmol, 0.061 mL), C8 (1.95 g, 7.06 mmol, 2.21 mL), TEOS (1.50 g, 7.20 mmol, 1.61 mL), 0.1 N HCl (0.91 mL, 0.09 mmol), and isopropanol (4.62 mL) was stirred at ambient temperature for 24 hours.

Xerogel Film Formation. Xerogel films were formed by spin casting 400 μL of the sol precursor onto 25-mm×75-mm glass microscope slides. Prior to use, the slides were soaked in piranha solution for 24 hours, rinsed with copious quantities of deionized water, soaked in isopropanol for 10 min, air dried and stored at ambient temperature. A model P6700 spincoater (Specialty Coatings Systems, Inc.) was used at 100 rpm for 10 seconds to deliver the sol and at 3000 rpm for 30 seconds to coat.

For barnacle cyprid assays, glass 20-mm×60-mm Petri dish bottoms (VWR Scientific, Inc.) were soaked in piranha solution for 24 hours, rinsed with copious quantities of deionized water, and stored in an oven at 110° C. until use. The Petri dish bottoms were cooled to ambient temperature and 600 μL of the appropriate sol precursor was added and the Petri dish was manipulated until the bottom surface and approximately 5 mm of the side surface were covered. The excess sol precursor was removed via pipette. All coated surfaces (glass slides and Petri dishes) were dried at ambient temperature for at least 7 days prior to analysis.

Imaging Transmission Infrared (IR) Microscopy of Xerogel Samples. Imaging transmission IR microscopy was carried out by using a Bruker Vertex 70 and Hyperion 3000 IR microscope (4 cm$^{-1}$, 64 scans, 15× objective, 64×64 focal plane array). Samples were prepared by spin casting 400 µL of the sol precursor onto 25-mm×75-mm glass microscope slides and air drying the films at ambient temperature for at least seven days. Prior to IR imaging, xerogel films were soaked in doubly deionized water at 25° C. for 24 hours and then dried at 60° C. for 2 hours.

Atomic Force Microscopy (AFM) Imaging Measurements. In order to determine surface roughness, xerogel samples were imaged using an atomic force microscope (AFM). In initial experiments, xerogel samples were immersed in artificial seawater (ASW) for 1 hour, rinsed with deionized water, and then air dried for 2 hours. Following immersion for 1 hour in ASW, no significant changes in water contact angle were observed over a 2-hour time period for samples dried in the air at ambient temperature. AFM images were obtained using the Molecular Force Probe AFM (Asylum Research, Santa Barbara, Calif.). Rectangular shaped silicon tips with a radius of curvature of <8 nm (NCH_W, NanoWorld, Switzerland) and with a nominal spring constant of 42 N/m were used. Intermittent contact mode imaging was used to obtain the AFM images.

The 1:49:50 C18/C8/TEOS xerogel was allowed to equilibrate for 48 hours in ASW and was then imaged in ASW using contact mode AFM imaging. Images were obtained using silicon nitride AFM tips (Veeco, MLCT) with a nominal spring constant of 100 pn/nm.

Surface Energy Analysis. Contact angles were measured for all xerogel formulations with a contact angle goniometer (Raine-Hart, Model NRL 100) at room temperature using the sessile drop technique. The xerogel films were stored in air prior to characterization and measurements were performed in air. Up to 13 different diagnostic liquids were used including: water, glycerol, formamide, thiodiglycol, methylene iodide, 1-bromonaphthalene, 1-methylnaphthalene, dicyclohexyl, n-hexadecane, n-tridecane, n-decane, n-octane, and n-heptane. Liquid/vapor surface tensions of these liquids were determined using data obtained with a ring tensiometer (Cenco-duNuoy). The technique of "advanced angle" analysis was used. Zisman plots were constructed by plotting the cosine of the average angle measured for each liquid against the liquid/vapor surface tension of the diagnostic liquid. A linear least squares analysis was performed to determine the sample's critical surface tension ($\gamma_C$) at the cos θ=1 axis. The data were also treated to give the surface free energy ($\gamma_S$). For the 2:48:50 C18/C8/TEOS and 4:46:50 C18/C8/TEOS xerogels, values of $\gamma_S$ were estimated using methylene iodide and water.

Biofouling Assays with Barnacles. Barnacle cypris larvae were obtained from Duke University Marine Lab. Glass controls were acid washed in 10% HCl for 2 hours, rinsed well with deionized water, and allowed to dry completely prior to cyprid settlement. Silastic® T2 coated slides c. 500 nm in thickness, provided by Dr. AB Brennan, University of Florida, were included in the assays to provide a standard fouling-release coating.

Cyprid Settlement Assays. Approximately 5 mL of seawater was added to each xerogel-coated Petri dish. This volume covered the bottom of the dish and allowed the cyprids free range of movement across the surface. A 400-µl drop of seawater containing between 30 and 60 2 to 4-day-old barnacle cypris larvae was then added to each of the dishes. The PDMSE (Silastic® T2) standard on glass microscope slides could not be completely immersed. A 400-µl drop of seawater containing between 20 and 40 2 to 4-day-old cypris larvae was added to the PDMSE surfaces. The larvae were allowed to settle for 48 hours at which time the percentage of barnacles that settled in each dish were counted. The average percent settlement for each of the experimental coatings was then compared to the glass and polystyrene standards. The concurrent settlement on the PDMSE (Silastic® T2) standard was used as a positive control for larval metamorphic competence.

Barnacle Removal Assays. A 400-µl drop of seawater containing between 20 and 40 2 to 4-day-old cypris larvae was placed on the xerogel surface coated on glass microscope slides. The surfaces with larvae were placed in a constant temperature incubator at 25° C. on a 12 hours:12 hours light: dark cycle and larvae were allowed to settle for 48 hours. Newly metamorphosed juveniles on their respective coatings were transferred to growth chambers and kept in the incubator where they were fed the unicellular green alga *Dunaliella tertiolecta* and the diatom *Skeletonema costatum* for two weeks, and then a mixture of *D. tertiolecta*., *S. costatum*, and naupliar larvae of *Artemia* sp. for an additional week. Juveniles were then transferred to a 16-L aquarium tank in an automated rack system with temperature, salinity, and pH monitors and programmed for a 10% daily water change. Barnacles in the tank were fed a 500-mL flask of *Artemia* sp. 3 times a week for 4 to 6 weeks, which is the time it took the juvenile barnacles to reach a basal plate diameter of 3-5 mm, the minimum size necessary to conduct force gauge tests according to ASTM D 5618.

The procedures for critical removal stress were followed from ASTM D 5618 with the following modifications: (i) The force measuring device was operated by a motorized stand, thus insuring a constant application of force during dislodgement; and (ii) Barnacle dislodgement studies from coatings were performed under water. The apparatus consists of an IMADA ZP-11 digital force gauge (11.2 lb) mounted on an IMADA SV-5 motorized stand. The slides are clamped into a custom-built Plexiglas chamber that allows their complete submersion during dislodgement tests.

Juvenile barnacles were selected for testing based on healthy appearance and minimum size requirements. Only barnacles occurring at least 5 mm from the edges of the slide were tested. Other barnacles in close proximity to the test subject were removed if they could potentially interfere with measurements. Prior to removal of barnacles each basal plate was photographed using a Canon™ EOS 10D camera attached to an Olympus™ SZX12 dissecting microscope, and images were calculated using NIH's ImageJ. After photographs were taken, the slide was clamped into the Plexiglas chamber. The force gauge mounted on the motorized stand was used to apply a shear force to the base of the barnacles at a rate of approximately 4.5 N s$^{-1}$ until the organism was detached. Force was applied parallel to the film surface. The force required for detachment was noted and observations were made as to the mode of failure. If any portion of the base of the organism was left attached to the substratum, the test was deemed void for removal. The surfaces were examined visually for damage to the xerogel film caused by barnacle removal and by stereomicroscope if there were any ambiguity. The critical removal stress was calculated by dividing the force (F, Newtons) required to remove the test subject by the area of attachment (A, mm$^2$). For barnacles where a portion of the base of the organism was left attached to the substratum, the remaining basal plate is photographed and the exact percentage remaining after testing (% BPR) is calculated with digital image analysis.

Biofouling Assays with *Ulva*. Coatings applied to glass slides were equilibrated in circulating deionized water for 24 hours prior to the start of assays with algae. One hour prior to the assay, the slides were transferred to ASW. Silastic® T2 coated slides c. 500 μm in thickness, provided by Dr. AB Brennan, University of Florida, were included in the assays to provide a standard fouling-release coating.

Settlement of Zoospores of *Ulva*. Fronds of *Ulva linza* were collected from Llantwit Major, Wales (51840'N; 3848'W) and a spore suspension of $1.5 \times 10^6$ spores mL$^{-1}$ prepared. Three replicate slides of each treatment were placed in individual wells of 'quadriperm' polystyrene culture dishes and 10 mL of spore suspension were added. Dishes were incubated in the dark for 1 hour at ~20° C. After incubation the slides were gently washed in ASW to remove unattached (swimming) spores. Slides were fixed in 2.5% glutaraldehyde. The density of spores attached to the surfaces was counted using an image analysis system attached to a fluorescence microscope. Spores were visualized by autofluorescence of chlorophyll. Counts were made for thirty (30) fields of view (each 0.17 mm$^2$), 1 mm apart over the central region of each slide, using image analysis software (Imaging Associates Ltd.) attached to a Zeiss epifluorescence microscope. Spore settlement data are expressed as the mean number of spores adhered per mm$^2$ with 95% confidence limits (n=90).

Adhesion strength of Sporelings of *Ulva*. Spores were allowed to settle as described above. After washing away unattached spores, spores that had attached to the test surfaces were cultured in dishes containing supplemented seawater medium that was changed every 2 days. The dishes were placed in an illuminated incubator (75 mW m$^{-2}$ s$^{-1}$ incident irradiation) for 7 days during which time the spores germinated and developed into sporelings (young plants).

The biomass produced was quantified by measuring the fluorescence of chlorophyll in a Tecan fluorescence plate reader (excitation=430 nm, emission=670 nm). Fluorescence was measured as relative fluorescence units (RFU) and was directly proportional to the quantity of biomass present. The RFU value for each slide was the mean of 70 point fluorescence readings taken from the central region.

Sporeling adhesion strength was determined by exposing the slides to an impact pressure of 54 kPa from an automated water jet, which traversed the central region of each slide. Three replicate slides of each coating were used in the analysis. The biomass that remained in the sprayed area after exposure to the water jet was quantified as described above. Percentage removal of sporelings was determined by comparison of the biomass (RFU) before exposure with that remaining attached to the coatings after exposure to the water jet.

Characterization of Xerogel Surfaces. FIG. 3 presents IR microscopy images of the 50:50 C8/TEOS (panels a and b) and 1:49:50 C18/C8/TEOS (panel c and d) xerogel films integrating the hydrocarbon region (2800 to 3000 cm$^{-1}$). The spatial resolution for the insets of panels a and c and panels b and d (150 μm×150 μm images) is 2.7 μm. FIG. 3a also shows the extracted IR spectra from five regions of the integrated image of the 50:50 C8/TEOS xerogel. FIG. 3c shows extracted IR spectra from three indicated regions of the integrated image of the 1:49:50 C18/C8/TEOS xerogel: the high-absorbance and low absorbance regions as well as one from a "flat" region. Segregation of the more hydrophobic component (larger IR absorbance) in the 1:49:50 C18/C8/TEOS xerogel film is clearly indicated in FIGS. 3c and 3d. The sol gel process produces xerogels with residual silanol functionality (3200 to 3700 cm$^{-1}$; FIG. 3, panels a and b) which is uniformly distributed across the 50:50 C8/TEOS and 1:49:50 C18/C8/TEOS xerogel surfaces (IR microscopy images not shown). However, the hydrocarbon signal is significantly more homogeneous across the 50:50 C8/TEOS sample in comparison to the 1:49:50 C18/C8/TEOS sample.

FIG. 1 shows AFM topographic images (1 μm×1 μm) of the 50:50 C8/TEOS (panel a), 4:46:50 C18/C8/TEOS (panel b), 3:47:50 C18/C8/TEOS (panel c), and 2:48:50 C18/C8/TEOS (panel d) xerogel surfaces after immersion in ASW for 1 hour, rinsing with distilled water, and air drying for 2 hours. A pattern of nanopores is apparent on the 2:48:50 C18/C8/TEOS xerogel surface that is not apparent on the other surfaces. A 5 μm×5 μm image of the 1:49:50 C18/C8/TEOS xerogel surface after immersion in ASW for 1 hour, rinsing with distilled water, and air drying for 2 hours is shown in FIG. 2a indicating a pattern of larger nanopores (in comparison to the 2:48:50 C18/C8/TEOS xerogel) over the entire surface. Profilometry of several of the nanopores of FIG. 2a indicated a depth of 2 to 7 nm and widths on the order of 100 to 400 nm.

A 5 μm×5 μm AFM image of the 1:49:50 C18/C8/TEOS xerogel surface after immersion in ASW for 48 hours and imaging in ASW is shown in FIG. 2b. As described below, the 1:49:50 C18/C8/TEOS xerogel surface has equilibrated with ASW after 48 hours. The nanopores are less pronounced, but still apparent and larger structural features on the order of 2 to 3 μm across and ±2 to 3 nm in height/depth are more pronounced in FIG. 2b relative to FIG. 2a.

The roughness of the surfaces shown in FIGS. 1 and 2a was calculated by measuring the root mean square roughness ($R_{rms}$) on five 1-μm×1-μm images for each sample, where $R_{rms}$ is defined as the root mean square average of the topographic deviations (t) as shown in eq 1:

$$R_{rms} = \sqrt{\frac{1}{N}\sum_{i=1}^{N}(t_i - \bar{t})^2} \qquad (1)$$

Values of $R_{rms}$ are compiled in Table 7. The 50:50 C8/TEOS, 4:46:50 C18/C8/TEOS, and 3:47:50 C18/C8/TEOS surfaces have a very low surface roughness (<0.25 nm) when the surfaces have been immersed in ASW for 1 hour, rinsed with distilled water, and air dried for 2 hours (Table 7). The 2:48:50 C18/C8/TEOS and 1:49:50 C18/C8/TEOS surfaces display increased values of $R_{rms}$ (0.67±0.03 and 1.15±0.04 nm, respectively, Table 7).

Values of $\gamma_C$ and $\gamma_S$ were determined for surfaces stored in air by comprehensive contact angle analysis. The 50:50 C8/TEOS and the C18/C8/TEOS xerogel surfaces have similar values of $\gamma_C$ (21.3-22.4 mN m$^{-1}$) and $\gamma_S$ (22.8-27.1 mN m$^{-1}$) as shown in Table 7. Measured values of $\gamma_C$ for the xerogel surfaces are quite similar to $\gamma_C$ for PDMSE (23 mN m$^{-1}$).

Prior to the comprehensive contact angle analysis, the xerogel films were stored in air for several weeks until values of $\theta_{W_S}$ were no longer increasing and measurements were also performed in air. The static water contact angles, $\theta_{W_S}$, for all of the C18-containing xerogel coatings were higher in comparison to $\theta_{W_S}$ for the 50:50 C8/TEOS coating ((100±1)°, Table 7) with the 1:49:50 C18/C8/TEOS coating having the highest value of $\theta_{W_S}$ ((111.2±0.2)°, Table 7).

The 50:50 C8/TEOS and 1:49:50 C18/C8/TEOS xerogel coatings were immersed in ASW for various periods of time to examine the impact of the aqueous environment on $\theta_{W_S}$. Following immersion in ASW, the xerogel films were rinsed with distilled water, dried with a stream of argon (filtered through DriRite®) at ambient temperature for 2 min prior to contact angle measurement. For the 50:50 C8/TEOS xerogel, $\theta_{W_S}$ was unchanged after 4-hour immersion in ASW ((99 f)$_2$)°, decreased to (93±2)° after 24 hours of immersion, to (87±1)° after 48 hours of immersion, and remained constant with longer immersion times (up to 1 week). For the 1:49:50 C18/C8/TEOS xerogel, the value of $\theta_{W_S}$ decreased to (104±1)° after 4 hours of immersion in ASW and to (96±1)° after 24 hours of immersion in ASW where it remained constant.

The "recovery" of the 1:49:50 C18/C8/TEOS xerogel surface following immersion in an aqueous environment was examined with surfaces that had been soaked in deionized water. The value of $\theta_{W_S}$ decreased from (110±1)° prior to immersion in deionized water to (87±2)° after 1 week of immersion. Upon standing in air at ambient temperature, values of $\theta_{W_S}$ increased with time returning to pre-immersion values (>107°) after 4 weeks.

Values of $\gamma_S$ were estimated for the 50:50 C8/TEOS and 1:49:50 C18/C8/TEOS xerogels following immersion in ASW with water and methylene iodide contact angles. Prior to immersion in ASW, values of $\gamma_S$ were 27.1±0.3 mN m$^{-1}$ for the 50:50 C8/TEOS xerogel surface and 24.8±1.1 mN m$^{-1}$ for the 1:49:50 C18/C8/TEOS xerogel surface (Table 7). Following immersion in ASW, $\gamma_S$ increased to 35.2±0.7 mN m$^{-1}$ for the 50:50 C8/TEOS xerogel surface over the 48-hour to 96-hour immersion window and 25.6±1.1 mN m$^{-1}$ for the 1:49:50 C18/C8/TEOS xerogel surface over the 24-hour to 96-hour immersion window.

Settlement of Cypris Larvae and Removal of Juvenile Barnacles of *B. Amphitrite*. The settlement of 2 to 4-day-old barnacle cypris larvae that were placed on the xerogel, glass, and polystyrene surfaces was compared as shown in FIG. 4. The average settlement from a drop assay onto PDMSE (Silastic® T2) slides that were settled concurrently is also included as a standard for metamorphic competence. There was a significant difference in the settlement of cypris larvae amongst the coatings (ANOVA, F=7.733, p=0.0008). Settlement on the 1:49:50 C18/C8/TEOS xerogel was significantly lower in comparison to the polystyrene standard and settlement on the 2:48:50, 3:47:50, 4:46:50, and 5:45:50 C18/C8/TEOS xerogels were all significantly lower in comparison to glass and polystyrene standards. The PDMSE (Silastic® T2) slides were not included in the statistical analysis due to the different assay type (a "drop" assay onto the surface as opposed to an "immersion" assay of the entire surface.)

Figure 5:
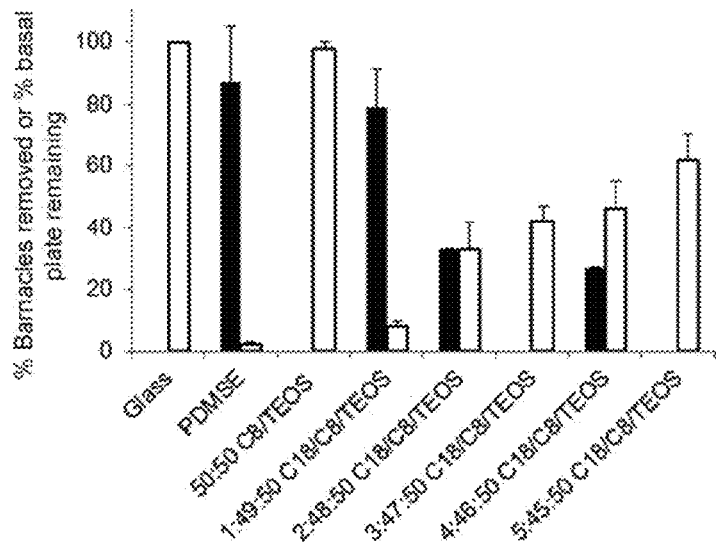
FIG. 5. Percentage of juvenile barnacles removed completely via shear pressure (■) and percentage of barnacle basal plate remaining from those barnacles removed completely or incompletely (□) Total number of barnacles, n, removed in each group and critical removal stress for barnacles removed completely are given in Table 3. Error bars are the SE from the mean.
Figure 6:
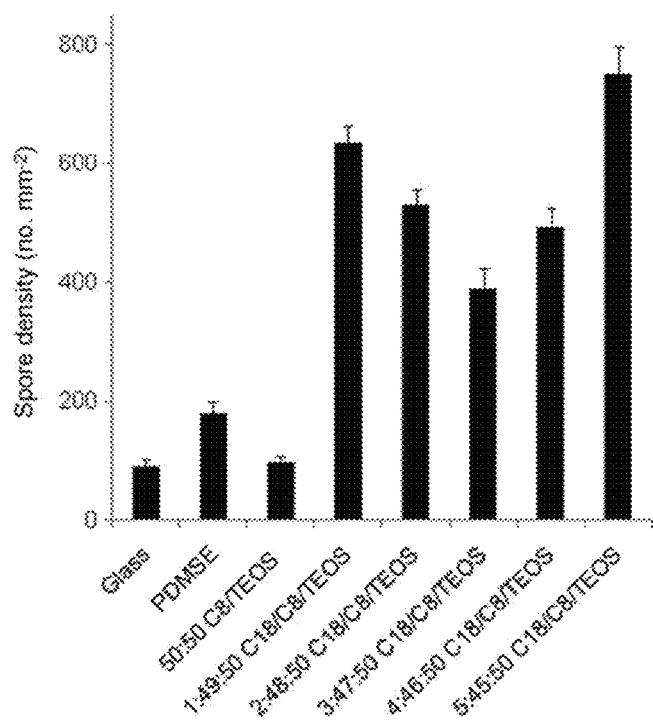
FIG. 6. Representative settlement of zoospores of *Ulva* on xerogel coatings and glass and PDMSE standards. Each value (from Table 3) is the mean of 90 counts on each of three replicate slides. Error bars represent the 95% confidence limits.

The strength of attachment of juvenile barnacles to the five C18/C8/TEOS xerogel surfaces, the 50:50 C8/TEOS xerogel and glass and PDMSE (Silastic® T2) standards was measured via force-gauge measurements with forces applied in shear. Only the 1:49:50 C18/C8/TEOS (15/19 barnacles removed completely), 2:48:50 C18/C8/TEOS (7/21 barnacles removed completely), and 4:46:50 C18/C8/TEOS (4/15 barnacles removed completely) xerogel surfaces and the PDMSE (Silastic® T2) standard (13/15 barnacles removed completely) performed as fouling-release surfaces (FIG. 5, Table 8). Removal of juvenile barnacles from the 1:49:50 C18/C8/TEOS xerogel was similar in comparison to the PDMSE (Silastic® T2) standard. The percentage of barnacles that removed completely from the 1:49:50 C18/C8/TEOS xerogel films averaged (79±12) % for each of the five replicate surfaces while the PDMSE (Silastic® T2) standard averaged (87±18) % for each of the five replicate surfaces.

The critical removal stress (CRS) for the 1:49:50 C18/C8/TEOS, 2:48:50 C18/C8/TEOS, and 4:46:50 C18/C8/TEOS xerogel surfaces was 0.20-0.21 N mm$^{-2}$, which was somewhat higher in comparison to the removal force for the PDMSE (Silastic® T2) standard (0.15 N mm$^{-2}$, Table 8).

There were no significant differences in CRS amongst the 1:49:50 C18/C8/TEOS, 2:48:50 C18/C8/TEOS, and 4:46:50 C18/C8/TEOS xerogel surfaces. However, on all coatings except for the 4:46:50 C18/C8/TEOS xerogel, the average CRS values were significantly higher than the average CRS of the PDMSE (Silastic® T2) standard (ANOVA p=0.0371). Barnacles on all other coatings and the glass standard broke when force was applied to them in shear, and left a complete or partial basal plate attached to the surface.

The remaining fraction of the basal plate left on a surface may be a function of barnacle bioadhesive bond strength and could be used as a measure of the efficacy of foul-release coatings. For barnacles not completely removed, the percentage of the basal plate remaining was calculated with digital image analysis. These results were combined with data for barnacles completely removed (0% basal plate remaining) and are compiled in Table 8 and shown in FIG. 5. There was a significant difference in average percentage of basal plate retained (% BPR) between surfaces (Kruskal Wallis p<0.0001). Post hoc testing showed that the average % BPR for the glass and 50:50 C8/TEOS standards were significantly higher than all other coatings and that these surfaces retained essentially all of the basal plate (100 and 98%, respectively). The PDMSE (Silastic® T2) standard had the lowest average % BPR but it showed no significant difference from the 1:49:50 and 2:48:50 C18/C8/TEOS xerogel coatings. However, the 2:48:50 C18/C8/TEOS xerogel was not significantly different from the 3:47:50, 4:46:50, and 5:45:50 C18/C8/TEOS xerogel surfaces, which were all significantly higher than the PDMSE (Silastic® T2) standard. Although % BPR increased as the C18 content increased from 2 to 5 mol % (33 to 62%), the differences were not statistically significant.

Settlement and Removal of Zoospores of *Ulva*. Settlement of zoospores and growth of sporeling biomass and removal on the xerogel surfaces and glass and PDMSE (Silastic® T2) standards were examined (Table 8, FIG. 6). One-way analysis of variance and Tukey tests showed that the number of settled spores was significantly lower on PDMSE (Silastic® T2), glass, and the 50:50 C8/TEOS xerogel than on the C18-containing xerogels (F 7, 712=298 p<0.05). Amongst the C18-containing xerogels, settlement was significantly lower on the 3:47:50 C18/C8/TEOS xerogel.

Figure 7:
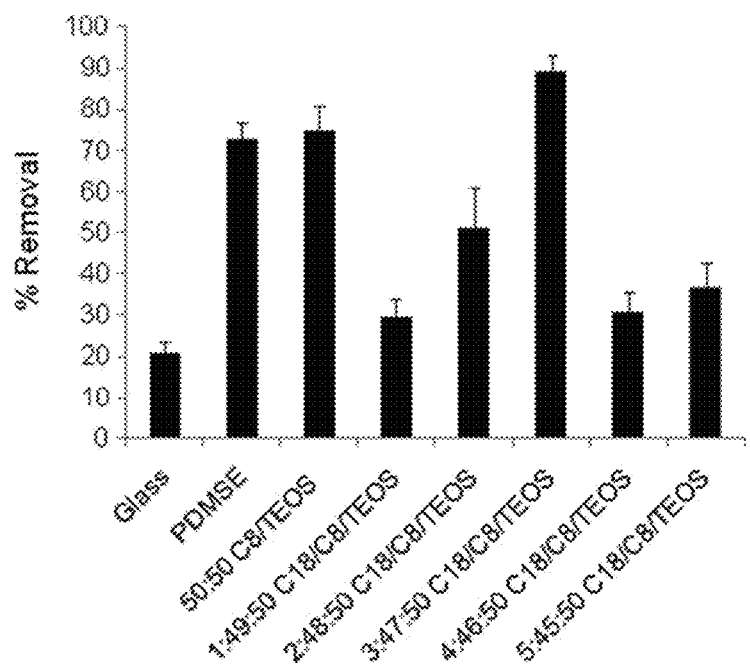
FIG. 7. Representative percentage removal of 7-day-old sporelings of *Ulva* from xerogel coatings and glass and PDMSE standards with a water-jet pressure of 54 kPa. Each value (from Table 3) is the mean from three replicate slides. Error bars represent the SE from the mean.

Strength of Attachment of Sporelings of *Ulva*. Sporelings grew well and after 7 days, a green covering was visible on all surfaces. Sporeling growth tracked the density of settled zoospores and sporeling growth amongst all the C18/C8/TEOS xerogels was comparable (Table 8). The percentage removal of 7-day sporeling biomass from the test surfaces with a water pressure of 54 kPa is compiled in Table 8 and is shown in FIG. 7. Sporelings adhered most strongly to the glass standard where only 21% of the sporeling biomass was removed. The strength of attachment of sporelings was weakest on the 3:47:50 C18/C8/TEOS xerogel (89% removal). One-way analysis of variance (F$_{7,16}$=21.3, p<0.05) showed that the samples were split into two groups with the 2:48:50 C18/C8/TEOS xerogel (51% removal) being intermediate between the two. The 50:50 C8/TEOS xerogel, the 3:47:50 C18/C8/TEOS xerogel, and the PDMSE (Silastic® T2) standard formed one group (73-89% removal) and the 1:49:50 C18/C8/TEOS xerogel, the 4:46:50 C18/C8/TEOS xerogel, the 5:45:50 C18/C8/TEOS xerogel, and the glass standard formed the second group (21-37% removal). Removal from the 2:48:50 C18/C8/TEOS xerogel was similar to all samples except for the 3:47:50 C18/C8/TEOS xerogel and the glass standard.

Scanning electron microscopy (SEM) studies of the 50:50 C8/TEOS xerogel as well as several other xerogel surfaces indicate that these surfaces are uniform, uncracked, and topographically smooth when thy. Atomic force microscopy (AFM) measurements on the same series of xerogels submerged in ASW show very low surface roughness (≤0.8 nm). Time-of-flight, secondary-ion mass spectrometry (ToF-SIMS) studies show that there is no phase segregation of fluorocarbon and hydrocarbon groups on the µm scale in a 25:25:50 trifluoropropyltrimethoxysilane/C8/TEOS xerogel. The 50:50 C8/TEOS, 50:50 C3/TEOS and 5:45:50 C18/C8/TEOS xerogel surfaces have nearly identical values of $\gamma_C$ and $\gamma_S$.

In the current example, the incorporation of 1 to 5 mole % C18 in the C8/TEOS sol (a relatively small change in formulation) dramatically impacted the distribution of chemical functionality on the xerogel surface (from transmission IR microscopy images) and the surface topography (AFM studies). The IR images of the 50:50 C8/TEOS and 1:49:50 C18/C8/TEOS xerogels films shown in FIG. 3 show that the hydrocarbon signal is significantly more homogeneous across the 50:50 C8/TEOS sample in comparison to the 1:49:50 C18/C8/TEOS sample, where some segregation of hydrocarbon components is clearly indicated. These IR images could represent clusters of smaller hydrocarbon-rich features/domains seen more clearly in the AFM images. In the AFM images of FIGS. 1 and 2a where the surfaces have been exposed to ASW for 1 hour and then were imaged in air, the addition of 1 and 2 mole % C18 to the sol formulation yielded xerogel surfaces characterized by increased surface roughness (Table 7) and by the spontaneous formation of nanopores that are on the order of 100 to 400 nm across and 2 to 7 nm deep. After equilibration with ASW, the AFM images of the 1:49:50 C18/C8/TEOS xerogel surface (FIG. 2b) still show the presence of nanopores (although of smaller diameter, perhaps due to swelling of the surface upon exposure to water) but also clearly show a regular pattern of 2 to 3 µm features ±2 to 3 nm in height/depth. These structural features have not been observed in other xerogel formulations that have been examined.

The dimensions of the nanopores in the AFM images are much smaller than the 2.7-µm resolution of the IR microscopy images, where spatial resolution is essentially limited by the diffraction limit, so it is difficult to compare directly (overlay) the structural features. However, it is clear that the small changes in formulation dramatically impact the distribution of chemical functionality, as well as the surface topography. In spite of these differences, values of $\gamma_C$ (21.4-22.4 mN m$^{-1}$) and $\gamma_S$ (22.8-25.7 mN m$^{-1}$) are identical within statistical error within the series of C18/C8/TEOS xerogels in this example for surfaces stored in the air (Table 7). Measured values of $\gamma_C$ for the C18/C8/TEOS xerogel surfaces are quite similar to $\gamma_C$ for comparative examples, 50:50 C8/TEOS xerogel (21.3 mN m$^{-1}$, Table 7) and $\gamma_C$ for PDMSE (23 mN m$^{-1}$, and are all within the 20 to 25 mN m$^{-1}$ range, where minimal bioadhesion has been reported due to the formation of weak boundary layers between the surface and the adhesives of fouling organisms.

The values of $\gamma_C$ and $\gamma_S$ described in the paragraph above are all for surfaces that had been stored in the air prior to contact angle measurement. For the 1:49:50 C18/C8/TEOS xerogel, immersion in ASW for 24 to 96 hours gave surfaces with no significant differences in $\gamma_S$ (25.6±1.1 mN m$^{-1}$) relative to surfaces stored in air (24.8±1.1 mN m$^{-1}$). This is in contrast to the behavior of the 50:50 C8/TEOS where $\gamma_S$ increased significantly from 27.1±0.3 mN m$^{-1}$ for surfaces stored in the air to 35.2±0.7 mN m$^{-1}$ for surfaces immersed 48 to 96 hours in ASW.

Although the 50:50 C8/TEOS and 1:49:50 C18/C8/TEOS xerogels undergo some surface reorganization upon immersion in an aqueous environment as indicated by the drop in $\theta_{W_S}$ for both surfaces, the reorganization is reversible. Contact angles returned to pre-immersion values upon standing in the air indicating that no irreversible chemical or structural changes had occurred to either of the surfaces upon wetting.

One can speculate with respect to the differences observed in the distribution of surface functionality and topography in the 1:49:50 C18/C8/TEOS xerogel and the remaining C18/C8/TEOS xerogels and the 50:50 C8/TEOS xerogel. Through increased London forces (the "hydrophobic effect"), interactions among the C18 molecules during sol formation might lead to preferential formations of islands of higher C18 density. With 2 mole % or less C18 in the formulation, these islands are significantly discrete to impact the surface topography. At higher C18 concentrations, segregation in the sol is still possible, but interactions among the C18 groups lead to a more uniform surface following xerogel formation. Values of $\theta_{W_S}$ increase over several weeks from the time of coating to their final value given in Table 7 suggesting that the initial surface is not in its final state and matures with time. "Untangling" of the C18 islands followed by formation of more uniform C18-C18 or C18-C8 interactions perhaps leads to less surface roughness at higher C18 concentrations.

The 1:49:50 C18/C8/TEOS xerogel surface segregates alkane functionality as indicated by transmission IR microscopy. Transmission IR microscopy, as a surface characterization technique, complements more commonly used methods such as SEM, AFM, ToF-SIMS, and x-ray photoelectron spectroscopy (XPS). Transmission IR microscopy images show the distribution of functional groups on a surface and the integrated spectra quantify the density of functional groups. The technique provides additional details of surface nanostructure that will inform the development of future antifouling and fouling release coatings.

Initial studies with the barnacle *B. amphitrite* suggest that the differences in topography and distribution of chemical functionality among the C18/C8/TEOS xerogels significantly impacts the settlement and/or release of this fouling organism in comparison to one another and in comparison to the 50:50 C8/TEOS xerogel as shown in FIGS. 4 and 5. For barnacles, the greatest impact is observed with respect to the removal of juvenile barnacles where the 1:49:50 C18/C8/TEOS xerogel and the PDMSE (Silastic® T2) standard are statistically identical for the complete removal of the barnacle and all its basal plate (FIG. 5, Table 8). However, values of the critical removal stress (CRS) are not statistically different (Table 8) in comparing barnacle removal from the 1:49:50 C18/C8/TEOS, 2:48:50 C18/C8/TEOS, and 4:46:50 C18/C8/TEOS xerogel surfaces and only the CRS value for the 4:46:50 C18/C8/TEOS xerogel is not significantly different from the PDMSE (Silastic® T2) standard (ANOVA p=0.0371, Table 8). For those barnacles that were not removed completely, a partial basal plate remained behind and the two surfaces that released the highest percentage of juvenile barnacles retained the smallest fraction of basal plate for all barnacles removed (completely and incompletely): 8% for the 1:49:50 C18/C8/TEOS xerogel and 2% for the PDMSE (Silastic® T2) standard (Table 8).

Biological evaluation is imperfect because of variability in the various organisms considered in this example. The reason why some barnacles are removed completely and why other barnacles are only partially removed is attributable to variability in coating, variability in barnacle adhesive, and variability in the structural integrity of the barnacle. All are involved to some degree, but there is no way to tease apart the relative contribution of the different factors resulting in basal plate breakage. In this example, the 1:49:50 C18/C8/TEOS xerogel and the PDMSE (Silastic® T2) standard are statistically equivalent for the removal of barnacles—completely or partially.

The equivalence of the 1:49:50 C18/C8/TEOS xerogel and the PDMSE (Silastic® T2) standard in this example is somewhat surprising since the xerogel surfaces are thin (<5 μm thickness) and have relative high modulus (60 MPa for a comparative example, 50:50 C8/TEOS xerogel) in comparison to the PDMSE (Silastic® T2) standard with a thickness of approximately 500 um and a low elastic modulus of 0.6 MPa. The 1:49:50 C18/C8/TEOS xerogel is unlikely to follow Brady-Singer fracture mechanics, which is thought to be the major mode of barnacle release for PDMSE coatings. The surface topography of the 1:49:50 C18/C8/TEOS xerogel on both the nm and the μm scales is unlike the surface topography of other xerogels examined to date. In the absence of features that favor Brady-Singer fracture mechanics, one may speculate on the relationship of surface topography and the adhesive strength of barnacle cements.

With *Ulva*, differences in topography and distribution of chemical functionality amongst the C18/C8/TEOS xerogels also impacted settlement of zoospores and removal of sporeling biomass, but the best performance was exhibited by the 3:47:50 C18/C8/TEOS xerogel—not the 1:49:50 C18/C8/TEOS xerogel that performed well with barnacles. Following exposure to a water pressure of 54 kPa, removal of sporeling biomass from the 3:47:50 C18/C8/TEOS xerogel was significantly greater in comparison to the glass standard and the remaining C18/C8/TEOS xerogels (Table 8, FIG. 7). Removal of sporeling biomass from the 3:47:50 C18/C8/TEOS xerogel was not significantly different in comparison to removal from comparative examples, 50:50 C8/TEOS xerogel and the PDMSE (Silastic® T2) standard. Settlement of zoospores on the 3:47:50 C18/C8/TEOS xerogel was significantly lower in comparison to the other C18/C8/TEOS xerogels of this example (FIG. 6), but incorporation of C18 into the formulation gave xerogel surfaces that showed significantly increased zoospore settlement relative to either the 50:50 C8/TEOS xerogel formulation or a comparative example, the PDMSE (Silastic® T2) standard.

While opposing trends in the settlement and release of different fouling organisms make it difficult to design a single surface to minimize settlement of all fouling organisms, the xerogels can be fine-tuned to provide surfaces with different water wettability and critical surface tension/surface energy. The topography of the xerogel surfaces can also be fine-tuned by the incorporation of small amounts of a long-chain alkyl component as shown by the C18/C8/TEOS xerogels of this example. The formulation and coating of these xerogel-based surfaces require no special attention or preparation (pre-patterning). Overall, xerogel surfaces have high potential as fouling-release or easy-clean materials.

TABLE 7

Static water contact angles ($\theta_{Ws}$), critical surface tensions ($\gamma_C$), surface energies ($\gamma_S$), and surface roughness as determined by AFM for selected xerogel surfaces.

| Sample | $\theta_{Ws}$,[a] ° | $\gamma_C$,[b] mN m$^{-1}$ | $\gamma_S$,[b] mN m$^{-1}$ | Surface Roughness,[c] nm |
|---|---|---|---|---|
| glass | 21 ± 1 | 33.5[d] | — | — |
| PDMSE | 109[d] | 23.0 ± 0.4[e] | — | — |
| 50:50 C8/TEOS | 100 ± 2 | 21.3 ± 0.1 | 27.1 ± 0.3 | 0.24 ± 0.02 |
| 5:45:50 C18/C8/TEOS | 108.2 ± 0.9 | 21.9 ± 0.3 | 24.6 ± 0.9 | — |
| 4:46:50 C18/C8/TEOS | 105 ± 2 | — | 22.8 ± 1.1[f] | 0.20 ± 0.01 |
| 3:47:50 C18/C8/TEOS | 102 ± 4 | 22.4 ± 0.9 | 25.7 ± 2.1 | 0.22 ± 0.02 |
| 2:48:50 C18/C8/TEOS | 108.3 ± 0.9 | — | 22.8 ± 1.1[f] | 0.67 ± 0.03 |
| 1:49:50 C18/C8/TEOS | 111.2 ± 0.2 | 21.4 ± 0.1 | 24.8 ± 1.1 | 1.15 ± 0.04 |

[a]Mean of five (5) independent measurements for coatings stored in air prior to measurement. ± one standard deviation.
[b]Mean of two (2) independent measurements for coatings stored in air prior to measurement.
[c]Average of five (5) replicate measurements. ± one standard deviation.
[d]From Tang et al. (2005).
[e]From Feinberg et al. (2003).
[f]Method of Owens and Wendt (1969).

The first three entries are comparative examples.

TABLE 8

Density of attached zoospores, sporeling biomass, percentage removal of 7-day sporeling growth with a water impact pressure of 54 kPa, percentage removal of juvenile barnacles, critical removal stress, and percentage basal plate remaining for barnacles partially or completely removed for xerogel surfaces and glass and PDMSE (Silastic ® T2) standards.

| | Ulva Settlement/Growth | | | Barnacle Removal - Complete and Partial | | |
|---|---|---|---|---|---|---|
| Sample | Spore Density,[a] no. mm$^{-2}$ | Sporeling Biomass,[b] RFU | % Removal,[c] | Complete Removal/n (% Removal)[d] | CRS,[e] N mm$^{-2}$ | BPR,[f] % (n) |
| Glass | 90 ± 11 | 2000 ± 300 | 21 ± 3 | 0/12 (0) | NA | 100 (12) |
| PDMSE | 182 ± 19 | 4100 ± 300 | 73 ± 4 | 13/15 (87) | 0.15 ± 0.01 | 2 ± 1 (15) |
| 50:50 C8/TEOS | 98 ± 8 | 1900 ± 200 | 75 ± 6 | 0/21 (0) | NA | 98 ± 2 (21) |
| 5:45:50 C18/C8/TEOS | 752 ± 45 | 7800 ± 300 | 37 ± 6 | 0/13 (0) | NA | 62 ± 8 (13) |
| 4:46:50 C18/C8/TEOS | 495 ± 31 | 8800 ± 400 | 31 ± 5 | 4/15 (27) | 0.21 ± 0.02 | 46 ± 9 (15) |
| 3:47:50 C18/C8/TEOS | 390 ± 35 | 7900 ± 300 | 89 ± 4 | 0/20 (0) | NA | 42 ± 5 (20) |

TABLE 8-continued

Density of attached zoospores, sporeling biomass, percentage removal of 7-day sporeling growth with a water impact pressure of 54 kPa, percentage removal of juvenile barnacles, critical removal stress, and percentage basal plate remaining for barnacles partially or completely removed for xerogel surfaces and glass and PDMSE (Silastic ® T2) standards.

| Sample | Ulva Settlement/Growth | | | Barnacle Removal - Complete and Partial | | |
|---|---|---|---|---|---|---|
| | Spore Density,[a] no. mm$^{-2}$ | Sporeling Biomass,[b] RFU | % Removal,[c] | Complete Removal/n (% Removal)[d] | CRS,[e] N mm$^{-2}$ | BPR,[f] % (n) |
| 2:48:50 C18/C8/TEOS | 529 ± 28 | 8700 ± 300 | 51 ± 9 | 7/21 (33) | 0.21 ± 0.02 | 33 ± 9 (21) |
| 1:49:50 C18/C8/TEOS | 635 ± 31 | 8400 ± 300 | 30 ± 4 | 15/19 (79) | 0.20 ± 0.02 | 8 ± 4 (19) |

[a]Each value is the mean from 90 counts on three (3) replicate slides. ±95% confidence limits.
[b]Sporeling biomass data are expressed as the mean RFU of three (3) replicate slides; ± standard error of the mean.
[c]Percent removal of 7-day old sporelings with a surface water pressure 54 kPa from 50:50 C8/TEOS and C18/C8/TEOS hybrid xerogel coatings.
[d]Number of juvenile barnacles completely removed with n as the total number of barnacles removed.
[e]Average critical removal stress (CRS); ± standard error of the mean.
[f]Average percentage of basal plate remaining after barnacle removal with n as the total number of barnacles removed; ± standard error of the mean.

The first three entries are comparative examples.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A composition comprising a sol-gel matrix, wherein the sol-gel matrix is a sol-gel processed xerogel film formed from a sol-gel processed composition comprising:
    a first component selected from 0.25 mole % to 5.0 mole % of a long-chain alkyltrialkoxysilane having a $C_{10}$ to $C_{25}$ alkyl group and three $C_1$ to $C_3$ alkoxy groups, 1 mole % to 45 mole % of a perfluoalkyltrialkoxysilane having a $C_8$ to $C_{25}$ perfluoroalkyl group and three $C_1$ to $C_3$ alkoxy groups, and 1 mole % to 20 mole % of an aminoalkyltrialkyoxysilane having a $C_1$ to $C_{10}$ aminoalkyl group and three $C_1$ to $C_3$ alkoxy groups, alkylaminoalkyltrialkoxysilane having a $C_1$ to $C_{10}$ alkylaminoalkyl group and a $C_1$ to $C_{10}$ aminoalkyl group, and three $C_1$ to $C_3$ alkoxy groups, or dialkylaminoalkyltrialkoxysilane having a $C_1$ to $C_{10}$ dialkylaminoalkyl group, two alkylamino groups that are, independently, $C_1$ to $C_{10}$ alkyl groups, and three $C_1$ to $C_3$ alkoxy groups,
    a second component that is 20 mole % to 55 mole % of a shorter-chain alkyltrialkoxysilane having a $C_3$ to $C_8$ alkyl group and three $C_1$ to $C_3$ alkyl groups, or
    if the first component is an aminoalkyltrialkyoxysilane, alkylaminoalkyltrialkoxysilane, or dialkylaminoalkyltrialkoxysilane, 1 mole % to 45 mole % of a long-chain alkyltrialkoxysilane having a $C_{10}$ to $C_{25}$ alkyl group and three $C_1$ to $C_3$ alkyl groups, and
    a third component that is a tetraalkoxysilane having $C_1$ to $C_3$ alkyl groups making up the remainder of the composition.

2. The composition of claim 1, wherein the first component is a long-chain alkyltrialkoxysilane, the sol-gel processed composition further comprises a fourth component that is 1 mole % to 45 mole % of a perfluoroalkyltrialkoxysilane.

3. The composition of claim 1, wherein the long-chain alkyltrialkoxysilane is n-dodecyltriethoxysilane, n-octadecyltriethoxysilane, or n-decyltriethoxysilane.

4. The composition of claim 1, wherein the shorter-chain alkyltrialkoxysilane is n-propyltrimethoxy silane, n-butyltriethoxysilane, n-pentyltriethoxysilane, n-hexyltriethoxysilane, n-heptyltriethoxysilane, or n-octyltriethoxysilane.

5. The composition of claim 1, wherein the aminoalkyltrialkyoxysilane is aminomethyltriethoxysilane, aminoethyltriethoxysilane, aminopropyltriethoxysilane, aminobutyltriethoxysilane, aminopentyltriethoxysilane, or aminohexyltriethoxysilane, the alkylaminoalkyoxysilane is methylaminoethyltriethoxysilane, methylaminopropyltriethoxysilane, methylaminobutyltriethoxysilane, methylaminopentyltriethoxysilane, or methylaminohexyltriethoxysilane, or the dialkylaminotrialkoxysilane is dimethylaminoethyltriethoxysilane, dimethylaminopropyltriethoxysilane, dimethylaminobutyltriethoxysilane, dimethylaminopentyltriethoxysilane, or dimethylaminohexyltriethoxysilane.

6. The composition of claim 1, wherein the perfluoroalkyltrialkoxysilane is tridecafluorooctadecyltriethoxysilane, or tridecafluorooctyltrimethoxysilane.

7. The composition of claim 1, wherein the tetralkoxysilane is tetramethoxysilane, tetraethoxysilane or tetraisopropoxysilane.

8. A xerogel film formed by sol-gel processing a precursor composition a first component selected from 0.25 mole % to 5.0 mole % of a long-chain alkyltrialkoxysilane having a $C_{10}$ to $C_{25}$ alkyl group and three $C_1$ to $C_3$ alkoxy groups, 1 mole % to 45 mole % of a perfluoalkyltrialkoxysilane having a $C_8$ to $C_{25}$ perfluoroalkyl group and three $C_1$ to $C_3$ alkoxy groups, and 1 mole % to 20 mole % of an aminoalkyltrialkyoxysilane having a $C_1$ to $C_{10}$ aminoalkyl group and three $C_1$ to $C_3$ alkoxy groups, alkylaminoalkyltrialkoxysilane having a $C_1$ to $C_{10}$ alkylaminoalkyl group and a $C_1$ to $C_{10}$ aminoalkyl group, and three $C_1$ to $C_3$ alkoxy groups, or dialkylaminoalkyltrialkoxysilane having a $C_1$ to $C_{10}$ dialkylaminoalkyl group, two alkylamino groups that are, independently, $C_1$ to $C_{10}$ alkyl groups, and three $C_1$ to $C_3$ alkoxy groups,
    a second component that is 20 mole % to 55 mole % of a shorter-chain alkyltrialkoxysilane having a $C_3$ to $C_8$ alkyl group and three $C_1$ to $C_3$ alkyl groups, or
    if the first component is an aminoalkyltrialkyoxysilane, alkylaminoalkyltrialkoxysilane, or dialkylaminoalkyltrialkoxysilane, 1 mole % to 45 mole % of a long-chain alkyltrialkoxysilane having a $C_{10}$ to $C_{25}$ alkyl group and three $C_1$ to $C_3$ alkyl groups, and
    a third component that is a tetraalkoxysilane having $C_1$ to $C_3$ alkyl groups making up the remainder of the composition.

9. The xerogel film of claim 8, wherein the first component is a long-chain alkyltrialkoxysilane, the sol-gel processed composition further comprises a fourth component that is 1 mole % to 45 mole % of a perfluoroalkyltrialkoxysilane.

10. The xerogel film of claim 8, wherein the long-chain alkyltrialkoxysilane is n-dodecyltriethoxysilane, n-octadecyltriethoxysilane, or n-decyltriethoxysilane.

11. The xerogel film of claim 8, wherein the shorter-chain alkyltrialkoxysilane is n-propyltrimethoxy silane, n-butyltriethoxysilane, n-pentyltriethoxysilane, n-hexyltriethoxysilane, n-heptyltriethoxysilane, or n-octyltriethoxysilane.

12. The xerogel film of claim 8, wherein the aminoalkyltrialkyoxysilane is aminoethyltriethoxysilane, aminopropyltriethoxysilane, aminobutyltriethoxysilane, aminopentyltriethoxysilane, or aminohexyltriethoxysilane, the alkylaminoalkyoxysilane is methylaminoethyltriethoxysilane, methylaminopropyltriethoxysilane, methylaminobutyltriethoxysilane, methylaminopentyltriethoxysilane, or methylaminohexyltriethoxysilane, or the dialkylaminotrialkoxysilane is dimethylaminoethyltriethoxysilane, dimethylaminopropyltriethoxysilane, dimethylaminobutyltriethoxysilane, dimethylaminopentyltriethoxysilane, or dimethylaminohexyltriethoxysilane.

13. The xerogel film of claim 8, wherein the perfluoroalkyltrialkoxysilane is tridecafluorooctadecyltriethoxysilane or tridecafluorooctyltrimethoxysilane.

14. The xerogel film of claim 8, wherein the tetralkoxysilane is tetramethoxysilane, tetraethoxysilane or tetraisopropoxysilane.

15. A method of preventing fouling of surfaces subjected to an aqueous environment, said method comprising:
   applying a coating composition to a portion of a surface subjected to an aqueous environment comprising:
   a first component selected from 0.25 mole % to 5.0 mole % of a long-chain alkyltrialkoxysilane having a $C_{10}$ to $C_{25}$ alkyl group and three $C_1$ to $C_3$ alkoxy groups, 1 mole % to 45 mole % of a perfluoalkyltrialkoxysilane having a $C_8$ to $C_{25}$ perfluoroalkyl group and three $C_1$ to $C_3$ alkoxy groups, and 1 to 20% of an aminoalkyltrialkyoxysilane having a $C_1$ to $C_{10}$ aminoalkyl group and three $C_1$ to $C_3$ alkoxy groups, alkylaminoalkyltrialkoxysilane having a $C_1$ to $C_{10}$ alkylaminoalkyl group and a $C_1$ to $C_{10}$ aminoalkyl group, and three $C_1$ to $C_3$ alkoxy groups, or dialkylaminoalkyltrialkoxysilane having a $C_1$ to $C_{10}$ dialkylaminoalkyl group, two independent $C_1$ to $C_{10}$ alkylamino groups, and three $C_1$ to $C_3$ alkoxy groups,
   a second component that is 20 mole % to 55 mole % of a shorter-chain alkyltrialkoxysilane having a $C_3$ to $C_8$ alkyl group and three $C_1$ to $C_3$ alkyl groups, or
   if the first component is an aminoalkyltrialkyoxysilane, alkylaminoalkyltrialkoxysilane, or dialkylaminoalkyltrialkoxysilane, 1 mole % to 45 mole % of a long-chain alkyltrialkoxysilane having a $C_{10}$ to $C_{25}$ alkyl group and three $C_1$ to $C_3$ alkyl groups, and
   a third component that is a tetraalkoxysilane having $C_1$ to $C_3$ alkyl groups making up the remainder of the composition, or
   such that a xerogel film is formed on the surface, and
   the xerogel film prevents or reduces fouling of the surface.

16. The method of claim 15, wherein the first component is a long-chain tetraalkyloxysilane, the sol-gel processed composition further comprises a fourth component that is 1 mole % to 45 mole % of a perfluoalkyltrialkoxysilane.

17. The method of claim 15, wherein the film has a thickness of 1 micron to 20 microns.

18. The method of claim 15, wherein the film has a contact angle of greater than 90 degrees.

19. The method of claim 15, wherein the film has a surface roughness of greater than 1 nm.

20. The method of claim 15, wherein the aqueous environment is naturally occurring or man-made and is fresh water or salt water.

* * * * *